(12) United States Patent
Moore et al.

(10) Patent No.: US 11,788,017 B2
(45) Date of Patent: Oct. 17, 2023

(54) MULTI-STAGE PROCESS AND DEVICE FOR REDUCING ENVIRONMENTAL CONTAMINANTS IN HEAVY MARINE FUEL OIL

(71) Applicant: Magëmã Technology LLC, Houston, TX (US)

(72) Inventors: Michael Joseph Moore, Houston, TX (US); Bertrand Ray Klussmann, Houston, TX (US); Carter James White, Houston, TX (US)

(73) Assignee: Magëmã Technology LLC, Houston, TX (US)

( * ) Notice: Subject to any disclaimer, the term of this patent is extended or adjusted under 35 U.S.C. 154(b) by 0 days.

(21) Appl. No.: 17/856,835

(22) Filed: Jul. 1, 2022

(65) Prior Publication Data

US 2022/0348831 A1    Nov. 3, 2022

Related U.S. Application Data

(63) Continuation-in-part of application No. 16/103,889, filed on Aug. 14, 2018, now abandoned, which is a
(Continued)

(51) Int. Cl.
*C10G 45/00* (2006.01)
*C10G 45/04* (2006.01)
(Continued)

(52) U.S. Cl.
CPC ......... *C10G 45/04* (2013.01); *B01D 53/1481* (2013.01); *C10G 25/003* (2013.01);
(Continued)

(58) Field of Classification Search
CPC ............... B01D 53/14; B01D 53/1431; B01D 53/1481; C10G 7/00; C10G 45/00;
(Continued)

(56) References Cited

U.S. PATENT DOCUMENTS 3,163,593 A    12/1964    Webster et al.
3,227,645 A    1/1966    Frumkin et al.
(Continued)

FOREIGN PATENT DOCUMENTS

CA    1054130    5/1979
CA    1060370    8/1979
(Continued)

OTHER PUBLICATIONS

Mohammad Farhat Ali, et al. A review of methods for the demetallization of residual fuel oils, Fuel Processing Technology, Mar. 8, 2006, pp. 573-584, vol. 87, Elsevier B.V.
(Continued)

*Primary Examiner* — Randy Boyer
*Assistant Examiner* — Brandi M Doyle
(74) *Attorney, Agent, or Firm* — Carter J. White

(57) ABSTRACT

A multi-stage process for reducing the Environmental Contaminants in a Feedstock Heavy Marine Fuel Oil that is compliant with ISO 8217: 2017 Table 2 as a residual marine fuel except for the concentration of Environmental Contaminants, the process involving a core hydrotreating process and either a pre-treating step or post-treating step to the core process that is selected from a) a sulfur absorption process unit; b) an oxidative desulfurizing process unit; and c) a microwave treatment process unit. The Product Heavy Marine Fuel Oil is compliant with ISO 8217 Table 2 as residual marine fuel and preferably has a sulfur level has a maximum sulfur content (ISO 14596 or ISO 8754) between the range of 0.05% wt. to 0.5% wt. A commercial scale process plant for conducting the process is disclosed.

20 Claims, 5 Drawing Sheets

Related U.S. Application Data continuation-in-part of application No. PCT/US2018/017863, filed on Feb. 12, 2018, and a continuation-in-part of application No. PCT/US2018/017855, filed on Feb. 12, 2018, application No. 17/856,835 is a continuation-in-part of application No. 15/892,608, filed on Feb. 9, 2018, now abandoned, and a continuation-in-part of application No. 15/892,603, filed on Feb. 9, 2018, now abandoned.

(60) Provisional application No. 62/589,479, filed on Nov. 21, 2017, provisional application No. 62/458,002, filed on Feb. 12, 2017.

(51) Int. Cl.
*C10G 25/00* (2006.01)
*C10L 1/16* (2006.01)
*B01D 53/14* (2006.01)

(52) U.S. Cl.
CPC ...... *C10L 1/1608* (2013.01); *C10G 2300/104* (2013.01); *C10G 2300/1044* (2013.01); *C10G 2300/202* (2013.01); *C10L 2200/0263* (2013.01); *C10L 2200/0438* (2013.01)

(58) Field of Classification Search
CPC ........ C10G 45/02; C10G 45/04; C10G 45/06; C10G 47/00; C10G 47/02; C10G 47/04; C10G 65/00; C10G 65/16; C10G 67/00; C10G 67/02; C10G 67/06; C10G 67/12; C10G 69/02; C10G 2300/1044; C10G 2300/1048; C10G 2300/202; C10G 2300/205; C10G 2300/208; C10G 2300/302; C10G 2300/308; C10G 2300/4062; C10G 2400/04; C10G 2400/06

See application file for complete search history.

(56) References Cited

U.S. PATENT DOCUMENTS

| | | |
|---|---|---|
| 3,234,121 A | 2/1966 | Maclaren |
| 3,287,254 A | 11/1966 | Paterson |
| 3,306,845 A | 2/1967 | Poll |
| 3,531,398 A | 9/1970 | Adams |
| 3,544,452 A | 12/1970 | Jaffe |
| 3,562,800 A | 2/1971 | Carlson et al. |
| 3,577,353 A | 5/1971 | White |
| 3,658,681 A | 4/1972 | Wilson et al. |
| 3,668,116 A | 6/1972 | Adams et al. |
| 3,684,688 A | 8/1972 | Roselius |
| 3,749,664 A | 7/1973 | Mickleson |
| 3,814,683 A | 6/1974 | Christman et al. |
| 3,859,199 A | 1/1975 | Gatsis |
| 3,880,598 A | 4/1975 | Van Der Toorn |
| 3,893,909 A | 7/1975 | Selvidge |
| 3,902,991 A | 9/1975 | Christensen et al. |
| 4,006,076 A | 2/1977 | Christensen et al. |
| 4,017,382 A | 4/1977 | Bonnell et al. |
| 4,054,508 A | 10/1977 | Milstein et al. |
| 4,138,227 A | 2/1979 | Wilson et al. |
| 4,267,033 A | 5/1981 | Heck et al. |
| 4,306,964 A | 12/1981 | Angevine |
| 4,357,263 A | 11/1982 | Heck et al. |
| 4,404,097 A | 9/1983 | Angevine et al. |
| 4,420,388 A | 12/1983 | Bertolacini et al. |
| 4,460,707 A | 7/1984 | Simpson |
| 4,548,710 A | 10/1985 | Simpson |
| 4,604,185 A | 8/1986 | Mc Conaghy, Jr. et al. |
| 4,645,584 A | 2/1987 | Didchenko et al. |
| 4,925,554 A | 5/1990 | Sato et al. |
| 5,167,796 A | 12/1992 | Didchenko et al. |
| 5,306,419 A | 4/1994 | Harrison et al. |
| 5,342,507 A | 8/1994 | Dai et al. |
| 5,374,350 A | 12/1994 | Heck et al. |
| 5,389,595 A | 2/1995 | Simpson et al. |
| 5,391,304 A | 2/1995 | Lantos |
| 5,401,392 A | 3/1995 | Courty et al. |
| 5,417,846 A | 5/1995 | Renard |
| 5,543,036 A | 8/1996 | Chang et al. |
| 5,591,325 A | 1/1997 | Higashi |
| 5,620,592 A | 4/1997 | Threlkel |
| 5,622,616 A | 4/1997 | Porter et al. |
| 5,686,375 A | 11/1997 | Iyer et al. |
| 5,759,385 A | 6/1998 | Aussillous et al. |
| 5,779,992 A | 7/1998 | Higashi |
| 5,827,421 A | 10/1998 | Sherwood, Jr. |
| 5,837,130 A | 11/1998 | Crossland |
| 5,868,923 A | 2/1999 | Porter et al. |
| 5,882,364 A | 3/1999 | Dilworth |
| 5,888,379 A | 3/1999 | Ushio et al. |
| 5,897,768 A | 4/1999 | McVicker et al. |
| 5,917,101 A | 6/1999 | Munoz |
| 5,922,189 A | 7/1999 | Santos |
| 5,928,501 A | 7/1999 | Sudhakar et al. |
| 5,948,239 A | 9/1999 | Virdi et al. |
| 5,958,816 A | 9/1999 | Neuman et al. |
| 5,961,709 A | 10/1999 | Hayner et al. |
| 5,976,361 A | 11/1999 | Hood et al. |
| 5,997,723 A | 12/1999 | Wiehe et al. |
| 6,017,443 A | 1/2000 | Buchanan |
| 6,117,306 A | 9/2000 | Morel et al. |
| 6,160,193 A | 12/2000 | Gore |
| 6,162,350 A | 12/2000 | Soled et al. |
| 6,171,477 B1 | 1/2001 | Morel et al. |
| 6,193,766 B1 | 2/2001 | Jordan |
| 6,203,695 B1 | 3/2001 | Harle et al. |
| 6,207,041 B1 | 3/2001 | Morel et al. |
| 6,217,749 B1 | 4/2001 | Espeillac et al. |
| 6,251,262 B1 | 6/2001 | Hatanaka et al. |
| 6,251,263 B1 | 6/2001 | Hatanaka et al. |
| 6,265,629 B1 | 7/2001 | Fava et al. |
| 6,299,759 B1 | 10/2001 | Bradway et al. |
| 6,303,531 B1 | 10/2001 | Lussier et al. |
| 6,306,287 B1 | 10/2001 | Billon et al. |
| 6,306,289 B1 | 10/2001 | Hayashi et al. |
| 6,328,880 B1 | 12/2001 | Yoshita et al. |
| 6,344,136 B1 | 2/2002 | Butler et al. |
| 6,383,975 B1 | 5/2002 | Rocha et al. |
| 6,402,940 B1 | 6/2002 | Rappas |
| 6,406,615 B1 | 6/2002 | Iwamoto et al. |
| 6,531,054 B1 | 3/2003 | Gerritsen et al. |
| 6,540,904 B1 | 4/2003 | Gun et al. |
| 6,554,994 B1 | 4/2003 | Reynolds et al. |
| 6,566,296 B2 | 5/2003 | Plantenga et al. |
| 6,576,584 B1 | 6/2003 | Ijima et al. |
| 6,589,908 B1 | 7/2003 | Ginestra et al. |
| 6,620,313 B1 | 9/2003 | Soled et al. |
| 6,649,042 B2 | 11/2003 | Dassori et al. |
| 6,656,348 B2 | 12/2003 | Dassori et al. |
| 6,656,349 B1 | 12/2003 | Fujita et al. |
| 6,673,230 B2 | 1/2004 | Hagen |
| 6,673,245 B2 | 1/2004 | Nasser, Jr. et al. |
| 6,712,955 B1 | 3/2004 | Soled et al. |
| 6,733,659 B1 | 5/2004 | Kure et al. |
| 6,783,661 B1 | 8/2004 | Briot et al. |
| 6,797,153 B1 | 9/2004 | Fukuyama et al. |
| 6,827,845 B2 | 12/2004 | Gong et al. |
| 6,858,132 B2 | 2/2005 | Kumagai et al. |
| 6,860,987 B2 | 3/2005 | Plantenga et al. |
| 6,863,803 B1 | 3/2005 | Riley et al. |
| 6,929,738 B1 | 8/2005 | Riley et al. |
| 6,984,310 B2 | 1/2006 | Ginstra et al. |
| 7,001,503 B1 | 2/2006 | Koyama et al. |
| 7,108,779 B1 | 9/2006 | Thakkar |
| 7,119,045 B2 | 10/2006 | Magna et al. |
| 7,166,209 B2 | 1/2007 | Dassori |
| 7,169,294 B2 | 1/2007 | Abe et al. |
| 7,232,515 B1 | 6/2007 | Demmin et al. |
| 7,244,350 B2 | 7/2007 | Martin et al. |
| 7,265,075 B2 | 9/2007 | Tsukada et al. |

(56) References Cited

U.S. PATENT DOCUMENTS

| | | |
|---|---|---|
| 7,276,150 B2 | 10/2007 | Nagamatsu et al. |
| 7,288,182 B1 | 10/2007 | Soled et al. |
| 7,384,537 B2 | 6/2008 | Nagamatsu et al. |
| 7,402,547 B2 | 7/2008 | Wellington et al. |
| 7,413,646 B2 | 8/2008 | Wellington et al. |
| 7,416,653 B2 | 8/2008 | Wellington |
| 7,449,102 B2 | 11/2008 | Kalnes |
| 7,491,313 B2 | 2/2009 | Toshima et al. |
| 7,507,325 B2 | 3/2009 | Gueret et al. |
| 7,513,989 B1 | 4/2009 | Soled et al. |
| 7,517,446 B2 | 4/2009 | Lott |
| 7,534,342 B2 | 5/2009 | Bhan et al. |
| 7,585,406 B2 | 9/2009 | Khadzhiev et al. |
| 7,588,681 B2 | 9/2009 | Bhan et al. |
| 7,651,604 B2 | 1/2010 | Ancheyta Juarez et al. |
| 7,651,605 B2 | 1/2010 | Sahara et al. |
| 7,695,610 B2 | 4/2010 | Bolshakov et al. |
| 7,713,905 B2 | 5/2010 | Dufresne et al. |
| 7,718,050 B2 | 5/2010 | Gueret et al. |
| 7,754,162 B2 | 7/2010 | Dassori |
| 7,901,569 B2 | 3/2011 | Farshid et al. |
| 7,938,955 B2 | 5/2011 | Araki et al. |
| 7,943,035 B2 | 5/2011 | Chornet et al. |
| 8,012,343 B2 | 9/2011 | Plantenga et al. |
| 8,021,538 B2 | 9/2011 | Klein |
| 8,114,806 B2 | 2/2012 | Bhan et al. |
| 8,133,446 B2 | 3/2012 | McGehee et al. |
| 8,163,166 B2 | 4/2012 | Wellington et al. |
| 8,173,570 B2 | 5/2012 | Maesen et al. |
| 8,193,401 B2 | 6/2012 | McGehee et al. |
| 8,241,489 B2 | 8/2012 | Bhan et al. |
| 8,268,164 B2 | 9/2012 | Wellington et al. |
| 8,318,000 B2 | 11/2012 | Bhan et al. |
| 8,318,628 B2 | 11/2012 | Brun et al. |
| 8,343,887 B2 | 1/2013 | Maesen et al. |
| 8,371,741 B2 | 2/2013 | Hassan |
| 8,372,268 B2 | 2/2013 | Ginestra et al. |
| 8,394,254 B2 | 3/2013 | Wellington et al. |
| 8,394,262 B2 | 3/2013 | Guichard et al. |
| 8,475,651 B2 | 7/2013 | Milan et al. |
| 8,506,794 B2 | 8/2013 | Bhan et al. |
| 8,546,626 B2 | 10/2013 | Daudin et al. |
| 8,563,456 B2 | 10/2013 | Dillon et al. |
| 8,608,938 B2 | 12/2013 | Wellington et al. |
| 8,608,946 B2 | 12/2013 | Bhan et al. |
| 8,613,851 B2 | 12/2013 | Wellington et al. |
| 8,652,817 B2 | 2/2014 | Wood et al. |
| 8,663,453 B2 | 3/2014 | Wellington et al. |
| 8,679,319 B2 | 3/2014 | Milam et al. |
| 8,679,322 B2 | 3/2014 | Marzin et al. |
| 8,702,970 B2 | 4/2014 | Maesen et al. |
| 8,716,164 B2 | 5/2014 | Dillon et al. |
| 8,721,871 B1 | 5/2014 | Dindi |
| 8,722,558 B2 | 5/2014 | Konno et al. |
| 8,722,563 B2 | 5/2014 | Soled et al. |
| 8,722,564 B2 | 5/2014 | Soled et al. |
| 8,741,129 B2 | 6/2014 | Brown et al. |
| 8,747,659 B2 | 6/2014 | Kiss et al. |
| 8,764,972 B2 | 7/2014 | Bhan et al. |
| 8,784,646 B2 | 7/2014 | Sanchez et al. |
| 8,795,514 B2 | 8/2014 | Kimura et al. |
| 8,821,714 B2 | 9/2014 | Chaumonnot et al. |
| 8,877,040 B2 | 11/2014 | Hoehn et al. |
| 8,894,838 B2 | 11/2014 | Dindi et al. |
| 8,926,826 B2 | 1/2015 | Dindi et al. |
| 8,946,110 B2 | 2/2015 | Toledo Antonio et al. |
| 8,962,514 B2 | 2/2015 | Seki et al. |
| 8,987,537 B1 | 3/2015 | Droubi et al. |
| 8,999,011 B2 | 4/2015 | Stern |
| 9,057,035 B1 | 6/2015 | Kraus et al. |
| 9,074,143 B2 | 7/2015 | McGehee et al. |
| 9,102,884 B2 | 8/2015 | Xu et al. |
| 9,109,176 B2 | 8/2015 | Stern et al. |
| 9,127,215 B2 | 9/2015 | Choi et al. |
| 9,127,218 B2 | 9/2015 | Banerjee et al. |
| 9,139,782 B2 | 9/2015 | Dindi et al. |
| 9,206,363 B2 | 12/2015 | Weiss |
| 9,212,323 B2 | 12/2015 | Dindi et al. |
| 9,216,407 B2 | 12/2015 | Duma et al. |
| 9,234,145 B2 | 1/2016 | Banerjee et al. |
| 9,260,671 B2 | 2/2016 | Shafi et al. |
| 9,278,339 B2 | 3/2016 | Bellussi et al. |
| 9,340,733 B2 | 5/2016 | Marchand et al. |
| 9,359,561 B2 | 6/2016 | Bazer-Bachi et al. |
| 9,365,781 B2 | 6/2016 | Dindi |
| 9,365,782 B2 | 6/2016 | Dindi et al. |
| 9,387,466 B2 | 7/2016 | Rana et al. |
| 9,434,893 B2 | 9/2016 | Dufresne |
| 9,458,396 B2 | 10/2016 | Weiss |
| 9,487,718 B2 | 11/2016 | Kraus et al. |
| 9,499,758 B2 | 11/2016 | Droubi et al. |
| 9,512,319 B2 | 12/2016 | Chatron-Michuad et al. |
| 9,540,573 B2 | 1/2017 | Bhan |
| 9,546,327 B2 | 1/2017 | Krasu et al. |
| 9,605,215 B2 | 3/2017 | Lott et al. |
| 9,624,448 B2 | 4/2017 | Joo et al. |
| 9,650,312 B2 | 5/2017 | Baldassari et al. |
| 9,650,580 B2 | 5/2017 | Merdrignac |
| 9,657,236 B2 | 5/2017 | Yang et al. |
| 9,675,968 B2 | 6/2017 | Alonso Nunez et al. |
| 9,737,883 B2 | 8/2017 | Yamane et al. |
| 9,803,152 B2 | 10/2017 | Kar |
| 9,896,630 B2 | 2/2018 | Weiss et al. |
| 9,908,105 B2 | 3/2018 | Duma et al. |
| 9,908,107 B2 | 3/2018 | Osaki et al. |
| 9,919,293 B1 | 3/2018 | Rana et al. |
| 9,920,270 B2 | 3/2018 | Robinson et al. |
| 10,072,221 B2 | 9/2018 | Bazer-Bachi et al. |
| 10,138,438 B2 | 11/2018 | Houten |
| 10,144,882 B2 | 12/2018 | Dindi et al. |
| 10,150,930 B2 | 12/2018 | Houten |
| 10,308,884 B2 | 6/2019 | Klussman et al. |
| 10,443,006 B1 | 10/2019 | Fruchey et al. |
| 10,501,699 B2 | 12/2019 | Robinson et al. |
| 10,518,251 B2 | 12/2019 | Matsushita et al. |
| 10,533,141 B2 | 1/2020 | Moore et al. |
| 10,563,133 B2 | 2/2020 | Moore et al. |
| 10,584,287 B2 | 3/2020 | Klussman et al. |
| 10,597,591 B2 | 3/2020 | Weiss et al. |
| 10,597,594 B1 | 3/2020 | Fruchey et al. |
| 10,604,709 B2 | 3/2020 | Moore et al. |
| 10,640,718 B2 | 5/2020 | Wohaibi et al. |
| 10,668,451 B2 | 6/2020 | Boualleg et al. |
| 10,683,461 B2 | 6/2020 | Wohaibi et al. |
| 10,876,053 B2 | 6/2020 | Klussmann et al. |
| 10,760,020 B2 | 9/2020 | Kashio et al. |
| 10,870,804 B2 | 12/2020 | Wohaibi et al. |
| 10,883,056 B2 | 1/2021 | Wohaibi et al. |
| 10,899,983 B1 | 1/2021 | Kar et al. |
| 10,920,160 B2 | 2/2021 | Wohaibi et al. |
| 10,954,456 B2 | 3/2021 | Moore et al. |
| 10,995,290 B2 | 5/2021 | Anderson et al. |
| 11,001,768 B2 | 5/2021 | Liu et al. |
| 11,015,133 B2 | 5/2021 | Wohaibi et al. |
| 11,015,134 B2 | 5/2021 | Wohaibi et al. |
| 2001/0001036 A1 | 5/2001 | Espeillac et al. |
| 2001/0013484 A1 | 8/2001 | Zeuthen et al. |
| 2002/0037806 A1 | 3/2002 | Dufresne et al. |
| 2002/0045540 A1 | 4/2002 | Bartholdy |
| 2002/0056664 A1 | 5/2002 | Chabot |
| 2002/0070147 A1 | 6/2002 | Sonnemans et al. |
| 2002/0117426 A1 | 8/2002 | Holder |
| 2002/0144932 A1 | 10/2002 | Gong et al. |
| 2002/0148757 A1 | 10/2002 | Huff et al. |
| 2002/0157990 A1 | 10/2002 | Feimer et al. |
| 2002/0195375 A1 | 12/2002 | Chapus et al. |
| 2003/0042172 A1 | 3/2003 | Sharivker et al. |
| 2003/0125198 A1 | 7/2003 | Ginestra et al. |
| 2003/0131526 A1 | 7/2003 | Kresnyak et al. |
| 2003/0146133 A1 | 8/2003 | Nagamatsu et al. |
| 2003/0217951 A1 | 11/2003 | Marchal-George et al. |
| 2004/0007501 A1 | 1/2004 | Sughrue et al. |
| 2004/0020829 A1 | 2/2004 | Magna et al. |
| 2004/0040890 A1 | 3/2004 | Morton et al. |

(56) References Cited

U.S. PATENT DOCUMENTS

| | | |
|---|---|---|
| 2004/0055934 A1 | 3/2004 | Tromeur et al. |
| 2004/0134837 A1 | 7/2004 | Dassori |
| 2004/0178117 A1 | 9/2004 | Morton et al. |
| 2004/0186014 A1 | 9/2004 | Tsukada et al. |
| 2004/0209771 A1 | 10/2004 | Abe et al. |
| 2004/0232041 A1 | 11/2004 | Kiser et al. |
| 2004/0256293 A1 | 12/2004 | Abe et al. |
| 2005/0020446 A1 | 1/2005 | Choudhary et al. |
| 2005/0101480 A1 | 5/2005 | Ackerman et al. |
| 2005/0109674 A1 | 5/2005 | Klein |
| 2005/0113250 A1 | 5/2005 | Schleicher et al. |
| 2005/0133405 A1 | 6/2005 | Wellington et al. |
| 2005/0133406 A1 | 6/2005 | Wellington et al. |
| 2005/0133411 A1 | 6/2005 | Zeuthen et al. |
| 2005/0133416 A1 | 6/2005 | Bhan et al. |
| 2005/0133417 A1 | 6/2005 | Bhan et al. |
| 2005/0135997 A1 | 6/2005 | Wellington et al. |
| 2005/0139512 A1 | 6/2005 | Wellington et al. |
| 2005/0139520 A1 | 6/2005 | Bhan et al. |
| 2005/0139522 A1 | 6/2005 | Bhan et al. |
| 2005/0145537 A1 | 7/2005 | Wellington et al. |
| 2005/0145538 A1 | 7/2005 | Wellington et al. |
| 2005/0145543 A1 | 7/2005 | Bhan et al. |
| 2005/0148487 A1 | 7/2005 | Brownscombe et al. |
| 2005/0150156 A1 | 7/2005 | Karas et al. |
| 2005/0150818 A1 | 7/2005 | Bhan et al. |
| 2005/0155906 A1 | 7/2005 | Wellington et al. |
| 2005/0167321 A1 | 8/2005 | Wellington et al. |
| 2005/0167327 A1 | 8/2005 | Bhan et al. |
| 2005/0167328 A1 | 8/2005 | Bhan et al. |
| 2005/0167329 A1 | 8/2005 | Bhan et al. |
| 2005/0167331 A1 | 8/2005 | Bhan et al. |
| 2005/0269245 A1 | 12/2005 | Huve |
| 2006/0052235 A1 | 3/2006 | Bai et al. |
| 2006/0060501 A1 | 3/2006 | Gauthier et al. |
| 2006/0060509 A1 | 3/2006 | Miyauchi et al. |
| 2006/0060510 A1 | 3/2006 | Bhan |
| 2006/0102522 A1 | 5/2006 | Turaga et al. |
| 2006/0115392 A1 | 6/2006 | Dassori |
| 2006/0175229 A1 | 8/2006 | Montanari et al. |
| 2006/0211900 A1 | 9/2006 | Iki et al. |
| 2006/0231456 A1 | 10/2006 | Bhan |
| 2006/0231465 A1 | 10/2006 | Bhan |
| 2006/0234876 A1 | 10/2006 | Bhan |
| 2006/0234877 A1 | 10/2006 | Bhan |
| 2006/0249429 A1 | 11/2006 | Iki et al. |
| 2006/0281638 A1 | 12/2006 | Zaid et al. |
| 2006/0289340 A1 | 12/2006 | Brownscombe et al. |
| 2007/0000808 A1 | 1/2007 | Bhan et al. |
| 2007/0000810 A1 | 1/2007 | Bhan et al. |
| 2007/0012595 A1 | 1/2007 | Brownscombe et al. |
| 2007/0072765 A1 | 3/2007 | Soled et al. |
| 2007/0084753 A1 | 4/2007 | Iki et al. |
| 2007/0105714 A1 | 5/2007 | Turaga et al. |
| 2007/0108098 A1 | 5/2007 | Flint et al. |
| 2007/0131584 A1 | 6/2007 | Kalnes |
| 2007/0138055 A1 | 6/2007 | Farshid et al. |
| 2007/0170096 A1 | 7/2007 | Shan et al. |
| 2007/0175797 A1 | 8/2007 | Iki et al. |
| 2007/0284285 A1 | 12/2007 | Stepanik et al. |
| 2008/0017551 A1 | 1/2008 | Kiriyama et al. |
| 2008/0047875 A1 | 2/2008 | Karas et al. |
| 2008/0073247 A1 | 3/2008 | Bolshakov |
| 2008/0085225 A1 | 4/2008 | Bhan et al. |
| 2008/0135453 A1 | 6/2008 | Bhan |
| 2008/0149531 A1 | 6/2008 | Roy-Auberger et al. |
| 2008/0167180 A1 | 7/2008 | Van Den Brink et al. |
| 2008/0210595 A1 | 9/2008 | Bolshakov et al. |
| 2008/0223755 A1 | 9/2008 | Roy-Auberger et al. |
| 2008/0230440 A1 | 9/2008 | Graham et al. |
| 2008/0245700 A1 | 10/2008 | Wellington et al. |
| 2008/0245702 A1 | 10/2008 | Wellington et al. |
| 2008/0262115 A1 | 10/2008 | Calis et al. |
| 2008/0272027 A1 | 11/2008 | Wellington et al. |
| 2008/0272028 A1 | 11/2008 | Wellington et al. |
| 2008/0308459 A1 | 12/2008 | Iki et al. |
| 2009/0048097 A1 | 2/2009 | Jones et al. |
| 2009/0057194 A1 | 3/2009 | Farshid et al. |
| 2009/0057197 A1 | 3/2009 | Bhan et al. |
| 2009/0062590 A1 | 3/2009 | Nadler et al. |
| 2009/0114569 A1 | 5/2009 | Osaheni et al. |
| 2009/0134064 A1 | 5/2009 | Reynolds |
| 2009/0139902 A1 | 6/2009 | Kressmann et al. |
| 2009/0166260 A1 | 7/2009 | Magalie et al. |
| 2009/0178951 A1 | 7/2009 | Balthasar et al. |
| 2009/0230022 A1 | 9/2009 | Gorbaty et al. |
| 2009/0234166 A1 | 9/2009 | Gorbaty et al. |
| 2009/0255850 A1 | 10/2009 | Bhan et al. |
| 2009/0255851 A1 | 10/2009 | Bhan et al. |
| 2009/0275788 A1 | 11/2009 | Bedard et al. |
| 2009/0283444 A1 | 11/2009 | Bhan et al. |
| 2009/0288987 A1 | 11/2009 | Bhan et al. |
| 2009/0288989 A1 | 11/2009 | Wellington et al. |
| 2009/0308791 A1 | 12/2009 | Bhan et al. |
| 2009/0308812 A1 | 12/2009 | Osaheni et al. |
| 2009/0314686 A1 | 12/2009 | Zimmerman |
| 2010/0006475 A1 | 1/2010 | Ginestra |
| 2010/0018902 A1 | 1/2010 | Brownscombe et al. |
| 2010/0025291 A1 | 2/2010 | Shafi et al. |
| 2010/0044274 A1 | 2/2010 | Brun et al. |
| 2010/0055005 A1 | 3/2010 | Bhan et al. |
| 2010/0098602 A1 | 4/2010 | Bhan et al. |
| 2010/0155301 A1 | 6/2010 | Guichard et al. |
| 2010/0200463 A1 | 8/2010 | Patron et al. |
| 2010/0213103 A1 | 8/2010 | Patron et al. |
| 2010/0243526 A1 | 9/2010 | Ginestra et al. |
| 2010/0243532 A1 | 9/2010 | Myers et al. |
| 2010/0264067 A1 | 10/2010 | Osaheni et al. |
| 2010/0294698 A1 | 11/2010 | e Mello et al. |
| 2010/0326890 A1 | 12/2010 | Bhan |
| 2011/0017637 A1 | 1/2011 | Reynolds et al. |
| 2011/0079542 A1 | 4/2011 | Ellis et al. |
| 2011/0083997 A1 | 4/2011 | Silva et al. |
| 2011/0094938 A1 | 4/2011 | Morel |
| 2011/0108461 A1 | 5/2011 | Gabrielov et al. |
| 2011/0127194 A1 | 6/2011 | Zhang et al. |
| 2011/0155558 A1 | 6/2011 | Cardoso et al. |
| 2011/0155644 A1 | 6/2011 | Bhattacharyya et al. |
| 2011/0174681 A1 | 7/2011 | Milam et al. |
| 2011/0178346 A1 | 7/2011 | Milam et al. |
| 2011/0186477 A1 | 8/2011 | Milam et al. |
| 2011/0186480 A1 | 8/2011 | Milam et al. |
| 2011/0203971 A1 | 8/2011 | Kiss et al. |
| 2011/0218097 A1 | 9/2011 | Rayo Mayoral et al. |
| 2011/0240517 A1 | 10/2011 | Chornet et al. |
| 2011/0277377 A1 | 11/2011 | Novak et al. |
| 2012/0018352 A1 | 1/2012 | Seki et al. |
| 2012/0103868 A1 | 5/2012 | Dindi et al. |
| 2012/0116145 A1 | 5/2012 | Bhan et al. |
| 2012/0145528 A1 | 6/2012 | Myers et al. |
| 2012/0175285 A1 | 7/2012 | Bhan et al. |
| 2012/0175286 A1 | 7/2012 | Bhan et al. |
| 2012/0181219 A1 | 7/2012 | Seki et al. |
| 2013/0037447 A1 | 2/2013 | Zimmerman |
| 2013/0081977 A1 | 4/2013 | Woo et al. |
| 2013/0105357 A1 | 5/2013 | Bhan |
| 2013/0105364 A1 | 5/2013 | Bhan |
| 2013/0126393 A1 | 5/2013 | Ginestra et al. |
| 2013/0171039 A1 | 7/2013 | Graham et al. |
| 2013/0186806 A1 | 7/2013 | Diehl et al. |
| 2013/0225400 A1 | 8/2013 | Liang et al. |
| 2013/0256190 A1 | 10/2013 | Van Wees et al. |
| 2013/0267409 A1 | 10/2013 | Lee et al. |
| 2013/0277273 A1 | 10/2013 | Mazyar |
| 2013/0288885 A1 | 10/2013 | Domokos et al. |
| 2013/0306517 A1 | 11/2013 | Kester et al. |
| 2013/0319910 A1 | 12/2013 | Koseoglu |
| 2014/0001089 A1 | 1/2014 | Bazer-Bachi |
| 2014/0027351 A1 | 1/2014 | Bazer-Bachi et al. |
| 2014/0061094 A1 | 3/2014 | Xu et al. |
| 2014/0073821 A1 | 3/2014 | Mitsui et al. |
| 2014/0076783 A1 | 3/2014 | Bhan |
| 2014/0097125 A1 | 4/2014 | Bazer-Bachi et al. |
| 2014/0166540 A1 | 6/2014 | Guichard et al. |

(56) References Cited

U.S. PATENT DOCUMENTS

| | | |
|---|---|---|
| 2014/0174980 A1 | 6/2014 | Brown et al. |
| 2014/0174983 A1 | 6/2014 | Klein et al. |
| 2014/0183098 A1 | 7/2014 | Cooper et al. |
| 2014/0183099 A1 | 7/2014 | Ginestra et al. |
| 2014/0291201 A1 | 10/2014 | Banerjee et al. |
| 2014/0291203 A1 | 10/2014 | Molinari et al. |
| 2014/0299515 A1 | 10/2014 | Weiss et al. |
| 2014/0305843 A1 | 10/2014 | Kraus et al. |
| 2014/0315712 A1 | 10/2014 | Smegal |
| 2014/0323779 A1 | 10/2014 | Alphazan et al. |
| 2014/0326642 A1 | 11/2014 | Tanaka et al. |
| 2014/0332444 A1 | 11/2014 | Weiss et al. |
| 2014/0353210 A1 | 12/2014 | Graham et al. |
| 2015/0057205 A1 | 2/2015 | Morishima et al. |
| 2015/0108039 A1 | 4/2015 | Bhan |
| 2015/0111726 A1 | 4/2015 | Bhan et al. |
| 2015/0144531 A1 | 5/2015 | Ginstra et al. |
| 2015/0144532 A1 | 5/2015 | He et al. |
| 2015/0217261 A1 | 8/2015 | Norling |
| 2015/0224476 A1 | 8/2015 | Plecha et al. |
| 2015/0240174 A1 | 8/2015 | Kraus et al. |
| 2015/0315480 A1 | 11/2015 | Hanks et al. |
| 2015/0321177 A1 | 11/2015 | Rana et al. |
| 2015/0337225 A1 | 11/2015 | Droubi et al. |
| 2015/0337226 A1 | 11/2015 | Droubi et al. |
| 2015/0344791 A1 | 12/2015 | Banerjee et al. |
| 2015/0353848 A1 | 12/2015 | Patron |
| 2015/0353851 A1 | 12/2015 | Buchanan |
| 2016/0001272 A1 | 1/2016 | Daudin |
| 2016/0017240 A1 | 1/2016 | Duma et al. |
| 2016/0024396 A1 | 1/2016 | Zink et al. |
| 2016/0060549 A1 | 3/2016 | Ancheyta Juarez et al. |
| 2016/0074840 A1 | 3/2016 | Duma et al. |
| 2016/0075954 A1 | 3/2016 | Monson et al. |
| 2016/0122666 A1 | 5/2016 | Weiss et al. |
| 2016/0129428 A1 | 5/2016 | Bhan |
| 2016/0145503 A1 | 5/2016 | Xu et al. |
| 2016/0145508 A1 | 5/2016 | Xu et al. |
| 2016/0145509 A1 | 5/2016 | Mukherjee et al. |
| 2016/0152901 A1 | 6/2016 | Dufresne |
| 2016/0160139 A1 | 6/2016 | Robinson et al. |
| 2016/0177205 A1 | 6/2016 | Evans et al. |
| 2016/0200990 A1 | 7/2016 | Mori et al. |
| 2016/0220985 A1 | 8/2016 | Osaki et al. |
| 2016/0220986 A1 | 8/2016 | Osaki et al. |
| 2016/0230102 A1 | 8/2016 | Osaki et al. |
| 2016/0243528 A1 | 8/2016 | He et al. |
| 2016/0250622 A1 | 9/2016 | He et al. |
| 2016/0256856 A1 | 9/2016 | Kester et al. |
| 2016/0264887 A1 | 9/2016 | Davydov |
| 2016/0304794 A1 | 10/2016 | Majcher et al. |
| 2016/0312130 A1 | 10/2016 | Merdrignac |
| 2016/0340597 A1 | 11/2016 | Baldassari et al. |
| 2016/0348012 A1 | 12/2016 | Zhao et al. |
| 2016/0348013 A1 | 12/2016 | Ladkat et al. |
| 2016/0362615 A1 | 12/2016 | Ancheyta Juarez et al. |
| 2017/0002273 A1 | 1/2017 | Rubin-Pitel et al. |
| 2017/0002279 A1 | 1/2017 | Brown et al. |
| 2017/0009163 A1 | 1/2017 | Kraus et al. |
| 2017/0022433 A1 | 1/2017 | Brown et al. |
| 2017/0029723 A1 | 2/2017 | Bazer-Bachi et al. |
| 2017/0044451 A1 | 2/2017 | Kar et al. |
| 2017/0058205 A1 | 3/2017 | Ho et al. |
| 2017/0058223 A1 | 3/2017 | Droubi et al. |
| 2017/0066979 A1 | 3/2017 | Lei et al. |
| 2017/0073592 A1 | 3/2017 | Nonaka et al. |
| 2017/0120224 A1 | 5/2017 | Boualleg et al. |
| 2017/0120228 A1 | 5/2017 | Boualleg et al. |
| 2017/0120229 A1 | 5/2017 | Boualleg et al. |
| 2017/0121612 A1 | 5/2017 | Boualleg et al. |
| 2017/0128912 A1 | 5/2017 | Boualleg et al. |
| 2017/0136446 A1 | 5/2017 | Carati et al. |
| 2017/0137725 A1 | 5/2017 | Boualleg et al. |
| 2017/0165639 A1 | 6/2017 | Klein et al. |
| 2017/0175012 A1 | 6/2017 | Schleiffer et al. |
| 2017/0183575 A1 | 6/2017 | Rubin-Pitel et al. |
| 2017/0183582 A1 | 6/2017 | Hoehn et al. |
| 2017/0192126 A1 | 7/2017 | Koseoglu |
| 2017/0232414 A1 | 8/2017 | Hassan |
| 2017/0260463 A1 | 9/2017 | Schleiffer et al. |
| 2017/0267937 A1 | 9/2017 | Schleiffer et al. |
| 2017/0306250 A1 | 10/2017 | Ginestra |
| 2017/0306252 A1 | 10/2017 | Malek Abbaslou et al. |
| 2017/0335206 A1 | 11/2017 | Mukherjee et al. |
| 2017/0349846 A1 | 12/2017 | Ding et al. |
| 2017/0355913 A1 | 12/2017 | Mountainland et al. |
| 2017/0355914 A1 | 12/2017 | Weiss et al. |
| 2017/0362514 A1 | 12/2017 | Hanks et al. |
| 2018/0016505 A1 | 1/2018 | Matsushita |
| 2018/0104676 A1 | 4/2018 | Yamane et al. |
| 2018/0134965 A1 | 5/2018 | Brown et al. |
| 2018/0134972 A1 | 5/2018 | Brown et al. |
| 2018/0134974 A1 | 5/2018 | Weiss et al. |
| 2018/0147567 A1 | 5/2018 | Matsushita et al. |
| 2018/0154340 A1 | 6/2018 | Boualleg et al. |
| 2018/0155647 A1 | 6/2018 | Robinson et al. |
| 2018/0195013 A1 | 7/2018 | Dreillard et al. |
| 2018/0207622 A1 | 7/2018 | Boualleg et al. |
| 2018/0230387 A1 | 8/2018 | Moore et al. |
| 2018/0230388 A1 | 8/2018 | Li et al. |
| 2018/0230389 A1 | 8/2018 | Moore et al. |
| 2018/0251690 A1 | 9/2018 | Mountainland et al. |
| 2018/0291291 A1 | 10/2018 | Brown et al. |
| 2018/0340126 A1 | 11/2018 | Klussman et al. |
| 2018/0346828 A1 | 12/2018 | Liu et al. |
| 2018/0355263 A1 | 12/2018 | Moore et al. |
| 2018/0371343 A1 | 12/2018 | Rubin-Patel et al. |
| 2019/0002772 A1 | 1/2019 | Moore et al. |
| 2019/0010405 A1 | 1/2019 | Moore et al. |
| 2019/0010406 A1 | 1/2019 | Moore et al. |
| 2019/0010407 A1 | 1/2019 | Moore et al. |
| 2019/0010408 A1 | 1/2019 | Moore et al. |
| 2019/0016972 A1 | 1/2019 | Moore et al. |
| 2019/0016974 A1 | 1/2019 | Moore et al. |
| 2019/0040329 A1 | 2/2019 | Moore et al. |
| 2019/0078027 A1 | 3/2019 | Deimund et al. |
| 2019/0093026 A1 | 3/2019 | Wohaibi et al. |
| 2019/0136144 A1 | 5/2019 | Wohaibi et al. |
| 2019/0153340 A1 | 5/2019 | Weiss et al. |
| 2019/0153942 A1 | 5/2019 | Wohaibi et al. |
| 2019/0185772 A1 | 6/2019 | Berkhous et al. |
| 2019/0203130 A1 | 7/2019 | Mukherjee |
| 2019/0233732 A1 | 8/2019 | Sun |
| 2019/0233741 A1 | 8/2019 | Moore et al. |
| 2019/0256784 A1 | 8/2019 | Klussman et al. |
| 2019/0300806 A1 | 10/2019 | Kashio et al. |
| 2019/0338203 A1 | 11/2019 | Umansky et al. |
| 2019/0338205 A1 | 11/2019 | Ackerson et al. |
| 2019/0382668 A1 | 12/2019 | Klussmann et al. |
| 2020/0095508 A1 | 3/2020 | Moore et al. |
| 2020/0095509 A1 | 3/2020 | Moore et al. |
| 2020/0123458 A1 | 4/2020 | Moore et al. |
| 2020/0131443 A1 | 4/2020 | Moore et al. |
| 2020/0131446 A1 | 4/2020 | Wohaibi et al. |
| 2020/0131447 A1 | 4/2020 | Wohaibi et al. |
| 2020/0140765 A1 | 5/2020 | Moore et al. |
| 2020/0172819 A1 | 6/2020 | Wohaibi et al. |
| 2020/0172820 A1 | 6/2020 | Wohaibi et al. |
| 2020/0199462 A1 | 6/2020 | Klussmann et al. |
| 2020/0199463 A1 | 6/2020 | Klussmann et al. |
| 2020/0199465 A1 | 6/2020 | Wohaibi et al. |
| 2020/0199466 A1 | 6/2020 | Wohaibi et al. |
| 2020/0199467 A1 | 6/2020 | Wohaibi et al. |
| 2020/0216766 A1 | 7/2020 | Wohaibi et al. |
| 2020/0224108 A1 | 7/2020 | Moore et al. |
| 2020/0231886 A1 | 7/2020 | Kraus et al. |
| 2020/0248080 A1 | 8/2020 | Peer et al. |
| 2020/0385644 A1 | 12/2020 | Rogel et al. |
| 2021/0017458 A1 | 1/2021 | Wohaibi et al. |
| 2021/0017459 A1 | 1/2021 | Wohaibi et al. |
| 2021/0017460 A1 | 1/2021 | Wohaibi et al. |
| 2021/0017461 A1 | 1/2021 | Wohaibi et al. |
| 2021/0024838 A1 | 1/2021 | Wohaibi et al. |
| 2021/0024839 A1 | 1/2021 | Wohaibi et al. |

(56) References Cited

U.S. PATENT DOCUMENTS

| | | |
|---|---|---|
| 2021/0024840 A1 | 1/2021 | Wohaibi et al. |
| 2021/0024842 A1 | 1/2021 | Fruchey et al. |
| 2021/0032551 A1 | 2/2021 | Wohaibi et al. |
| 2021/0062096 A1 | 3/2021 | Hodgkins et al. |
| 2021/0102130 A1 | 4/2021 | Marques et al. |
| 2021/0155858 A1 | 5/2021 | Koseoglu et al. |

FOREIGN PATENT DOCUMENTS

| | | |
|---|---|---|
| CA | 1248513 | 1/1989 |
| EP | 1041133 A1 | 10/2000 |
| EP | 1052015 A1 | 11/2000 |
| EP | 2130895 A1 | 12/2009 |
| EP | 2947133 A1 | 11/2015 |
| EP | 2992070 A2 | 3/2016 |
| FR | 2681871 | 4/1993 |
| FR | 3011004 A | 3/2015 |
| FR | 3011004 A1 | 3/2015 |
| FR | 3013723 A | 5/2015 |
| FR | 3013723 A1 | 5/2015 |
| FR | 3053356 | 1/2018 |
| GB | 1324167 | 7/1973 |
| GB | 1502915 | 3/1978 |
| GB | 1504586 | 3/1978 |
| GB | 1505886 | 3/1978 |
| GB | 2124252 | 2/1984 |
| JP | 2015059220 A | 3/2015 |
| JP | 20200122450 | 8/2020 |
| RU | 2700705 | 9/2019 |
| WO | 9113951 A1 | 9/1991 |
| WO | 9820969 | 5/1998 |
| WO | 9820969 A1 | 5/1998 |
| WO | 0197971 A1 | 12/2001 |
| WO | 0209870 A2 | 2/2002 |
| WO | 2004052534 A1 | 6/2004 |
| WO | 2004053028 A1 | 6/2004 |
| WO | 2005028596 A1 | 3/2005 |
| WO | 2005063933 A2 | 7/2005 |
| WO | 2009001314 A1 | 12/2008 |
| WO | 2011071705 A2 | 6/2011 |
| WO | 2013083662 | 6/2013 |
| WO | 2014096703 A | 6/2014 |
| WO | 2014096703 A1 | 6/2014 |
| WO | 2014096704 A | 6/2014 |
| WO | 2014177424 A2 | 11/2014 |
| WO | 2015034521 A1 | 3/2015 |
| WO | 2015147222 A1 | 10/2015 |
| WO | 2015147223 A1 | 10/2015 |
| WO | 2017168312 A1 | 10/2017 |
| WO | 2018073018 A1 | 4/2018 |
| WO | 2018075017 | 4/2018 |
| WO | 2018053323 A1 | 3/2019 |
| WO | 2019104243 A1 | 5/2019 |
| WO | 2019125674 A1 | 6/2019 |
| WO | 2019133880 A1 | 7/2019 |
| WO | 2019178701 A1 | 9/2019 |
| WO | 2021066265 A1 | 4/2021 |

OTHER PUBLICATIONS

Mohan S. Rana, et al., A review of recent advances on process technologies for upgrading of heavy oils and residua, Fuel, Available online Sep. 7, 2006, pp. 1216-1231, vol. 86, Elsevier B.V.

Carolina Leyva, et al., Activity and surface properties of NiMo/SiO2—Al2O3 catalysts for hydroprocessing of heavy oils, Applied Catalysis A: General, Available online Feb. 28, 2012, pp. 1-12, vol. 425-426, Elsevier B.V.

Oliver C. Mullins et al., Asphaltenes Explained for the Nonchemist, Petrophysics, Jun. 2015, pp. 266-275, vol. 56, No. 3.

M. Ghasemi, et al., Phase Behavior and Viscosity Modeling of Athabasca Bitumen and Light Solvent Mixtures, SPE165416, Jun. 2013, pp. 1-26, Society of Petroleum Engineers.

Marten Ternan, Catalytic Hydrogenation and Asphaltene Conversion of Athabasca Bitumen, The Canadian Journal of Chemical Engineering, Oct. 1983, pp. 689-696, vol. 61.

Jeremi'as Marti'nez, et al., Comparison of correlations to predict hydrotreating product properties during hydrotreating of heavy oils, Catalysis Today, Available online Dec. 5, 2009, pp. 300-307, vol. 150, Elsevier B.V.

Luis C. Castn"Eda, et al., Current situation of emerging technologies for upgrading of heavy oils, Catalysis Today, Available online Jul. 4, 2013, pp. 248-273, vol. 220-222, Elsevier B.V.

C. Ferreira, et al., Hydrodesulfurization and hydrodemetallization of different origin vacuum residues: Characterization and reactivity, Fuel, Available online Apr. 14, 2012, pp. 1-11, http://dx.doi.org/10.1016/j. fuel.2012.03.054, Elsevier B.V.

C.V. Philip, et al. GPC Characterization for Assessing Compatibility Problems with Heavy Fuel Oils, Fuel Processing Technology 1984: pp. 189-201., Elsevier B.V.

Muhammad A. Altajam & Marten Ternan, Hydrocracking of Athabasca bitumen using Co-Mo catalysts supported on wide pore carbon extrudates, Fuel, Aug. 1989, pp. 955-960, Butterworth & Co. Publishers Ltd.

J.W. Holmes & J.A. Bullin, Fuel Oil Compatibility Probed, Hydrocarbon Processing, Sep. 1983: pp. 101-103.

Charles J. Glover, & Jerry A. Bullin, Identification of Heavy Residual Oils by GC and GCMS, Journal of Environmental Science and Health A24(1), 1989: pp. 57-75.

H. Puron, et al., Kinetic analysis of vacuum residue hydrocracking in early reaction stages, Fuel, Available online Sep. 27, 2013, pp. 408-414, vol. 117, Elsevier B.V.

Yanet Villasna, et al. Upgrading and Hydrotreating of Heavy Oils and Residua, Energy Science and Technology, vol. 3, Oil and Natural Gas, 2015, pp. 304-328, Stadium Press LLC, Houston TX USA.

*Phillips 66, Phillips 66*, Petitioner v *Magëmä Technology LLC*, Patent Owner, Petition for Inter Parties Review, Case IPR2021-01168, Patent No. 10,308,884 B2, Dated Jul. 7, 2021, All pages.

*Phillips 66, Phillips 66*, Petitioner v *Magëmä Technology LLC*, Patent Owner, Petition for Inter Parties Review, Case IPR2021-01173, Patent No. 10,584,287 B2, Dated Jul. 12, 2021, All pages.

*Phillips 66, Phillips 66*, Petitioner v *Magëmä Technology LLC*, Patent Owner, Petition for Inter Parties Review, Case IPR2021-01174, Patent No. 10,604,709 B2, Dated Jul. 13, 2021, All pages.

*Phillips 66, Phillips 66*, Petitioner v *Magëmä Technology LLC*, Patent Owner, Petition for Inter Parties Review, Case IPR2021-01175, Patent No. 10,533,141 B2, Dated Jul. 14, 2021, All pages.

International Organization for Standardization. Petroleum products—Fuels (class F)—Specifications of marine fuels (ISO Standard No. 8217:2017(E)), 2017. pp. 1-30 as presented in Petitioner's Exhibit 1003 in IPR2021-01168; IPR2021-01173; IPR2021-01174; IPR2021-01175.

Phillips 66, Petitioner's Exhibit 1015 Defendants Supplemental Preliminary Invalidity Contentions pp. 1-50, as presented in IPR2021-01168; IPR2021-01173; IPR2021-01174; IPR2021-01175.

Mafalda Silva, Life Cycle Assessment of Marine Fuel Production, Jul. 2017, Norwegian University of Science and Technology, pp. 16-18, 32-35, 66 as presented Petitioner's Exhibit 1055 in IPR2021-01168; IPR2021-01173; IPR2021-01174; IPR2021-01175 and cited in Petitioner's Exhibit 1015 in IPR2021-01168; IPR2021-01173; IPR2021-01174; IPR2021-01175.

Cambiaso Risso Group, Challenges of IMO's 0.5% Global Bunker Sulfur Cap, De.c 12, 2016, p. 9, as presented in Petitioner's Exhibit 1057 in IPR2021-01168; IPR2021-01173; IPR2021-01174; IPR2021-01175 and cited in Petitioner's Exhibit 1015 in IPR2021-01168; IPR2021-01173; IPR2021-01174; IPR2021-01175.

Phillips 66, Petitioner's Exhibit 1082 Declaration of Edward L. Sughrue II, pp. 1-84 as presented in IPR2021-01168; IPR2021-01173; IPR2021-01174; IPR2021-01175.

Surinder Parkash, Petroleum Fuels Manufacturing Handbook, 2010, R.R Donnelley, Publisher, pp. 82, 83, 84, 94, 95, 96 as presented in Petitioner's Exhibit 1102 in IPR2021-01174.

International Search Report issued in corresponding International Application No. PCT/US2018/017855 dated Apr. 27, 2018 (3 pages).

(56) References Cited

OTHER PUBLICATIONS

International Search Report issued in corresponding International Application No. PCT/US2018/017863 dated Apr. 27, 2018 (3 pages).
Tesoro Refining & Marketing Co. Material Safety Data Sheet—Fuel Oil, pp. 1-10, Jul. 26, 2012, San Antonio, Texas, US.
Tesoro Refining & Marketing Co. Material Safety Data Sheet—Marine Gas Oil, pp. 1-11, Nov. 17, 2012, San Antonio, Texas, US.
Tesoro Refining & Marketing Co. Material Safety Data Sheet—Resid pp. 1-10, Apr. 6, 2015, San Antonio, Texas, US.
Coutrymark Refining and Logistics, LLC, Material Safety Data Sheet—No. 6 Fuel Oil, Dec. 2012, pp. 1-4, Mt. Vernon, Indiana US.
Valero Marekting & Supply Company, Material Safety Data Sheet—Residual Fuel Oil, Dec. 4, 2010, pp. 1-14, San Antonio, Texas US.
Oceanbat SA. Material Safety Data Sheet—Marine Fuel Oil, Jul. 2013, pp. 1-7, Guayaquil Ecuador.
Exxonmobilcorporation, Material Safety Data Sheet—Marine Fuel Oil, pp. 1-12, Sep. 18, 2013, Fairfax Virginia US.
Shell Trading (US) Company, Material Safety Data Sheet—Ultra Low Sulfur Fuel Oil, pp. 1-21, Jun. 19, 2018, Houston, Texas US.
Suncor Energy Inc., Material Safety Data Sheet—Heating Fuel Oil Type 6 / Residual Marine Fuel, pp. 1-11, Jun. 7, 2018, Calgary Alberta Canada.
Marathon Petroleum Company LP, Material Safety Data Sheet—Marathon No. 6 Fuel Oil, Dec. 7, 2010, pp. 1-14., Findlay, Ohio US.
BP Australia Pty Ltd., Material Safety Data Sheet—BP380 Marine Fuel, Oct. 27, 2011. pp. 1-6, Docklands, Victoria Australia.
U.S. Oil & Refining Co., Material Safety Data Sheet—Residual Fuel Oil, Dec. 18, 2008, pp. 1-11. Tacoma, Washington US.
American Bureau of Shipping, Publication 31 Notes On Heavy Fuel Oil, 1984, pp. 1-68, Houston Texas US.
American Bureau of Shipping, Notes Use of Low Sulphur Marine Fuel for Main and Auxiliary Diesel Engines, Jan. 1, 2010, pp. 1-68, Houston Texas US ( https://www.eagle.org/eagleExternalPortalWEB/ShowProperty/BEA%20Repository/pdfs/Regulatory/Docs/LowSulphurNote_Engine).
Shuyi Zhang, Dong Liu, Wenan Deng, Guohe Que, A Review of Slurry-Phase Hydrocracking Heavy Oil Technology, Energy & Fuels, vol. 21, No. 6, Nov. 2007, pp. 3057-3062, American Chemical Society, Washington DC US.
Peiman Pourmoghaddam, Susan Davari, Zahra Delavar Moghaddam, A Technical And Economic Assessment of Fuel Oil Hydrotreating Technology For Steam Power Plant SO2 and NOx Emissions Control, Advances in Environmental Technology vol. 2, Issue 1, Accepted Oct. 3, 2016, pp. 45-54, Iranian Research Organization For Science and Technology, Tehran Islamic Republic of Iran.
Dawoud Bahzad, Jamal Al-Fadhli, Ayyad Al-Dhafeeri, Ali Abdal, Assessment of Selected Apparent Kinetic Parameters of the HDM and HDS reactions of Two Kuwaiti Residual Oils, Using Two Types of Commercial ARDS Catalysts, Energy & Fuels, vol. 24, Jan. 8, 2010, pp. 1495-1501, American Chemical Society, Washington DC US.
A. Marafi, A. Hauser, A Stanislaus, Atmospheric Residual Desulfurization Process for Residual Oil Upgrading: An Investigation of the Effect of Catalyst Type and Operation Severity on Product Oil Quality, Energy & Fuels, vol. 20, Apr. 4, 2006, pp. 1145-1149, American Chemical Society, Washington DC US.
M.M. Boduszynki, C.E. Rechsteiner, A.S.G. Shafzadeh, R.M.K. Carlson, Composition and Properties of Heavy Crudes, No. 1998. 202 UNITAR Centre for Heavy Crude and Tar Sands, 1998, pp. 1-12, Canada.
Mike Stockle, Tina Knight, Impact of Low-Sulphur Bunkers on Refineries, Catalysis 2009, p. 1-7, www.digitalrefining.com/article/1000090, article based on presentation from the Nov. 2008 ERC Annual Meeting, Vienna Austria.
Ekaterina V. Parkhomchuk, Anton I. Lysikov, Alexey G. Okunev, Pavel D. Parunin, Victoria S. Semeikina, Artem B. Ayupov, Valentina A. Trunova, Valentin N. Parmon, Meso / Macroporous CoMo Alumina Pellets for Hydrotreating of Heavy Oil, Industrial & Engineering Chemistry Research, vol. 15 Nov. 13, 2013, pp. 17117-17125 American Chemical Society, Washington DC US.
Cristian J. Calderon Jorge Ancheyta, Modeling of Slurry-Phase Reactors for Hydrocracking of Heavy Oils, Energy & Fuels, vol. 30 Jan. 28, 2016, pp. 2525-2543, American Chemical Society, Washington DC US.
DNV GL Maritime, Notice for Low Sulphur "Hybrid" Fuel Operation, Technical Update No. 3, Mar. 2015, p. 1&2, DNV GL Maritime, Hamburg Germany.
Abdul Waheed Bhutto, Rashid Abro, Shurong Goa, Tauqeer Abbas, Xiaochun Chen, Guangren Yu, Oxidative Desulfurization of Fuel Oils Using Ionic Liquids: A Review, Journal of the Taiwan Institute of Chemical Engineers, vol. 62, Feb. 28, 2016, pp. 84-97, Elsevier B.V. Amsterdam The Netherlands.
I.V. Babich, J.A. Moulijn, Science and Technology of Novel Processes for Deep Desulfurization of Oil Refinery Streams: A Review, Fuel, vol. 82 , Nov. 14, 2002, pp. 607-631 Elsevier B.V. Amsterdam The Netherlands Published first on the web via fuelfirst.com—http://www.fuelfirst.com.
A. Hauser, A. Marafi, A. Stanislaus, A. Al-Adwani, Relation Between Feed Quality and Coke Formation in a Three Stage Atmospheric Residue Desulfurization (ARDS) Process, Energy & Fuels, vol. 19 Feb. 8, 2005, pp. 644-553, American Chemical Society, Washington DC US.
A Marafi, H. Al-Bazzaz, M. Al-Marri, F. Maruyama, M. Absi-Halbi, A. Stanislaus, Residual-Oil Hydrotreating Kinetics for graded Catalyst Systems: Effect of Original and Treated Feedstocks, Energy Fuels, vol. 17 (5), Jul. 2, 2003 pp. 1191-1197 American Chemical Society, Washington DC US.
Himaza Al-Bazza, Jia-Lin Kang, Dduha Chehadeh, Dawoud Bahzad, David Shan-Hill Wong, Shi-Shang Jang, Robust Predictions of Catalyst Deactivation of Atmospheric Residual Desulfurization, Energy Fuels, vol. 29, Oct. 21, 2015 pp. 7089-7100 American Chemical Society, Washington DC US.
A.G. Okunev, E.V. Parkhomchuk, A.I. Lysikov, P.D. Parunin, V.S. Semeykina, V.N. Parmon, Catalytic Hydroprocessing of Heavy Oil Feedstocks, Russian Chemical Reviews, vol. 84, Sep. 2015, pp. 981-999, Russian Academy of Sciences and Turpion Ltd. Moscow, Russia.
Ernest Czermanski, Slawomir Drozdziecki, Maciej Matczak, Eugen Spangenberg, Bogusz Wisnicki, Suplphur Regulation—Technology Solutions and Economic Consequences, Institute of Maritime transport and Seaborne Trade, University of Gdansk, 2014, pp. 1-76, University of Gdansk, Gdansk Poland.
Charles Olsen, Brian Watkins, Greg Rosinski, The Challenges of Processing FCC LCO, Catalagram 110 Special Edition, Fall 2011, pp. 6-8, W.R. Grace & Co. Advanced Refining Technologies, Columbus Maryland, US.
Yanzi Jia, Qinghe Yang, Shuling Sun, Hong Nie, Dadong Li, The Influence of Metal Deposits on Residue Hydrodemetallization Catalyst in the Absence and Presence of Coke, Energy Fuels, vol. 30 Feb. 22, 2016 pp. 2544-2554 American Chemical Society, Washington DC US.
James G. Speight, Upgrading Heavy Oils and Residua: The Nature of the Problem, Catalysis on the Energy Scene, 1984, pp. 515-527, Elsevier Science Publishers B.V. Amsterdam, The Netherlands.
Blessing Umana, Nan Zhang, Robin Smith, Development of Vacuum Residue Hydrodesuphurization—Hydrocracking Models and Their Integration with Refinery Hydrogen Networks, Industrial & Engineering Chemistry Research, vol. 55, Jan. 27, 2016, pp. 2391-2406, American Chemical Society, Washington DC US.
Mike Stockle, Tina Knight, Impact of Low Sulphur Bunkers on Refineries, Catalysis, 2009, pp. 1-7, downloaded from website: www.digitalrefining.com/article/1000090.
James G. Speight, The Desulfurization of Heavy Oils and Residua, 2nd Ed. 1999, Chapter 5, pp. 168-205, Marcel Dekker Inc. New York NY US.
James G. Speight, The Desulfurization of Heavy Oils and Residua, 2nd Ed. 1999, Chapter 6, pp. 206-253, Marcel Dekker Inc. New York NY US.
James G. Speight, The Desulfurization of Heavy Oils and Residua, 2nd Ed. 1999, Chapter 8, pp. 302-334, Marcel Dekker Inc. New York NY US.

(56) References Cited

OTHER PUBLICATIONS

James G. Speight, The Desulfurization of Heavy Oils and Residua, 2nd Ed. 1999, Chapter 9, pp. 335-385, Marcel Dekker Inc. New York NY US.

Gard AS, Bunkers and Bunkering - A selection of articles previously published by Gard AS, Jan. 2014, pp. 1-53, Arendal Norway.

Monique B. Vermeire Everything You Need to Know About Marine Fuels, Jun. 2012, pp. 1-32, Ghent Belgium.

Chevron Lummus Group, Product web page—RDS / VRDS, 2013-2018, pp. 1-2, http://www.chevrontechnologymarketing.com/CLGtech/rds_vrds.aspx.

T.M. Saleh, H. Ismail, J.E.Corbett, R.S. Bali, Commercial Experience in the Operation of Atmospheric Residue Desulfurization Unit in Kuwait national Petroleum Company At Mina Al-Ahmadi Refinery, Catalyst in Petroleum Refining, 1989, pp. 175-189, Elsevier Science Publishers B.V., Amsterdam The Netherlands.

Victor S. Semeykina, Ekaterina V. Parkhomchuk, Alexander V. Polukhin, Pavel D. Parunin, Anton I. Lysikov, Artem B. Ayupov, Svetlana V. Cherepanova, Vladislav V. Kanazhevskiy, Vasil V. Kaichev, Tatyana S. Glazneva, Valentina V. Zvereva, COMoNi Catalyst Texture and Surface Properties in Heavy Oil Processing. Part I: Hierarchical Macro / Mesoporous Alumina Support, Industrial & Engineering Chemistry Research, vol. 55, Feb. 29, 2016, pp. 3535-3545 American Chemical Society, Washington DC US.

Victor S. Semeykina, Ekaterina V. Parkhomchuk, Alexander V. Polukhin, Pavel D. Parunin, Anton I. Lysikov, Artem B. Ayupov, Svetlana V. Cherepanova, Vladislav V. Kanazhevskiy, Vasil V. Kaichev, Tatyana S. Glazneva, Valentina V. Zvereva, COMoNi Catalyst Texture and Surface Properties In Heavy Oil Processing. Part II: Macroporous Sepiolite-Like Mineral, Industrial & Engineering Chemistry Research, vol. 55, Aug. 1, 2016, pp. 9129-9139 American Chemical Society, Washington DC US.

Andre Hauser, Abdulazim Marafi, Adel Almutairi, Anthony Stanislaus, Comparative Study of Hydrodemetallization (HDM) Catalyst Aging by Boscan Feed and Kuwait Atmospheric Residue, Energy & Fuels, vol. 22 Aug. 27, 2008, pp. 2952-2932, American Chemical Society, Washington DC US.

Criterion Catalysts & Technologies LP, Residue Upgrading Using Fixed-Bed Hydroconversion Product Brochure, pp. 1 & 2, downloaded Jan. 9, 2018, web page https://www.criterioncatalysts.com/products/product-applications/residue-upgrading/_jcr_content/par/expandablelist/expandablesection_854912165.stream/1519837987339/9483494a3cf09f165f81bab4f7a2e855ea62aa53f4885b9e56c0e9e0787e5939/criterion-fixed-factsheethires.pdf.

Criterion Catalysts & Technologies LP, Residue Upgrading Product Information Sheet, pp. 1 & 2, Aug. 2008, Houston Texas US.

John-Laurent Tronche, Jelena Grigorjeva, Annie Siebert (editor), How Are Refiners Preparing For 2015 Marine Fuel Spec Changes?, pp. 1-2, Jun. 6, 2014, S&P Global Platts. Houston Texas US.

DNV GL Maritime, Hong Kong Requires Ocean-Going Vessels to Comply with 0.50% M/M Sulphur Limit While at Berth, Statutory Update No. 1, Mar. 2015, p. 1, DNV GL Maritime, Hamburg Germany.

MULTI-STAGE PROCESS AND DEVICE FOR REDUCING ENVIRONMENTAL CONTAMINANTS IN HEAVY MARINE FUEL OIL

This application is: A) a continuation-in-part of co-pending application Ser. No. 15/892,603, filed Feb. 9, 2018, entitled "MULTI-STAGE PROCESS AND DEVICE FOR REDUCING ENVIRONMENTAL CONTAMINATES IN HEAVY MARINE FUEL OIL", and Ser. No. 15/892,603 claims priority to U.S. Provisional Application No. 62/589,479 filed Nov. 21, 2017; Ser. No. 15/892,603 also claims priority to 62/458,002 filed Feb. 12, 2017; and, B) a continuation-in-part of co-pending application Ser. No. 15/892,608, filed Feb. 9, 2018, entitled: "MULTI-STAGE PROCESS AND DEVICE FOR REDUCING ENVIRONMENTAL CONTAMINATES IN HEAVY MARINE FUEL OIL", and Ser. No. 15/892,608 claims priority to U.S. Provisional Application No. 62/589,479 filed Nov. 21, 2017; Ser. No. 15/892,608 also claims priority to 62/458,002 filed Feb. 12, 2017; and, C) a continuation-in-part of co-pending application Ser. No. 16/103,889, filed Aug. 14, 2018, entitled "MULTISTAGED PROCESS AND DEVICE FOR TEATMENT HEAVY MARINE FUEL OIL AND RESULTANT COMPOSITIONS INCLUDING MICROWAVE PROMOTED DESULFURIZATION", and Ser. No. 16/103,889 claims priority as continuation-in-part of International Application No. PCT/US2018/017863, filed Feb. 12, 2018, PCT/US2018/017863 claims priority to U.S. Provisional Application No. 62/589,479 filed Nov. 21, 2017; PCT/US2018/017863 also claims priority to 62/458,002 filed Feb. 12, 2017, Ser. No. 16/103,889 also claims priority as continuation-in-part of International Application No. PCT/US2018/017855, filed Feb. 12, 2018, PCT/US2018/017855 claims priority to U.S. Provisional Application No. 62/589,479 filed Nov. 21, 2017; PCT/US2018/017863 also claims priority to 62/458,002 filed Feb. 12, 2017. As such, this application is a consolidation of, and thereby a continuation-in-part of each of the above noted applications, all of which are incorporated herein by reference in their entirety.

BACKGROUND

There are two basic marine fuel types, the specifications for which are set forth in ISO 8217:2017; distillate marine fuel (Table 1), and residual marine fuel (Table 2). Distillate marine fuel, also known as Marine Gas Oil (MGO) or Marine Diesel Oil (MDO) comprises kerosene, diesel and gas oil petroleum fractions separated from crude oil in a refinery. Gas oil (also known as medium diesel) is a petroleum fraction intermediate in boiling range and viscosity between kerosene and lubricating oil containing a mixture of mostly paraffinic C10-C19 hydrocarbons. Gas oil is used to heat homes and is used for heavy equipment such as cranes, bulldozers, generators, bobcats, tractors and combine harvesters. Generally maximizing gasoil recovery from heavier oil fractions is the most economic use of the petroleum oil by refiners. Diesel oils are very similar to gas oils with diesel containing predominantly contain a mixture of C10 through C19 hydrocarbons, which include approximately 60% or more aliphatic hydrocarbons, about 1-2% olefinic hydrocarbons, and approximately 35% or less aromatic hydrocarbons. Diesel fuels are primarily utilized as a land transport fuel and as blending component with kerosene to form aviation jet fuel, however on ships diesel fuel may be utilized to run generators and other secondary machinery, but rarely the main propulsion units (i.e. ship engines) because of the cost for fuel. The art of removing Environmental Contaminants (as defined below) from light gas oils and/or kerosene or diesel (collectively and colloquially known as "distillate") is well developed and known and is not the focus of the present invention.

Residual marine fuels or Heavy Marine Fuel Oil (HMFO) are distinctly different from distillate marine fuels, as is noted in ISO 8217: 2017. The HMFOs are compliant with the requirements of Table 2 of ISO 8217: 2017 (making them residual marine fuels) and the later are compliant with the requirements of Table 1 of ISO 8217:2017 (making them distillate marine fuels). As a practical matter, and as one of skill in the art would know, a marine fuel compliant with ISO 8217: 2017 Table 2, cannot be sold as a distillate marine fuel compliant with ISO 8217: 2017 Table 1. Similarly, a marine fuel compliant with ISO 8217: 2017 Table 1 as a distillate marine fuel would never be sold or marketed as an ISO 8217: 2017 Table 2 residual marine fuel because doing so would make no economic sense; the distillate marine fuel is far more valuable than residual marine fuel, distillate marine fuels are less energy dense (i.e. generate less usable energy per unit of fuel) than residual marine fuels, and a ship's prime mover engines are generally not designed to operate on Table 1 distillate marine fuels without modifications or operational changes. ISO 8217: 2017 Table 2 compliant residual marine fuels (a term Applicant herein uses interchangeably with Heavy Marine Fuel Oil (HMFO)) are a complex mixture of hydrocarbons, often heavy or vacuum gas oils mixed with heavier (higher boiling point) oils and/or hydrocarbon residues—the fractions having a boiling point greater than gas oils, and that are so heavy they may not boil or vaporize under atmospheric pressure or even under vacuum conditions. These heavy oil fractions (sometimes colloquially called residue or resid) often contain asphaltenes and resins between 3 and 20 percent by weight or greater. Asphaltenes are large and complex polycyclic hydrocarbons that are believed to contribute to the fuel energy density, SARA properties, and lubricity properties of HMFO which are commercially desirable. Asphaltenes and resins in heavy oil fractions however, have a propensity to form complex and waxy precipitates, especially when mixed with or in the presence with aliphatic (paraffinic) hydrocarbons such as those that make up the majority of "distillate" hydrocarbon fractions. Once asphaltenes have precipitated out, they are notoriously difficult to re-dissolve and are colloquially described as fuel tank sludge in the marine shipping industry and marine bunker fueling industry.

Large ocean-going ships have relied upon HMFO to power large two stroke diesel engines for over 50 years. HMFO is a complex blend of aromatics, polycyclic aromatics, heavy (high boiling point) distillates, resins, and other uncharacterized hydrocarbons (i.e. residues) generated in the crude oil refinery process; the exact nature of the components is highly dependent upon the refinery and refinery crude slate. Typical refinery streams included in the formulation of HMFO include: atmospheric tower bottoms (i.e. atmospheric residues), vacuum tower bottoms (i.e. vacuum residues) visbreaker residue, FCC Light Cycle Oil (LCO), FCC Heavy Cycle Oil (HCO) also known as FCC bottoms, FCC Slurry Oil also known as decant oil, heavy gas oils, delayed coker oils (DCO), polycylic aromatic hydrocarbons, De-asphalted oils (DAO), reclaimed or reprocessed land transport motor oils, heavy residual oil fractions created throughout the refinery and petrochemical complex, and limited portions (often less than 20% by volume) of cutter oils, kerosene or diesel to achieve a desired viscosity. HMFO has an aromatic content higher than the marine distillate fuels noted above. The HMFO composition is complex and varies with the source of crude oil as well as the refinery processes utilized in a particular refinery to extract the most value out of a barrel of crude oil and are sometimes derisively called "the bottom of the barrel". It well known in the art of formulating HSFO for commercial use to determine the known properties of each hydrocarbon component, and then optimize the ratio of available components in a blend to achieve a desired final blend with the desired commercial properties (such as those in ISO 8217 Table 2). However, blending of heavy hydrocarbons is a delicate and unpredictable process because of the presence of asphaltenes and resins that can precipitate out over time. The mixture of hydrocarbon components is generally characterized as being a wide range of hydrocarbons having high boiling points, often uncharacterized chemically, resulting in a hydrocarbon cocktail that is viscous, high in sulfur and metal content, and high in asphaltenes making HMFO the one of the few, if not the only product of the refining process that has a per barrel value less than the feedstock crude oil itself. Often HMFO is the repository of "left over" hydrocarbon fractions from which a refiner can no longer economically extract any further valuable hydrocarbon fractions.

Industry statistics indicate that about 90% of the HMFO sold contains 3.5 weight % sulfur. With an estimated total worldwide consumption of HMFO of approximately 300 million tons per year, the annual production of sulfur dioxide by the shipping industry is estimated to be over 21 million tons per year. Emissions from HMFO burning in ships contribute significantly to both global air pollution and local air pollution levels.

MARPOL, the International Convention for the Prevention of Pollution from Ships, as administered by the International Maritime Organization (IMO) was enacted to prevent pollution from ships. In 1997, a new annex was added to MARPOL; the Regulations for the Prevention of Air Pollution from Ships—Annex VI to minimize airborne emissions from ships and their contribution to air pollution. A revised Annex VI with tightened emissions limits on sulfur oxides, nitrogen oxides, ozone depleting substances and volatile organic compounds (S Ox, NOx, ODS, VOC) was adopted in October 2008 and effective 1 Jul. 2010 (hereafter called Annex VI (revised)).

MARPOL Annex VI (revised) established a set of stringent emissions limits for vessel operations in designated Emission Control Areas (ECAs). The ECAs under MARPOL Annex VI (revised) are: i) Baltic Sea area—as defined in Annex I of MARPOL—SOx only; ii) North Sea area—as defined in Annex V of MARPOL—SOx only; iii) North American—as defined in Appendix VII of Annex VI of MARPOL—SOx, NOx and PM; and, iv) United States Caribbean Sea area—as defined in Appendix VII of Annex VI of MARPOL—SOx, NOx and PM.

Annex VI (revised) was codified in the United States by the Act to Prevent Pollution from Ships (APPS). Under the authority of APPS, the U.S. Environmental Protection Agency (the EPA), in consultation with the United States Coast Guard (USCG), promulgated regulations which incorporate by reference the full text of MARPOL Annex VI (revised). See 40 C.F.R. § 1043.100(a)(1). On Aug. 1, 2012 the maximum sulfur content of all marine fuel oils used onboard ships operating in US waters/ECA cannot exceed 1.00% wt. (10,000 ppm) and on Jan. 1, 2015 the maximum sulfur content of all marine fuel oils used in the North American ECA was lowered to 0.10% wt. (1,000 ppm). At the time of implementation, the United States government indicated that vessel operators must vigorously prepare for the 0.10% wt. (1,000 ppm) US ECA marine fuel oil sulfur standard. To encourage compliance, the EPA and USCG refused to consider the cost of compliant low sulfur fuel oil to be a valid basis for claiming that compliant fuel oil was not available for purchase. For the past five years there has been a very strong economic incentive to meet the marine industry demands for low sulfur HMFO, however technically viable solutions have not been realized. There has been an on-going and urgent demand for processes and methods for making a low sulfur HMFO that is compliant with MARPOL Annex VI emissions requirements, especially the strict MARPOL ECA requirements.

Under the revised MARPOL Annex VI, the global sulfur cap for HMFO was reduced to 3.50% wt. effective 1 Jan. 2012; then further reduced to 0.50% wt, effective 1 Jan. 2020. This regulation has been the subject of much discussion in both the marine shipping and marine fuel bunkering industry. There has been a very strong economic incentive to meet the international marine industry demands for low sulfur HMFO that is compliant with ISO 8217: 2017 Table 2 as a residual marine fuel, however technically viable solutions have not been realized. There is an on-going and urgent demand for processes and methods for making a low sulfur HMFO that is compliant with both the MARPOL Annex VI emissions requirements and ISO 8217 Table 2.

Primary control solutions: A focus for compliance with the MARPOL requirements has been on primary control solutions for reducing the sulfur levels in marine fuel components prior to combustion based on the substitution of HMFO with alternative fuels. Because of the potential risks to ships propulsion systems (i.e. fuel systems, engines, etc.) when a ship switches fuel, the conversion process must be done safely and effectively to avoid any technical issues. However, each alternative fuel has both economic and technical difficulties adapting to the decades of shipping infrastructure and bunkering systems based upon HMFO utilized by the marine shipping industry.

LNG: The most prevalent primary control solution in the shipping industry is the adoption of LNG as a primary or additive fuel to HMFO. An increasing number of ships are using liquified natural gas (LNG) as a primary fuel. Natural gas as a marine fuel for combustion turbines and in diesel engines leads to negligible sulfur oxide emissions. The benefits of natural gas have been recognized in the development by IMO of the International Code for Ships using Gases and other Low Flashpoint Fuels (the IGF Code), which was adopted in 2015. LNG however presents the marine industry with operating challenges including: on-board storage of a cryogenic liquid in a marine environment will require extensive renovation and replacement of the bunker fuel storage and fuel transfer systems of the ship; the supply of LNG is far from ubiquitous in major world ports; updated crew qualifications and training on operating LNG or duel fuel engines will be required prior to going to sea.

Sulfur Free Bio-fuels: Another proposed primary solution for obtaining compliance with the MARPOL requirements is the substitution of HMFO with sulfur free bio-fuels. Biodiesel has had limited success in displacing petroleum derived diesel however supply remains constrained. Methanol has been used on some short sea services in the North Sea ECA on ferries and other littoral ships. The widespread adoption of bio-fuel, such as bio-diesel or methanol, present many challenges to ship owners and the bunker fuel industry. These challenges include: fuel system compatibility and adaptation of existing fuel systems will be required; contamination during long term storage of methanol and bio-diesel from water and biological contamination; the heat content of methanol and bio-diesel on a per ton basis is substantially lower than HMFO; and methanol has a high vapor pressure and presents serious safety concerns of flash fires.

Replacement of heavy fuel oil with marine gas oil or marine diesel: Another proposed primary solution is to simply replace HMFO with marine gas oil (MGO) or marine diesel (MDO). As noted above, the first major difficulty is the constraint in global supply of the hydrocarbon fraction that make up over 90% vol of MGO and MDO. It is reported that the effective spare capacity to produce MGO is less than 100 million metric tons per year resulting in an annual shortfall in marine fuel of over 200 million metric tons per year. Refiners not only lack the capacity to increase the production of lower value MGO, but they have no economic motivation because higher value and higher margins can be obtained from ultra-low sulfur diesel fuel for land-based transportation systems (i.e. trucks, trains, mass transit systems, heavy construction equipment, etc.). Lastly, and most importantly from a refiner's perspective, a distillate only solution ignores the economic impact of disposing of the refinery streams that previously went to the high sulfur HMFO blending pool.

Blending: Another primary solution is the blending of one or more of the higher sulfur components of HMFO with lower sulfur containing fuels such as low sulfur marine diesel (0.1% wt. sulfur) to achieve a Product HMFO with a sulfur content of 0.5% wt. This involves the application of the well-known results driven optimized blending processes in which the properties (including sulfur content) of the starting materials are known and blending simply becomes and exercise in achieving a compliant (ie.. less than 0.5 wt % sulfur) blend for the least cost. For example, in a hypothetical straight blending approach (based on simple linear blending) every 1 ton of HSFO (3.5% sulfur) requires 7.5 tons of MGO or MDO material with 0.1% wt. S to achieve a sulfur level of 0.5% wt. HMFO. One of skill in the art of fuel blending will immediately understand that blending is a balancing of properties between the components and key properties required of a HMFO compliant ISO 8217: 2017 Table 2, specifically viscosity, density, CCAI, flash point, pour point, potential sediment, and solids content can be substantially altered and adversely affected in unpredictable ways by the optimized blending process. Further a blending process may result in a fuel with variable viscosity and density resulting in inherent instability during storage, such that that final fuel delivered to the customer may no longer meet the requirements for a HMFO.

Further complications may arise when blended HMFO is introduced into the bunkering infrastructure and shipboard systems otherwise designed for unblended HMFO. There is a real risk of incompatibility when the two fuels are mixed. Blending a mostly paraffinic-type distillate fuel (MGO or MDO) with a HMFO having a high aromatic content often correlates with poor solubility of asphaltenes. A blended fuel is likely to result in the precipitation of asphaltenes and/or highly paraffinic materials from the distillate material forming an intractable fuel tank sludge. Fuel tank sludge causes clogging of fuel filters and separators, transfer pumps and lines, build-up of sludge in storage tanks, sticking of fuel injection pumps (deposits on plunger and barrel), and plugged fuel nozzles. Such a risk to the primary propulsion system is not acceptable for a cargo ship in the open ocean.

Lastly blending of HMFO with marine distillate products (MGO or MDO) is not economically feasible. A blender will be taking a high value product (0.1% S marine gas oil (MGO) or marine diesel (MDO)) and blending it 7.5 to 1 with a low value high sulfur HMFO to create a final IMO/MARPOL compliant HMFO (i.e. 0.5% wt. S Low Sulfur Heavy Marine Fuel Oil—LSHMFO). It is expected that LSHMFO will sell at a lower price on a per ton basis than the value of the two blending stocks alone.

Processing of heavy oils. For the past several decades, the focus of refining industry research efforts related to the processing of heavy oils (heavy crude oils, bitumen, distressed oils, or residual oils) has been on upgrading the properties of these low value refinery process oils to create lighter oils with greater value. The challenge has been that heavy oils can be unstable (depending upon the source or process that created them) and contain high levels of sulfur, nitrogen, phosphorous, metals (especially vanadium and nickel) and asphaltenes. Much of the nickel and vanadium is in difficult to remove chelates with porphyrins. Vanadium and nickel porphyrins and other metal organic compounds are responsible for catalyst contamination and corrosion problems in the refinery. The sulfur, nitrogen, and phosphorous, are removed because they are well-known poisons for the precious metal (platinum and palladium) catalysts utilized in the processes downstream of the atmospheric or vacuum distillation towers.

The difficulties treating heavy oils, such as atmospheric or vacuum residual streams or thermally cracked oil, has been known for many years and has been the subject of considerable research and investigation. Numerous heavy oil conversion processes have been developed in which the goals are same, 1) create a more valuable, preferably distillate range hydrocarbon product; and 2) concentrate the contaminates such as sulfur, nitrogen, phosphorous, metals and asphaltenes into a form (coke, heavy coker residue, FCC slurry oil) for removal from the refinery stream. Well known and accepted practice in the refining industry is to increase the reaction severity (elevated temperature and pressure) to produce hydrocarbon products that are lighter and more purified, increase catalyst lifetimes and remove sulfur, nitrogen, phosphorous, metals and asphaltenes from the refinery stream.

It is also well known in these processes that the nature of the heavy oil feedstock has a significant influence upon the products produced, catalyst life, and ultimately the economic viability of the process. In a representative technical paper Residual-Oil Hydrotreating Kinetics for Graded Catalyst Systems: Effects of Original and Treated Feedstocks, is stated that "The results revealed significant changes in activity, depending on the feedstock used for the tests. The study demonstrates the importance of proper selection of the feedstocks used in the performance evaluation and screening of candidate catalyst for graded catalyst systems for residual-oil hydrotreatment." From this one skilled in the art would understand that the conditions required for the successful hydroprocessing of atmospheric residue are not applicable for the successful hydroprocessing of vacuum residue which are not applicable for the successful hydroprocessing of a visbreaker residue, and so forth. Successful reaction conditions depend upon the nature of the heavy oil feedstock. For this reason, modern complex refineries often have multiple hydroprocessing units, each unit being targeted on specific heavy oil hydrocarbon stream with a focus on creating the desirable and valuable light hydrocarbons and providing a product acceptable to the next downstream process.

A further difficulty in the processing of heavy oil and other heavy residual hydrocarbons is the inherent instability of these refinery streams. One of skill in the art understands there are many practical reasons each refinery stream is handled in isolation. One such reason is the unpredictable nature of the asphaltenes contained in each stream. Asphaltenes are large and complex hydrocarbons with a propensity to precipitate out of refinery hydrocarbon streams. One of skill in the art knows that even small changes in the components or physical conditions (temperature, pressure) can precipitate asphaltenes that were otherwise dissolved in solution. Once precipitated from solution, asphaltenes can quickly block vital lines, control valves, coat critical sensing devices (i.e. temperature and pressure sensors) and generally result in the severe and very costly disruption and shut down of a unit or the whole refinery. For this reason, it has been a long-standing practice within refineries to not blend intermediate product streams (such as atmospheric residue, vacuum residue, FCC slurry oil, etc. . . . ) and process each stream in separate reactors.

In summary, since the announcement of the MARPOL standards reducing the global levels of sulfur in HMFO, refiners of crude oil have had only limited success in the technical efforts to create a process for the production of a low sulfur substitute for HMFO. Despite the strong governmental and economic incentives and needs of the international marine shipping industry, refiners have little economic reason to address the removal of Environmental Contaminants from HMFOs. Instead, the global refining industry has been focused upon generating greater value from each barrel of oil by creating light hydrocarbons (i.e. diesel and gasoline) and concentrating the Environmental Contaminants into increasingly lower value streams (i.e. residues) and products (petroleum coke, HMFO). Shipping companies have focused on short term solutions, such as the installation of scrubbing units, or adopting the limited use of more expensive low sulfur marine diesel and marine gas oils as a substitute for HMFO. On the open seas, most if not all major shipping companies continue to utilize the most economically viable fuel, that is HMFO. There remains a long standing and unmet need for processes and devices that remove the Environmental Contaminants (i.e. organic and inorganic chemical species within the HMFO resulting in measurable amounts of sulfur, nitrogen, phosphorous, metals especially vanadium and nickel, iron, aluminum and silicon) from HMFO without altering the qualities and properties that make HMFO the most economic and practical means of powering ocean going vessels. Further there remains a long standing and unmet need for IMO compliant low sulfur (i.e. 0.5% wt. sulfur) or ultralow (0.10 wt. sulfur) HMFO that is also compliant with the bulk properties required by ISO 8217 Table 2, and be stable, and compatible and thus merchantable and suitable for its intended use in for the marine shipping industry.

SUMMARY

It is a general objective to reduce the Environmental Contaminants from a Heavy Marine Fuel Oil (HMFO) that is compliant with ISO 8217: 2017 Table 2 as a residual marine fuel in a multistage process that minimizes the changes in the desirable properties of the HMFO and minimizes the unnecessary production of by-product hydrocarbons (i.e. light hydrocarbons such as C1 to C4 hydrocarbons and wild naphtha, having a boiling point less than 150 F such as).

A first aspect and illustrative embodiment encompasses a multi-stage process for reducing the Environmental Contaminants in a Feedstock Heavy Marine Fuel Oil that is compliant with ISO 8217: 2017 Table 2 as a residual marine fuel except for the Environmental Contaminants (as defined herein), the process involving: contacting said Feedstock Heavy Marine Fuel Oil in a pre-treatment reaction unit selected from the group including: a) a sulfur absorption process unit containing a sulfur sorbent under sorbent desulfurization conditions; b) an oxidative desulfurizing process unit containing an oxidizing agent under oxidative desulfurization conditions; and c) a microwave treatment process unit under reactive conditions of microwave energy having a frequency selected from the group consisting of 915 MHz and 2450 MHz, in the presence of microwave absorbent material, any one of which gives a pre-treated Feedstock Heavy Marine Fuel Oil having a sulfur content lower than that of the Feedstock Heavy Marine Fuel Oil; mixing a quantity of the pre-treated Feedstock Heavy Marine Fuel Oil with a quantity of Activating Gas to give a Feedstock Mixture; contacting the Feedstock Mixture with one or more catalysts under hydroprocessing conditions suitable for achieving demetallization and/or desulfurizing to form from the Feedstock Mixture a Process Mixture containing at least the Product Marine Fuel Oil; receiving the Process Mixture and separating the Product Heavy Marine Fuel Oil from the other liquid components of the Process Mixture as well as from the gaseous components and by-product hydrocarbon components of the Process Mixture and, discharging the Product Heavy Marine Fuel Oil.

A second aspect and illustrative embodiment encompasses a process for reducing the Environmental Contaminants in HMFO that is compliant with ISO 8217: 2017 Table 2 as a residual marine fuel except for the Environmental Contaminants (as defined herein), in which the process involves: mixing a quantity of said Feedstock Heavy Marine Fuel Oil with a quantity of Activating Gas to give a Feedstock Mixture; contacting the Feedstock Mixture with one or more catalysts under hydroprocessing conditions suitable for achieving demetallization and/or desulfurizing to form a Process Mixture from the Feedstock Mixture, the Process Mixture containing at least a Product Heavy Marine Fuel Oil component; receiving the Process Mixture and separating the Product Heavy Marine Fuel Oil component of the Process Mixture from the bulk gaseous components and by-product hydrocarbons of the Process Mixture; receiving the Product Heavy Marine Fuel Oil component and contacting the Product Heavy Marine Fuel Oil component with post-treatment or polishing reactor selected from the group including: a) a sulfur absorption process unit containing a sulfur sorbent under sorbent desulfurization conditions; b) an oxidative desulfurizing process unit containing an oxidizing agent under oxidative desulfurization conditions; and c) a microwave treatment process unit under reactive conditions of microwave energy having a frequency selected from the group consisting of 915 MHz and 2450 MHz, in the presence of microwave absorbent material, subsequently separating any residual gaseous components and by-product hydrocarbon components from the Product Heavy Marine Fuel Oil; and, discharging the Product Heavy Marine Fuel Oil.

A third and fourth aspect and illustrative embodiment encompasses the devices to implement the above processes for reducing Environmental Contaminants in a Feedstock HMFO and producing a Product HMFO. The illustrative devices will embody the above illustrative processes on a commercial scale.

DETAILED DESCRIPTION

Figure 1:
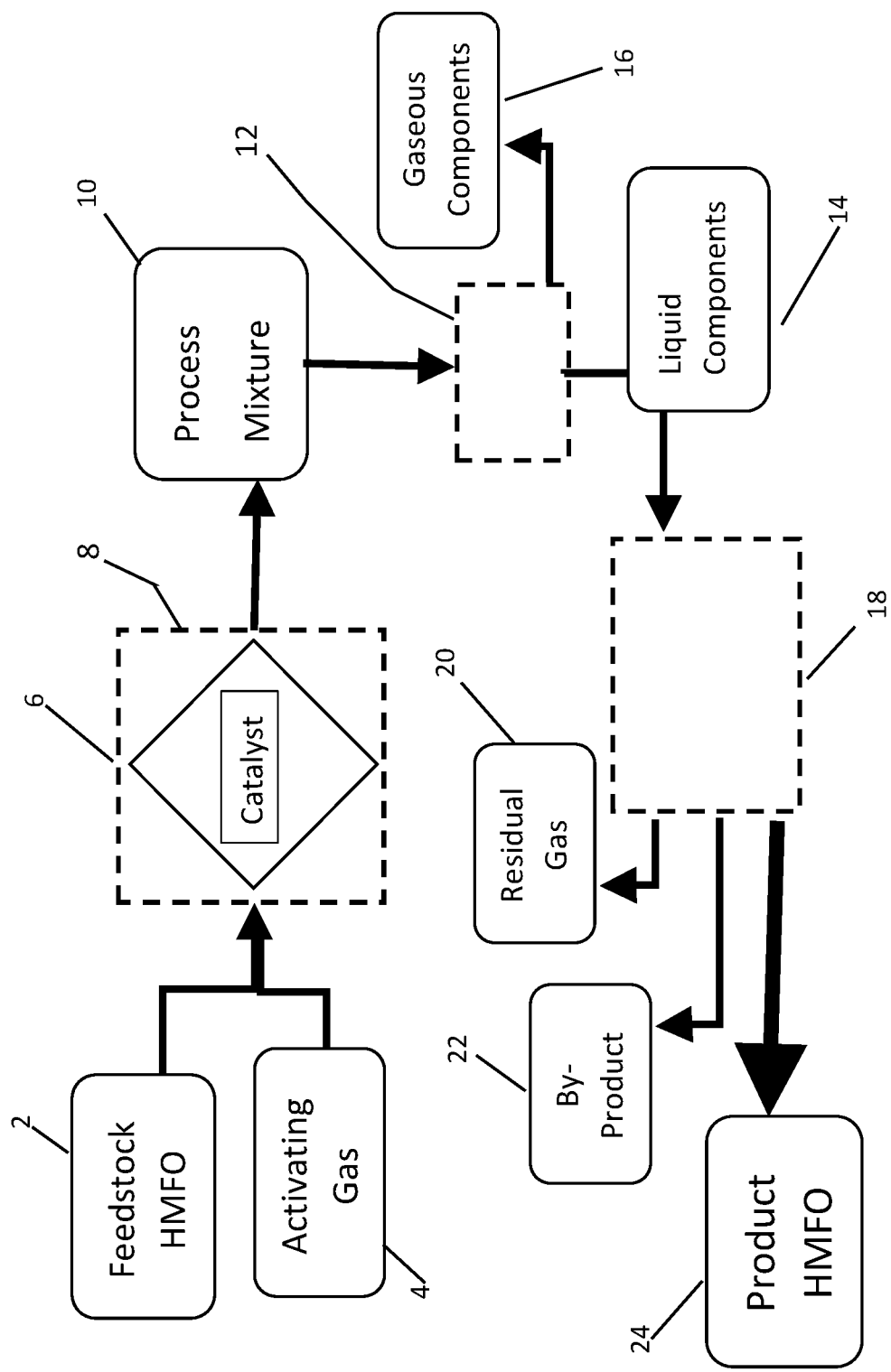
FIG. 1 is a process flow diagram of a core process to produce Product HMFO.

The inventive concepts as described herein utilize terms that should be well known to one of skill in the art, however certain terms are utilized having a specific intended meaning and these terms are defined below:

Heavy Marine Fuel Oil (HMFO) is a petroleum product fuel compliant with the ISO 8217:2017 Table 2 standards for the properties of residual marine fuel but may or may not be compliant with the required concentration levels of the Environmental Contaminants.

Environmental Contaminants are organic and inorganic chemical species of HMFO that result in the formation of $SO_x$, $NO_x$ and particulate materials upon combustion, more specifically organic and inorganic compounds within the HMFO resulting in measurable amounts of sulfur, nitrogen, phosphorus, vanadium, nickel, iron, aluminum and silicon.

Feedstock HMFO is a petroleum product fuel compliant with the ISO 8217:2017 Table 2 standards for the properties of residual marine fuels except for the concentration of Environmental Contaminants, preferably the Feedstock HMFO has a sulfur content greater than the global MARPOL standard of 0.5% wt. sulfur, and preferably and has a sulfur content (ISO 14596 or ISO 8754) between the range of 5.0% wt. to 1.0% wt. It should be noted that it is not a requirement of the Feedstock HMFO to be of merchantable quality as that term is used in this Application; one surprising and unexpected aspect of this invention is that hydroprocessing the Feedstock HMFO appears to impart properties of fungibility (i.e. compatibility, miscibility and stability over time with other marine fuels) to the Product HMFO that may not be necessarily present in the Feedstock HMFO.

Product HMFO is a petroleum product fuel compliant with the ISO 8217:2017 Table 2 standards for the properties of residual marine fuels and achieves a sulfur content lower than the global MARPOL standard of 0.5% wt. sulfur (ISO 14596 or ISO 8754), and preferably a maximum sulfur content (ISO 14596 or ISO 8754) between the range of 0.05% wt. to 1.0% wt. The Product HMFO has been found to be of merchantable quality as that term is used in this Application; that is one surprising and unexpected aspect of this invention is that hydroprocessing appears to impart properties of fungibility (i.e. compatibility, miscibility and stability over time with other marine fuels) to the Product HMFO, a property that may not be necessarily present in the Feedstock HMFO.

Activating Gas: is a mixture of gases utilized in the process combined with the catalyst to remove the Environmental Contaminants from the Feedstock HMFO. Activating Gas is defined in greater technical detail below.

Fluid communication: is the capability to transfer fluids (either liquid, gas or combinations thereof, which might have suspended solids) from a first vessel or location to a second vessel or location, this may encompass connections made by pipes (also called a line), spools, valves, intermediate holding tanks or surge tanks (also called a drum).

Merchantable quality: is a level of quality for a residual marine fuel so that the fuel is fit for the ordinary purpose it is intended to serve (i.e. serve as a residual marine fuel for a marine ship) and can be commercially sold as such, and that is fungible (i.e. compatible, miscable and stable over time) with other residual marine fuels and distillate marine fuels.

Bbl or bbl: is a standard volumetric measure for oil; 1 bbl=0.1589873 $m^3$; or 1 bbl=158.9873 liters; or 1 bbl=42.00 US liquid gallons.

Bpd: is an abbreviation for Bbl per day.

SCF: is an abbreviation for standard cubic foot of a gas; a standard cubic foot (at 14.73 psi and 60° F.) equals 0.0283058557 standard cubic meters (at 101.325 kPa and 15° C.).

The inventive concepts are illustrated in more detail in this description referring to the drawings, in which FIG. 1 shows the generalized block process flows for a core process of reducing the Environmental Contaminants in a Feedstock HMFO (as defined above and herein (i.e. compliant with ISO 8217: 2017 Table 2 as a residual marine fuel except for Environmental Contaminants level) and producing a Product HMFO (as defined above and herein). A predetermined volume of Feedstock HMFO (2) is mixed with a predetermined quantity of Activating Gas (4) to give a Feedstock Mixture. The Feedstock HMFO utilized generally complies with the physical and chemical properties for a residual marine fuel compliant with ISO8217:2017 Table 2, exclusive of the Environmental Contaminants. More particularly, when the Environmental Contaminate is sulfur, the concentration of sulfur in the Feedstock HMFO may be greater than 0.5 wt %, for example between the range of 5.0% wt. to 1.0% wt. The Feedstock HMFO should have physical properties that are required of an ISO8217:2017 Table 2 compliant residual marine fuel including but not limited to: a maximum of kinematic viscosity at 50° C. (ISO 3104) between the range from 180 $mm^2/s$ to 700 $mm^2/s$; and a maximum density at 15° C. (ISO 3675) between the range of 991.0 $kg/m^3$ to 1010.0 $kg/m^3$; and a CCAI between the range of 780 to 870; and a flash point (ISO 2719) no lower than 60.0 C. Other ISO 8217 Table 2 properties of the Feedstock HMFO that may also be connected to the formation of particulate material (PM) include: a maximum total sediment—aged (ISO 10307-2) of 0.10% wt.; a maximum carbon residue—micro method (ISO 10370) between the range of 18.00% wt. and 20.00% wt. and a maximum aluminum plus silicon (ISO 10478) content of 60 mg/kg. Environmental Contaminants of concern other than sulfur that may be present in the Feedstock HMFO over the ISO 8217 Table 2 requirements may include: vanadium, nickel, iron, aluminum and silicon are also substantially reduced by the processes of the present invention. One of skill in the art will appreciate that the vanadium content may serve as a general indicator of these other metallic Environmental Contaminants. In one preferred embodiment the vanadium content is ISO 8217: 2017 Table 2 compliant so the Feedstock MHFO has a maximum vanadium content (ISO 14597) between the range from 350 mg/kg to 450 ppm mg/kg. However, in another embodiment the vanadium content exceeds the requirements of ISO 8217: 2017 Table 2 and the Feedstock HMFO has a vanadium content (ISO 14597) in excess of 450 ppm mg/kg. and this is reduced to within acceptable limits by Applicant's process.

As for the properties of the Activating Gas, the Activating Gas should be selected from mixtures of nitrogen, hydrogen, carbon dioxide, gaseous water, and methane. The mixture of gases within the Activating Gas should have an ideal gas partial pressure of hydrogen (pH2) greater than 80% and preferably greater than 90% of the total pressure of the Activating Gas (P) and more preferably wherein the Activating Gas has an ideal gas partial pressure of hydrogen ($p_{H2}$) greater than 95% of the total pressure of the Activating Gas (P). It will be appreciated by one of skill in the art that the molar content of the Activating Gas is another criteria the Activating Gas should have a hydrogen mole fraction in the range between 80% and 100% of the total moles of Activating Gas, more preferably wherein the Activating Gas has a hydrogen mole fraction between 80% and 99% of the total moles of Activating Gas.

In one embodiment, the Feedstock Mixture (i.e. mixture of Feedstock HMFO and Activating Gas) is brought up to the process conditions of temperature and pressure and introduced into a first vessel, preferably a reactor vessel. The Feedstock Mixture is then contacted with one or more catalysts (8) under conditions suitable for removal of the Environmental Contaminants via hydrotreating, more specifically hydrodemetallization and/or hydrodesulfurization, but preferably not conditions of hydrocracking, to form a Process Mixture from the Feedstock Mixture.

The core process reactive conditions are selected so the ratio of the quantity of the Activating Gas to the quantity of Feedstock HMFO is 250 scf gas/bbl of Feedstock HMFO to 10,000 scf gas/bbl of Feedstock HMFO; and preferably between 2000 scf gas/bbl of Feedstock HMFO 1 to 5000 scf gas/bbl of Feedstock HMFO more preferably between 2500 scf gas/bbl of Feedstock HMFO to 4500 scf gas/bbl of Feedstock HMFO. The process conditions are selected so the total pressure in the first vessel is between of 250 psig and 3000 psig; preferably between 1000 psig and 2500 psig, and more preferably between 1500 psig and 2200 psig The process conditions are selected so the indicated temperature within the first vessel is between of 500° F. to 900 F, preferably between 650° F. and 850° F. and more preferably between 680° F. and 800° F. The process conditions are selected so the liquid hourly space velocity within the first vessel is between 0.05 oil/hour/$m^3$ catalyst and 1.0 oil/hour/$m^3$ catalyst; preferably between 0.08 oil/hour/$m^3$ catalyst and 0.5 oil/hour/$m^3$ catalyst; and more preferably between 0.1 oil/hour/$m^3$ catalyst and 0.3 oil/hour/$m^3$ catalyst to achieve deep desulfurization with product sulfur levels below 0.1 ppmw.

One of skill in the art will appreciate that the core process conditions are determined, in part by consideration of the hydraulic capacity of the unit. Exemplary hydraulic capacity for the treatment unit may be between 100 bbl of Feedstock HMFO/day and 100,000 bbl of Feedstock HMFO/day, preferably between 1000 bbl of Feedstock HMFO/day and 60,000 bbl of Feedstock HMFO/day, more preferably between 5,000 bbl of Feedstock HMFO/day and 45,000 bbl of Feedstock HMFO/day, and even more preferably between 10,000 bbl of Feedstock HMFO/day and 30,000 bbl of Feedstock HMFO/day The core process may utilize one or more catalyst systems selected from the group consisting of: an ebulliated bed supported transition metal heterogeneous catalyst, a fixed bed supported transition metal heterogeneous catalyst, and a combination of ebulliated bed supported transition metal heterogeneous catalysts and fixed bed supported transition metal heterogeneous catalysts. One of skill in the art will appreciate that a fixed bed supported transition metal heterogeneous catalyst will be the technically easiest to implement and is preferred. The transition metal heterogeneous catalyst comprises a porous inorganic oxide catalyst carrier and a transition metal catalyst. The porous inorganic oxide catalyst carrier is at least one carrier selected from the group consisting of alumina, alumina/boria carrier, a carrier containing metal-containing aluminosilicate, alumina/phosphorus carrier, alumina/alkaline earth metal compound carrier, alumina/titania carrier and alumina/zirconia carrier. The transition metal component of the catalyst is one or more metals selected from the group consisting of group 6, 8, 9 and 10 of the Periodic Table. In a preferred and illustrative embodiment, the transition metal heterogeneous catalyst is a porous inorganic oxide catalyst carrier and a transition metal catalyst, in which the preferred porous inorganic oxide catalyst carrier is alumina and the preferred transition metal catalyst is Ni—Mo, Co—Mo, Ni—W or Ni—Co—Mo. The process by which the transition metal heterogeneous catalyst is manufactured is known in the literature and preferably the catalysts are commercially available as hydrodemetallization catalysts, hydro-transition catalysts, desulfurization catalyst and combinations of these which might be pre-sulfided.

The Process Mixture (10) in this core process is removed from the first vessel (8) and from being in contact with the one or more catalyst and the Process Mixture is sent via fluid communication to a second vessel (12), preferably a gas-liquid separator or hot separators and cold separators, for separating the liquid components (14) of the Process Mixture from the bulk gaseous components (16) of the Process Mixture. The gaseous components (16) are treated beyond the battery limits of the immediate process. Such gaseous components may include a mixture of Activating Gas and lighter hydrocarbons (mostly methane, ethane and propane but some lighter components of wild naphtha such as butane or pentane, having a boiling point less than 150 F) that may have been unavoidably formed as part of the by-product hydrocarbons from the inventive process. For clarity, the by-product hydrocarbons are minimized to the extent possible by adjusting the process conditions to minimize hydrocracking (both catalytic and thermal). Preferably the volume of by-product hydrocarbons is less than 10% of the total material balance for the unit and more preferably less than 5% of the total material balance for the unit and even more preferably less than 3% of the total material balance for the unit.

The Liquid Components (16) of the Process Mixture in this core process are sent via fluid communication to a third vessel (18), preferably a fuel oil product stripper system, for separating any residual gaseous components (20) and residual by-product hydrocarbon components (22) from the Product HMFO (24). The residual gaseous components (20) may be a mixture of gases selected from the group consisting of: nitrogen, hydrogen, carbon dioxide, hydrogen sulfide, gaseous water, light hydrocarbons. This residual gas is treated outside of the battery limits of the immediate process, combined with other gaseous components (16) removed from the Process Mixture (10) in the second vessel (12). The liquid by-product hydrocarbon components, which may be condensable hydrocarbons unavoidably formed in the process (22) may be a mixture of hydrocarbons such a wild naphtha and light diesel having a boiling point less than 150° F., that for example can be sent to the gasoline motor fuel blending pool or sold as gasoline and diesel blending components on the open market. Any liquid by-product hydrocarbons which result from hydrocracking should be less than 15% wt., preferably less than 5% wt. and more preferably less than 3% wt. of the overall process mass balance for the unit.

The Product HMFO (24) resulting from the core process is discharged via fluid communication into storage tanks beyond the battery limits of the immediate process. The Product HMFO complies with ISO8217:2017 Table 2 as a residual marine fuel and has a maximum sulfur content (ISO 14596 or ISO 8754) compliant with the requirements of IMO 2020, that is a sulfur less than 0.5% wt. and preferably a sulfur content (ISO 14596 or ISO 8754) between the range of 0.05% wt. ppm and 0.5% wt. and more preferably a sulfur content (ISO 14596 or ISO 8754) between the range of 0.1% wt. and 0.5% wt. The vanadium content of the Product HMFO is also compliant with ISO 8217:2017 Table 2 as a residual marine fuel with a maximum vanadium content (ISO 14597) between the range from 350 mg/kg to 450 ppm mg/kg, preferably a vanadium content (ISO 14597) between the range of 200 mg/kg and 300 mg/kg and more preferably a vanadium content (ISO 14597) between the range of 50 mg/kg and 100 mg/kg.

The Feedstock HFMO should have physical properties other than the level of Environmental Contaminants that are ISO 8217: 2017 Table 2 compliant for a residual marine fuel including: a maximum kinematic viscosity at 50° C. (ISO 3104) between the range from 180 mm$^2$/s to 700 mm$^2$/s; a maximum density at 15° C. (ISO 3675) between the range of 991.0 kg/m$^3$ to 1010.0 kg/m$^3$; a CCAI is in the range of 780 to 870; a flash point (ISO 2719) no lower than 60.0° C. a maximum total sediment—aged (ISO 10307-2) of 0.10% wt.; a maximum carbon residue—micro method (ISO 10370) between the range of 18.00% wt. and 20.00% wt., and a maximum aluminum plus silicon (ISO 10478) content of 60 mg/kg.

The Product HMFO complies with ISO 8217:2017 Table 2 as a residual marine fuel and will have a sulfur content (ISO 14596 or ISO 8754) between 1% and 10% of the maximum sulfur content of the Feedstock Heavy Marine Fuel Oil. That is the sulfur content of the Product will be reduced by about 80% or greater when compared to the Feedstock HMFO. Similarly, the vanadium content (ISO 14597) of the Product Heavy Marine Fuel Oil is between 1% and 10% of the maximum vanadium content of the Feedstock Heavy Marine Fuel Oil. One of skill in the art will appreciate that the above data indicates a substantial reduction in sulfur and vanadium (as a proxy for all metals) content indicate a process having achieved a substantial reduction in the Environmental Contaminants from the Feedstock HMFO while maintaining the desirable properties of an ISO 8217: 2017 Table 2 compliant HMFO.

As a side note, the residual gaseous component is a mixture of gases selected from the group consisting of: nitrogen, hydrogen, carbon dioxide, hydrogen sulfide, gaseous water, light hydrocarbons. An amine scrubber will effectively remove the hydrogen sulfide content which can then be processed using technologies and processes well known to one of skill in the art. In one preferable illustrative embodiment, the hydrogen sulfide is converted into elemental sulfur using the well-known Claus process. An alternative embodiment utilizes a proprietary process for conversion of the Hydrogen sulfide to hydro sulfuric acid. Either way, the sulfur is removed from entering the environment prior to combusting the HMFO in a ship's engine. The cleaned gas can be vented, flared or more preferably recycled back for use as Activating Gas.

The by-product hydrocarbon components are a mixture of hydrocarbons (wild naphtha) (naphtha—diesel) having a boiling point below 150° F. which can be directed to the motor fuel blending pool or sold over the fence to an adjoining refinery or even utilized to fire the heaters and combustion turbines to provide heat and power to the process. These by product hydrocarbons which are the result of hydrocracking reactions should be less than 10% wt., preferably less than 5% wt. and more preferably less than 2% wt. of the overall process mass balance.

The Product HMFO (24) is discharged via fluid communication into storage tanks beyond the battery limits of the immediate process. We now turn the pre-treatment and post-treatment process by which the Feedstock HMFO or the Product HMFO respectively are de-sulfurized. The pre-treatment process reduces the initial sulfur load present in the Feedstock HMFO and possibly increasing the catalyst life and overall unit run time. The post-treatment process serves to polish the finished Product HMFO to achieve an extra margin of desulfurization and possible allow for sulfur levels well below the required 0.1 wt % sulfur of the IMO2020 requirements. Three different pre/post treatment processes are discussed in turn: Sulfur Absorption; Sulfur Oxidation; and Microwave Induced Desulfurization.

Figure 2:
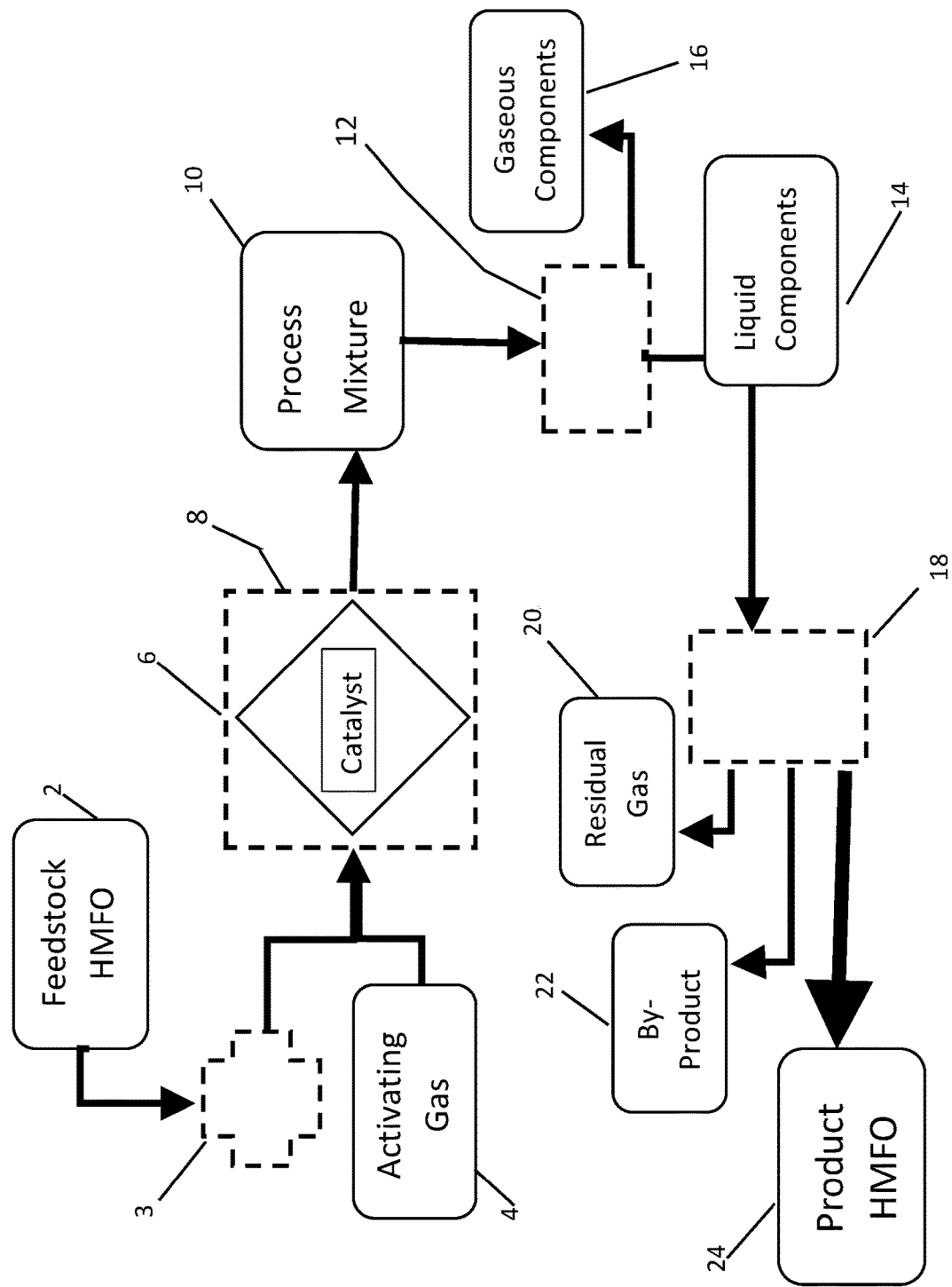
FIG. 2 is a process flow diagram of a multistage process utilizing a process unit to pre-treat the feedstock HMFO and a subsequent core process to produce Product HMFO.

Sulfur Absorption Process Unit: It will be appreciated by one of skill in the art, that the conditions utilized in the core process have been intentionally selected to minimize cracking of hydrocarbons, but at the same time remove significant levels of sulfur from the Feedstock HMFO. However, one of skill in the art will also appreciate that there may be certain "hard sulfur" compounds present in the Feedstock HMFO removal of which would require elevated temperatures, increased hydrogen pressures, longer residence times for removal all of which would tend to cause cracking of hydrocarbons and an adverse impact upon the desirable bulk properties of the Product HMFO. Process and systems for the removal of these "hard sulfur" compounds may be required to achieve an ultra-low sulfur (i.e. sulfur content (ISO 14596 or ISO 8754) less than 0.1% wt. and preferably lower than 0.05% wt. sulfur content (ISO 14596 or ISO 8754)) Product HMFO. These processes and systems must achieve this without substantially altering the desirable bulk properties (i.e. compliance with ISO 8217: 2017 exclusive of sulfur content) of the Product HMFO In the following description, items already described above as part of the core process have retained the same numbering and designation for ease of description. As show in FIG. 2, a sulfur absorption process unit 3 can be utilized to pre-treat the Feedstock HMFO prior to mixing with the Activating Gas 4 as part of the core process disclosed above. While simplistically represented in this drawing, the sulfur absorption process unit 3 may be complex and comprise multiple reactor units and regeneration units such as those disclosed in U.S. Pat. No. 7,182,918 or 717285 (incorporated herein by reference), however the sulfur absorption process unit may be as simple as a fixed bed, flow through/contact reactor vessel in which the HMFO simply contacts/flows over the sulfur sorbent. While a single a fixed bed, flow through/contact vessel may be used, it may be advantageous, and it is preferable to have multiple contact vessels in parallel with each other to allow for one unit to be active while a second or third unit are being reloaded with sulfur sorbent material. Such an arrangement involving multiple parallel contact vessels with accompanying pipes/switching valves, etc. . . . is well within the abilities of one of skill in the art of refinery process design and operation.

Turning now to the sulfur sorbent material utilized in the sulfur absorption process unit 3, in one illustrative embodiment, a non-regenerable sulfur sorbent may be utilized examples of which are described in greater detail in U.S. Pat. Nos. 4,846,962; 5,454,933; 5,843,300; 6,248,230; 7,799,211 all of which are incorporated herein by reference. These non-regenerable sulfur sorbents typically are porous and/or high surface area solids that preferentially absorb the more polar organosulfur and organonitrogen compounds present in the HMFO. Materials suitable for use as sulfur sorbents in the practice of the present invention include, but are not limited to, porous inert materials having pores large enough to adsorb beta and di-beta-substituted dibenzothiophene compounds of the feed. Non-limiting examples of such adsorbents include silica gel, activated alumina, zeolites, supported CoMo sorbents, activated coke, activated carbons, fuller's earth, ion exchange resins and mixtures of these. In some instances, the material may be activated by water hydration or by water solutions containing alkali or alkali earth metal cations present examples of which are disclosed in U.S. Pat. No. 5,843,300 which is incorporated herein by reference.

Adsorption of organic sulfur compounds by the sulfur sorbents disclosed above is conveniently affected by contacting at temperatures from about 25 to about 200 C. These conditions are selected so as to fluidized and/or make the HMFO sufficiently liquid like to flow, be pumpable, etc. . . . over the sulfur sorbent materials. Ideal this is done in a fixed or packed bed, however, a fluidized bed or ebulliated bed is preferable because such an arrangement allows for the continuous replacement of the sulfur sorbent. One of skill in the art of ebulliated beds/contacting systems is that the solid particles must be of sufficient size to be separated from the flow of feedstock HMFO. By balancing the viscosity of the HMFO (which is correlated to temperature) and size and density of the sulfur sorbent particles, one can achieve a steady state of continuous flow of HMFO and achieve sulfur loaded particle separation.

It is believed that the use of these types of non-regenerable sulfur sorbent materials extract at least a portion of the naturally polar compounds that have a significant negative effect on the subsequent processing of the HMFO. It is also believed that because this step of the process is conducted under very modest conditions (i.e. moderately elevated temperatures) the sulfur sorbent materials will have minimal to no impact upon the physical properties of the HMFO feed. It is further believed that by pre-treating the HMFO prior to the primary desulfurization process, the overall sulfur load is distributed and reduced which in turn will allow for previously unobtainable desulfurization levels in HFMO, with minimal cracking and minimal changes to the bulk properties, to be achieved.

In another illustrative embodiment, a regenerable sulfur sorbents may be utilized. These regenerable sulfur sorbents typically include a metal oxide component (e.g., ZnO) and a promoter metal component (e.g., Ni). When contacted with a sulfur containing HMFO at elevated temperature and pressure, the promoter metal and metal oxide components of the regenerable sorbent are believed to cooperate in removing at least a portion of the sulfur from the HMFO and store the removed sulfur on/in the sorbent resulting in the formation of a metal sulfide (e.g., ZnS). The resulting "sulfur-loaded" sorbent may be discarded or may be regenerated by contacting the sulfur-loaded sorbent with an oxygen-containing stream at elevated temperature and reduced pressure. During such regeneration, at least a portion of the metal sulfide in the sulfur-loaded sorbent is returned to the metal oxide (e.g., ZnO) via reaction with the oxygen-containing regeneration stream, thereby providing a sulfur sorbent than can be reused.

The promoter metal component of the regenerable sulfur sorbent particulates preferably comprises a promoter metal selected from a group consisting of nickel, cobalt, iron, manganese, tungsten, silver, gold, copper, platinum, zinc, tin, ruthenium, molybdenum, antimony, vanadium, iridium, chromium, palladium. More preferably, the reduced-valence promoter metal component comprises nickel as the promoter metal. As used herein, the term "reduced-valence" when describing the promoter metal component, shall denote a promoter metal component having a valence which is less than the valence of the promoter metal component in its common oxidized state. More specifically, the reduced sulfur sorbent particulates employed in sulfur absorption process unit 3 should include a promoter metal component having a valence which is less than the valence of the promoter metal component of the regenerated (i.e., oxidized) solid sorbent particulates exiting a regenerator unit (not shown). Most preferably, substantially all of the promoter metal component of the reduced solid sorbent particulates has a valence of 0.

The sulfur sorbent particulates containing a promoter metal may be contacted with a hydrogen-containing reducing stream prior to use. The hydrogen-containing reducing stream preferably comprises at least 50 mole percent hydrogen with the remainder being cracked hydrocarbon products such as, for example, methane, ethane, and propane. More preferably, the hydrogen-containing reducing stream comprises at least about 70 mole percent hydrogen, and most preferably at least 80 mole percent hydrogen. The reducing conditions are sufficient to reduce the valence of the promoter metal component of the solid sorbent particulates.

The sulfur sorbent compositions to be used in the processes disclosed herein may be agglomerates and utilized in fixed bed applications. However, fluidized bed reactors provide a number of advantages over fixed bed reactors, it may be desirable to contact the HMFO with the sulfur sorbents in a fluidized or ebulliated bed reactor. One significant advantage of using such reactors in systems employing regenerable sulfur sorbents is the ability to continuously regenerate the sulfur sorbent particulates after they have become "loaded" with sulfur. Such regeneration can be performed by continuously withdrawing sulfur-loaded sorbent particulates from the desulfurization reactor and transferring the sulfur-loaded sorbent particulates to a separate regeneration vessel for contacting with an oxygen-containing regeneration stream. When the sulfur-loaded sorbent particulates are transferred from the desulfurization reactor to the regenerator, they are transferred from a high temperature, high pressure, hydrocarbon environment (in the reactor) to a high temperature, low pressure, oxygen environment (in the regenerator).

The hydrocarbon-containing fluid stream contacted with the reduced solid sorbent particulates in sulfur absorption process unit 3 preferably comprises a sulfur-containing hydrocarbon and hydrogen. The molar ratio of the hydrogen to the sulfur-containing hydrocarbon charged to sulfur absorption process unit 3 is preferably in the range of from about 0.1:1 to about 3:1, more preferably in the range of from about 0.2:1 to about 1:1, and most preferably in the range of from 0.4:1 to 0.8:1.

The solid sorbent particulates are contacted with the upwardly flowing gaseous hydrocarbon-containing fluid stream under a set of desulfurization conditions sufficient to produce a desulfurized hydrocarbon and sulfur-loaded solid sorbent particulates. The flow of the hydrocarbon-containing fluid stream is sufficient to fluidize the bed of solid sorbent particulates located in sulfur absorption process unit 3. The desulfurization conditions in sulfur absorption process unit 3 include temperature, pressure, weighted hourly space velocity (WHSV), and superficial velocity. When the solid sorbent particulates are contacted with the hydrocarbon-containing stream in sulfur absorption process unit 3 under desulfurization conditions, sulfur compounds, particularly organosulfur compounds, and some organonitrogen compounds present in the hydrocarbon-containing fluid stream are removed from such fluid stream. At least a portion of the sulfur removed from the hydrocarbon-containing fluid stream is employed to convert at least a portion of the zinc oxide of the reduced solid sorbent particulates into zinc sulfide.

When using either type of sulfur sorbent, the fluid effluent from sulfur absorption process unit 3 need not have all or even substantially all of the sulfur compounds in the fluid feed removed. Rather the concept is removing at least a portion of the sulfur compounds to reduce the overall sulfur load on the subsequent process units. In this way one may be able to achieve a level of sulfur reduction for a HMFO not previously achieved while at the same time minimizing the cracking of hydrocarbons and maintaining the desirable bulk properties of the HMFO. In one illustrative embodiment, the fluid effluent from sulfur absorption process unit 3 preferably contains less than about 90 weight percent of the amount of sulfur in the fluid feed charged to sulfur absorption process unit 3, more preferably less than about 75 weight percent of the amount of sulfur in the fluid feed, and most preferably less than 50 weight percent of the amount of sulfur in the fluid feed.

Figure 3:
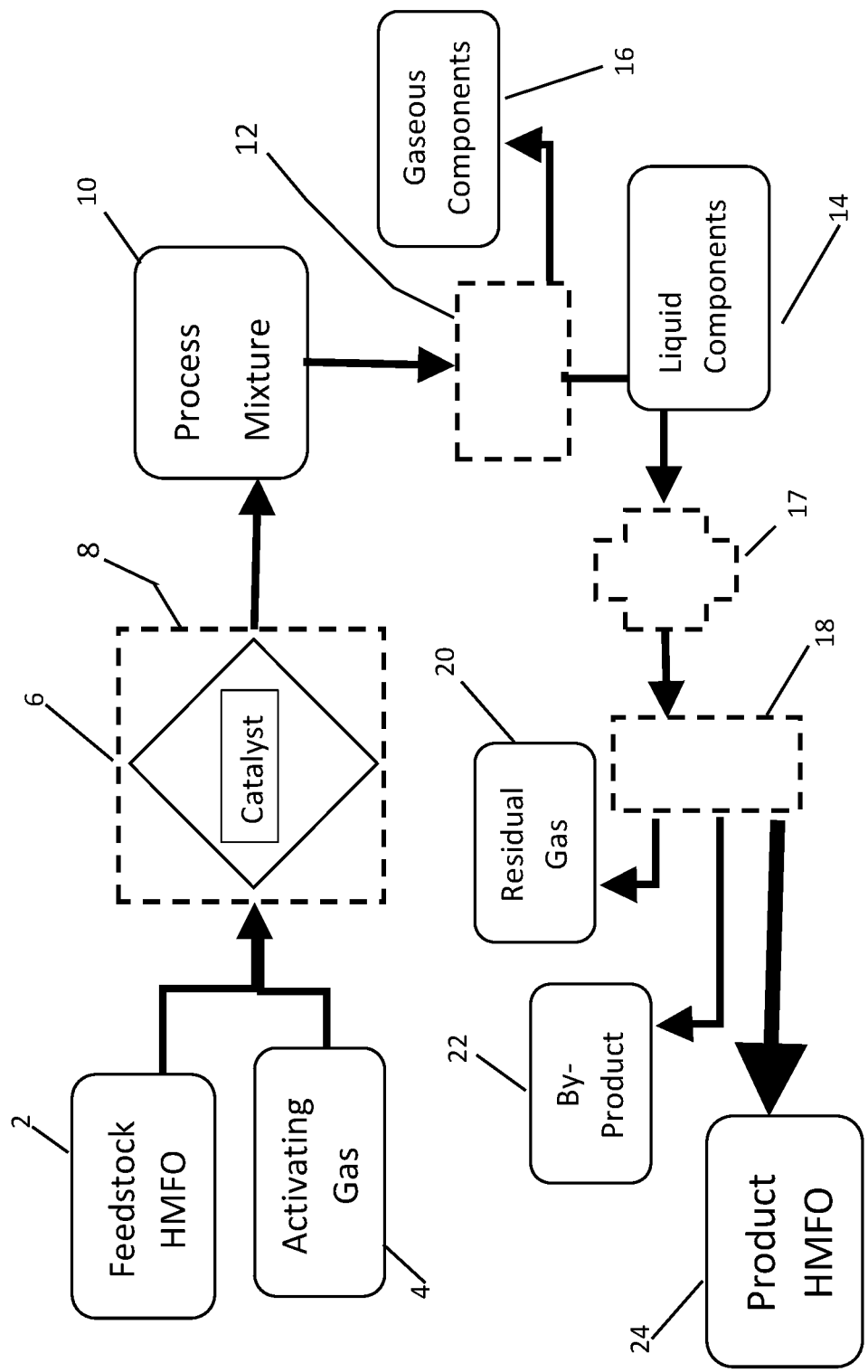
FIG. 3 is a process flow diagram of a multi-stage process utilizing a core process followed by a subsequent process unit or polishing reactor to produce Product HMFO.

An alternative illustrative embodiment is shown in FIG. 3 in which a sulfur absorption process unit 17 is utilized subsequent to the core sulfur removal process step, but prior to the separation of the Product HMFO 24 from any Residual Gas 20 and By-Product 22 (i.e. mostly C1-C4 hydrocarbons, and wild naphtha boiling below 150 F). In such a configuration the sulfur absorption process unit effectively acts as a polishing unit with the goal of removing "hard sulfur" compounds present in the HMFO that are not removed under the conditions in the core sulfur removal process step. As with the pre-treatment sulfur absorption process unit described above, the conditions in this post-treatment sulfur absorption process unit are moderate. It is believed that because this step of the process is conducted under very modest conditions (i.e. moderately elevated temperatures sufficient to make the HMFO liquid-like) the sulfur sorbent materials used in this process will have minimal to no impact upon the physical properties of the product HMFO. In this way one may be able to achieve a level of sulfur reduction for a HMFO not previously achieved while at the same time minimizing the cracking of hydrocarbons and maintaining the desirable bulk properties of the HMFO. In one illustrative embodiment, the fluid effluent from sulfur absorption process unit 17 preferably contains less than about 90 weight percent of the amount of sulfur in the fluid feed charged to sulfur absorption process unit 17, more preferably less than about 75 weight percent of the amount of sulfur in the fluid feed, and most preferably less than 50 weight percent of the amount of sulfur in the fluid feed.

Oxidative Desulfurizing Process Unit: It will be appreciated by one of skill in the art, that the conditions utilized in the core process have been intentionally selected to minimize cracking of hydrocarbons, but at the same time remove significant levels of sulfur from the Feedstock HMFO. However, one of skill in the art will also appreciate that there may be certain "hard sulfur" compounds present in the Feedstock HMFO removal of which would require elevated temperatures, increased hydrogen pressures, longer residence times for removal all of which would tend to cause cracking of hydrocarbons and an adverse impact upon the desirable bulk properties of the Product HMFO. Process and systems for the removal of these "hard sulfur" compounds may be required to achieve an ultra-low sulfur (i.e. sulfur content (ISO 14596 or ISO 8754) less than 0.1% wt. and preferably lower than 0.05% wt. sulfur content (ISO 14596 or ISO 8754)) Product HMFO. These processes and systems must achieve this without substantially altering the desirable bulk properties (i.e. compliance with ISO 8217: 2017 exclusive of sulfur content) of the Product HMFO In the following description, items already described above as part of the core process have retained the same numbering and designation for ease of description. As show in FIG. 2, an oxidative desulfurizing process unit 3 can be utilized to pre-treat the Feedstock HMFO prior to mixing with the Activating Gas 4 as part of the core process disclosed above. While simplistically represented in this drawing, the oxidative desulfurizing process unit 3 may be complex and comprise multiple reactor units and liquid/solid or liquid/liquid separation units, however the oxidative desulfurizing process unit may be as simple as a fixed bed, flow through/contact reactor vessel in which the HMFO simply contacts/flows over an oxidizing agent supported on an inert solid. While a single oxidative desulfurizing process unit may be used, it may be advantageous, and it is preferable to have multiple oxidative desulfurizing process unit in parallel with each other to allow for one unit to be active while a second or third unit are being reloaded with oxidizing agent material, the oxidizing agent is being regenerated, or the unit is undergoing turnaround in preparation for use. Such an arrangement involving multiple parallel contact vessels with accompanying pipes/switching valves, etc. . . . is well within the abilities of one of skill in the art of refinery process design and operation.

In an embodiment of the present invention, the HMFO stream is contacted with an oxidant to convert the organo-sulfur compounds into oxidized organo-sulfur compounds such as sulfones and sulfoxides. The resulting HMFO stream containing the oxidized sulfur compounds can then be separated from the oxidizing agent (i.e. by physical separation or decomposition of any residual oxidizing agent) and followed by removal of the oxidized organo-sulfur compounds. This last step may involve extractive contact with a selective solvent having a greater selectivity for the oxidized sulfur compounds than for the HMFO to produce a solvent containing at least a portion of the oxidized sulfur compounds and a HMFO stream having a reduced concentration of oxidized sulfur compounds; or alternatively it may simply involve heating the HMFO stream containing the oxidized sulfur compounds to cause the thermal decomposition of the sulfones and sulfoxides to gaseous sulfur compounds (i.e. hydrogen sulfide and/or sulfur dioxides) and residual hydrocarbon materials which are readily separated/treated using known methods.

Turning now to the oxidizing agent material utilized in the oxidative desulfurizing process unit 3, a number of oxidizing agents may be useful in the first or oxidative desulfurization step. The oxidizing agent may be selected from the group consisting of a gaseous oxidant, an organic oxidant, an inorganic oxidant, a bio-oxidant or combinations of these. When used in combination, a mixture of two oxidizing agents may be used in the same reactor, for example, gaseous oxidant (ozone or oxygen) and organic oxidizing agent or inorganic oxidizing agent. Alternatively, the different oxidizing agents can be utilized in a cascading series of reactors that are complimentary to each other. For example, an initial stage of may be conducted using a bio-oxidizing agent and a subsequent stage with a stronger oxidizing agent (i.e. gaseous oxidant, an organic oxidant, an inorganic oxidant, or combinations of these). For example, the combination of Ozone and t-butylhydroperoxide as a pair of oxidizing agents is utilized to oxidize sulfur compounds in diesel as disclosed in U.S. Pat. No. 9,365,780 (the contents of which are incorporated herein by reference). Optimization of the process and compatibility aspects can be determined by one of skill in the art by routine and systematic testing of HMFO material and oxidizing agents.

In one embodiment, the oxidizing agent can be a gaseous oxidant selected from the group consisting of ozone, nitrogen oxides, molecular oxygen, air, oxygen depleted air (i.e. air in which the concentration of oxygen can be less than about 21 vol. %). When oxygen is utilized, it may be desirable to include a promoter material such as metal from group 5A and Group 8 of the Periodic Table or their salts or oxides, more specifically platinum, palladium, nickel, and vanadium. These promotor materials are preferably supported on suitable materials, for example alumina, silica or activated carbon. Where the support material has cracking tendencies, such as alumina, the support material may be first treated with alkali metal hydroxides or ammonia compounds to deactivate the support. One of skill in the art will appreciate that the use of such promotors will improve the selective oxidation step in a shorter time period and/or lower temperature and milder conditions. In one embodiment, the oxidizing step is conducted in a temperature range of 80° C. to 180° C., conditions under which the HMFO is sufficiently fluid like to be pumped, stirred, etc. . . . and the amount of gaseous oxidant is in the range of 1 and 6 active oxygen equivalents to each sulfur molecule equivalents in the feedstock. Preferably when oxygen or air is utilized, the temperature will lie between the range of 130° C. and 180° C. and the reaction period will be between 2 hours and 20 hours.

In another embodiment the oxidizing agent can be an organic oxidant selected from the group consisting of alkyl hydroperoxides, such as tert-butyl hydroperoxide (TBHP), cumyl hydroperoxide (CHP) and/or ethylbenzene hydroperoxide (EBHP); peroxides, such as kerosene peroxide; percarboxylic acids, such as peracetic acid. In some instances when an organic oxidizing agent is utilized, a suitable catalyst which is capable of reacting sulfur compounds and organic oxidizing agent to produce sulfones may be utilized. A preferred suitable catalyst when alkyl hydroperoxides are utilized may be selected from the group consisting of: heterogeneous titanium(IV) catalyst having the general formula $Ti(OOR)(OH)(OR')_2$; R is selected from the group consisting of hydride, alkyl groups, aryl groups, and/or alkylaryl groups; and wherein R' is selected from the group consisting of ethylene glycol, glycerol, sorbitol, xylitol and/or mixtures thereof; a molybdenum compound, such as $MoO_3$, $MgMoO_4$ supported on an inorganic oxide support such as alumina, silica, MgO, $ZrO_2$ and ZnO. When such combinations are utilized, the operating conditions in the organic sulfur oxidation zone can include a pressure from about 100 kPa (0 psig) to about 3550 kPa (500 psig) and a temperature from about 49° C. (120° F.) to about 180° C. (356° F.).

In another embodiment the oxidizing agent can be an inorganic oxidant is selected from the group consisting of aqueous ferrate solution, aqueous permanganate solution. In such an embodiment, simple contacting of the HMFO with an aqueous solution of the oxidizing agent will be sufficient to cause the oxidation of the organo-sulfur compounds. However, this must be done under carefully controlled circumstances to avoid excess oxidizing agent being present and potentially adversely impacting the non-sulfur containing components of the HMFO. A counter-current reactor may be useful in these instances as it will limit the contact time and allow the careful control and monitoring of the concentration of oxidizing agent relative to the on-line measured concentration of sulfur compounds. That is to say the control system should be able to automatically monitor the level of sulfur compounds present in the feed HMFO on a real-time or nearly real time basis and use this data to adjust the amount of oxidizing agent introduced into the reactor. Similar feed properties/reactant feed level control loops are well known to and well within the abilities of one of skill in the art to implement.

In another embodiment the oxidizing agent can be a bio-oxidizing agent in aqueous solution such as a microorganisms selected from the group which is capable of a selective oxidation of the sulfur in organic sulfur compounds, to the sulfoxide and/or sulfone form, without concomitant oxidation of other components of the HMFO. Microorganisms known to perform selective sulfur oxidation include *Rhodococcus* (previously identified as *Arthrobacter*) strains ATCC 55309 and ATCC 55310 (U.S. Pat. No. 5,607,857), *Rhodococcus rhodochrous* strain ATCC 53968 (U.S. Pat. No. 5,104,801) *Bacillus sphaericus* strain ATCC 53969 (U.S. Pat. No. 5,002,888), *Rhodococcus erythropolis* strains N1-36 and D-1 (Wang, P. and Krawiec, S. (1994); microorganisms reported to desulfurization of dibenzothiophene to 2-hydroxybiphenyl. Arch. Microbiol. 161, 266-271, Izumi, Y., Ohshiro, T., Ogino, H., Hine, Y. and Shimao, M. (1994); selective desulfurization of dibenzothiophene by *Rhodococcus erythropolis* D-1. Appl. Environ. Microbiol. 60, 223-226); *Corynebacterium* strain SY1 (Omori, T., Monna, L., Saiki, Y., and Kodama, T. (1992); desulfurization of dibenzothiophene by *Corynebacterium* sp. Stain SY1. App. Envir. Micro. 58, 911-915) and *Brevibacterium* strain DO (van Afferden, M., Schacht, S., Klein, J. and Truper, H. G. (1990); ° radation of dibenzothiophene by *Brevibacterium* sp. DO. Arch. Microbiol. 153, 324-328). Preferable examples include *Rhodococcus* species ATCC 55309, *Rhodococcus* species ATCC 55310, or combinations thereof. When a bio-oxidizing agent is utilized the HMFO material to be desulfurized will be at mild temperatures (0-100° C.), in the presence of oxygen, brought into contact with the biocatalysts (either whole cell, cell fraction, or enzyme preparation), contained within an aqueous buffer containing mineral salts, and if required a carbon, nitrogen and phosphorous source, and if required cofactors (e.g., NAD(P)H), for a sufficiently long period of time to allow the conversion of all, or part of, the organic sulfur into the corresponding sulfoxides and sulfones. Following the bio-oxidation step, the treated HMFO is separated from the biocatalysts, by any of a variety of standard techniques including gravity separation, gravity separation facilitated by heating, gravity separation facilities by an applied electrical potential (as in crude oil electrostatic desalters), and centrifugation. Alternatively, the bio-oxidizing agent may be immobilized in a gel or solid support, in which case the HMFO will be brought in contact with the bio-oxidizing agent and subsequently separated via an outlet port from the reactor without the need for further separation steps. Depending upon the nature of any subsequent process for removal of the oxidized sulfur compounds, separation of water and/or water bio-oxidizing agent from the HMFO may not be required. For example, if thermal decomposition is utilized, the heat will not only decompose the oxidized sulfur compounds, but also effectively remove and/or sterilize the HMFO of any active microbial content.

Following the oxidative desulfurization step, the sulfones and sulfoxides will be removed from the HMFO material. A range of potential removal processes are known in the art including: thermal decomposition; solvent extraction; caustic wash; contact with solid absorbents, each of which is described below. One of skill in the art will appreciate that one or more of these methods may be utilized to achieve the optimal removal of the oxidized sulfur compounds from the HMFO, it is contemplated that a combinations of these steps may be utilized. As noted above, while simplistically shown in the Figures, the removal of the oxidized sulfur compounds from the HMFO may involve stirred tank reactors, thermal reactors, liquid solid separators such centrifuges or settling tanks, concurrent or counter current contacting or extraction processes all of which are conventional and readily apparent to one of skill in the art of chemical and refining processes based on routine lab scale pilot testing.

In one embodiment thermal decomposition may be utilized subsequent to the oxidative desulphurization step. Preferably this step is carried out at temperatures above, 200° C. and preferably above 250° C. and more preferably in the 300-400° C. range. Under these conditions the oxidized sulfur compounds are thermally decomposed into organic components (mostly aliphatic and aromatic hydrocarbons) and gaseous sulfur compounds, such as sulfur dioxide or hydrogen sulfide. The thermal decomposition step may be carried out in the presence of promoter materials such as ferric oxide on alumina, bauxite, silica, silica-alumina and the like. A small amount of inert carrier gas may be utilized to ° as the HMFO and remove the gaseous sulfur components being liberated. In one such embodiment, the thermal decomposition takes place at the same time as the by-product hydrocarbons (i.e. lights and wild naphtha hydrocarbons boiling below 150 F) and other entrained gases are separated from the Product HMFO. In another embodiment a tube furnace or similar heated flow through reactor will be utilized to allow for a continuous operation and flow of HMFO material. One of skill in the art will appreciate that the generation of sulfur dioxides and/or hydrogen sulfide will require scrubbers to prevent the emissions of such compounds into the environment. Such systems are well known to one of skill in the art and need to be described in detail herein.

In another illustrative embodiment, solvent extraction using polar organic fluids such as methanol, acetone, acetonitrile, dimethylformamide (DMF) or similar fluids that are not generally soluble in HMFO can be utilized in removing oxidized sulfur compounds from the HMFO. Selection of the appropriate polar extraction fluid will be simply a matter of lab testing to determine the optimal extraction fluid. In one embodiment, it is expected that methanol will be the most economical and useful organic polar fluids for extracting the oxidized sulfur compounds from the HMFO. In another alternative embodiment, ionic liquids may be utilized as the extraction medium. Generally, ionic liquid materials are non-aqueous, organic salts composed of a cation and an anion. These materials have relatively low melting points when compared to ionic solids (such a table salt or other common ionic solids), often below 100° C., undetectable vapor pressure, and good chemical and thermal stability. The cationic charge of the salt is localized over hetero atoms, such as nitrogen, phosphorous, and sulfur and the anions may be any inorganic, organic, or organometallic species. The benefits of the ionic liquid extraction technology for the extraction of the oxidized sulfur compounds from the HMFO are very mild process conditions (i.e. conditions that do not alter the bulk properties of the ISO 8217 2017 Table 2 compliant feedstock HMFO), high efficiency in removal of oxidized sulfur compounds from the HMFO, and an environmental benign process. An ionic liquid can be selected from the group liquid and semi-liquid salts having the general formula Q+A− wherein Q+ (also known as the cationic component) for example quaternary ammonium cations and quaternary phosphonium cations and A− represents the anionic component which may be any anion that forms a liquid or semi-liquid salt at or below the temperature used in the extraction step which should be preferably below 300° C. and more preferably below about 100° C. A wide range of ionic liquids may be useful in extracting oxidized sulfur compounds from the HMFO including but not limited to ionic liquids consists essentially of imidazolium ionic liquids, pyridinium ionic liquids, phosphonium ionic liquids, lactamium ionic liquids, ammonium ionic liquids, pyrrolidinium ionic liquids, and combinations thereof. In still another embodiment, the ionic liquid is selected from the group consisting of imidazolium ionic liquids, pyridinium ionic liquids, phosphonium ionic liquids, lactamium ionic liquids, ammonium ionic liquids, pyrrolidinium ionic liquids, and combinations thereof. Imidazolium, pyridinium, lactamium, ammonium, and pyrrolidinium ionic liquids have a cation comprising at least one nitrogen atom. Phosphonium ionic liquids have a cation comprising at least one phosphorous atom. This extraction process utilizing either polar organic liquids or ionic liquids may be conducted using batch extraction, concurrent or counter current extraction techniques well known to one of skill in the art. Regeneration or recovery of the extracting liquid will depend upon the nature of the fluid utilized, however with methanol a simple distillation may be useful and with ionic liquids regeneration by exposure to a reducing environment such a hydrogen gas followed by separation may be utilized.

In another embodiment, an aqueous caustic containing wash fluid contacts the oxidized HMFO with caustic inorganic oxides (alkali oxides and hydroxides) which may be dissolved or supported on inert supports. The contact between the oxidized HMFO and the caustic aqueous solution may be facilitated by contacting caustic with hanging fiber barrier (such as that disclosed in U.S. Pat. No. 8,574,429, the contents of which are incorporated herein by reference), capillary tubes, or microemulsion blender/contactor all of which are known to one of skill in the art of mixing aqueous solutions with heavy/viscous hydrocarbons. In such instances, it may be desirable to include a phase transfer agent such as polyol or other similar surfactant utilized in the water washing of crude oil in a desalter. Alternatively, the caustic material can be immobilized and supported on an inert material such as caustic treated alumina or silica.

In another illustrative embodiment, absorbents which selectively adsorb sulfones and sulfoxides may also be utilized to remove the oxidized sulfur compounds from the HMFO in the process of the present invention. Preferred adsorbents include silica gel, zeolites and alumina. Preferred operating conditions in an adsorption zone include a pressure from about 100 kPa (14.7 psig) to about 3550 kPa (500 psig) and a temperature from about 40° C. (104° F.) to about 200° C. (392° F.). Regeneration of spent adsorbent containing sulfones is preferably conducted by contacting the spent adsorbent with a suitable desorbant including pentane, hexane, benzene, toluene, xylene and admixtures thereof, for example. Once the sulfone is removed from the spent adsorbent, the regenerated adsorbent containing a reduced level of sulfone may be reused to adsorb additional sulfone. The flow of streams may be up flow or down flow through vessels.

Without regard to the type of oxidizing agent/removal process utilized in the oxidative desulfurizing unit, the fluid effluent from oxidative desulfurizing process unit 3 need not have all or even substantially all of the sulfur compounds in the HMFO feed removed. Rather the concept is remove at least a portion of the sulfur compounds to reduce the overall sulfur load on the subsequent process units. In this way one may be able to achieve a level of sulfur reduction for a HMFO not previously achieved while at the same time minimizing the cracking of hydrocarbons and maintaining the desirable bulk properties of the HMFO. In one illustrative embodiment, the fluid effluent from oxidative desulfurizing process unit 3 preferably contains less than about 90 weight percent of the amount of sulfur in the fluid feed charged to oxidative desulfurizing process unit 3, more preferably less than about 75 weight percent of the amount of sulfur in the fluid feed, and most preferably less than 50 weight percent of the amount of sulfur in the fluid feed.

An alternative illustrative embodiment is shown in FIG. 3 in which an oxidative desulfurizing process unit 17 is utilized subsequent to the core sulfur removal process step, but prior to the separation of the Product HMFO 24 from any Residual Gas 20 and By-Product 22 (i.e. mostly C1-C4 hydrocarbons, and wild naphtha boiling below 150 F). In such a configuration the oxidative desulfurizing process unit effectively acts as a polishing unit with the goal of removing "hard sulfur" compounds present in the HMFO that are not removed under the conditions in the core sulfur removal process step. As with the pre-treatment oxidative desulfurizing process unit described above, the conditions in this post-treatment oxidative desulfurizing process unit are moderate. It is believed that because this step of the process is conducted under very modest conditions (i.e. moderately elevated temperatures sufficient to make the HMFO liquid-like) the oxidizing agent materials used in this process will have minimal to no impact upon the physical properties of the product HMFO. In this way one may be able to achieve a level of sulfur reduction for a HMFO not previously achieved while at the same time minimizing the cracking of hydrocarbons and maintaining the desirable bulk properties of the HMFO. In one illustrative embodiment, the fluid effluent from oxidative desulfurizing process unit 17 preferably contains less than about 90 weight percent of the amount of sulfur in the fluid feed charged to oxidative desulfurizing process unit 17, more preferably less than about 75 weight percent of the amount of sulfur in the fluid feed, and most preferably less than 50 weight percent of the amount of sulfur in the fluid feed.

Microwave Treatment Process Unit: It will be appreciated by one of skill in the art, that the conditions utilized in the core process have been intentionally selected to minimize cracking of hydrocarbons but remove significant levels of sulfur from the Feedstock HMFO. However, one of skill in the art will also appreciate there may be certain compounds present in the Feedstock HMFO removal of which would have a positive impact upon the desirable bulk properties of the Product HMFO. These processes and systems must achieve this without substantially altering the desirable bulk properties (i.e. compliance with ISO 8217:2017 Table 2 exclusive of sulfur content) of the Product HMFO. Irradiation of materials using microwaves (MW) is used in several industrial applications. Various articles and patents claim successful use of microwave technologies (MW) applied to the processing of petroleum and to accelerate chemical processes which require heating. U.S. Pat. No. 6,106,675; and US. Patent Application US2011/0155558 specify various methods of treating petroleum hydrocarbons with microwaves. U.S. Pat. Nos. 8,403,043 and 8,807,214 disclose a process utilizing microwaves in the presence of catalyst and hydrogen to desulfurize crude oils.

Microwaves (MW) are non-ionizing electromagnetic radiations with a wavelength of 1 meter (m) to 1 millimeter (mm) corresponding to a frequency interval of 300 MHz to 300 GHz. In the heating mechanism using MW, the electromagnetic energy absorbed by the material is transformed into thermal energy. The frequencies of 915 MHz, 2450 MHz, 5800 MHz and 22125 MHz were defined in an international agreement for equipment for medical, scientific, industrial and domestic applications, including in this the domestic microwave.

Frequencies of 915 MHz and 2450 MHz are the most employed in industrial applications. In domestic ovens the frequency of 2450 MHz is generally used, with a wavelength of 12 cm and a power of the order of 1000 W. There are various forms of microwave generators, continuous and pulsed, and models with the power of tens of kW up to a MW. Radiation within the range of microwaves for industrial applications may be generated by a range of devices, such as: magnetrons, power grid tubes, klystrons, klystrodes, cross-field amplifiers, traveling wave tubes (TWT) and gyrotrons. These devices are built according to the size of the application, to operate in a wide range of radiation powers and frequencies.

Dielectric materials with a high loss factor interact with microwaves and convert the electromagnetic energy into thermal energy, heating up with the absorption and concomitant attenuation of the microwaves as these propagate in their interior. This process is dielectric heating and may act differently on loads of hydrocarbons, reagents and catalysts, even when in direct contact between these and homogenously mixed, different to heating via conduction or convection.

Some have noted that hydroprocessing catalysts recently removed from units or stored free of contact with the atmosphere interact more effectively with microwaves. It is believed these catalysts have a synergic effect between their catalytically active sites and their capacity to absorb microwaves. This synergy, associated with a local temperature higher than the average temperature of the reaction medium, creates a nanoreactor in which the reactions observed occur. Reactions occur in the active sites of the catalyst in contact with the hydrocarbon, subject to the synergy of the irradiation of electromagnetic waves. The energy applied to the reaction system via microwave irradiation is solely that necessary to the heating of the nanoreactors, the area of the active microwave absorbent sites, around which the reactions the object of this process occur.

The present process involves the treatment of HMFO in the presence of microwave absorbent materials, more preferentially those which absorb radiation in localized sites forming nanoreactors. This process, which may operate in a batch or continuous regimen, in a fixed, fluidized or slurry bed occurs in the presence of microwave absorbent materials such as catalysts, spent refinery catalysts, preferentially those materials which absorb radiation in localized sites such as hydro refining catalysts such as those of the alumina supported NiMo or CoMo type, even those which have been used in hydrotreatment units (HDT) at petroleum refineries. Other catalysts, both new and used, which also have microwave absorbent areas or sites, may be used in this invention, with an active phase composed of transition or lanthanide metals as oxides or sulfides.

By way of the appropriate choice of catalysts, whose active sites also behave as selective microwave absorbers, additional gains may be obtained, such as the reduced viscosity of the treated loads and reduced of contaminants such as nitrogen and sulfur present in these heavy oils.

The Microwave Treatment Process Unit (MTPU) comprises a conventional reactor attached via wave windows and guides to a microwave source. Construction of this unit, which may operate at relatively low pressures lower than 2 MPa, and temperatures equal to or lower than 300° C., adopted in this process would not present technical difficulties for an experienced technician in this field. For example see the reactors disclosed in EP1985359 or U.S. Pat. No. 9,302,245 as an illustrative examples of microwave energy based reactors that allow for elevated temperature, pressure, presence of catalytic materials, and continuous flow of feedstock materials (i.e. Feedstock HMFO and optionally hydrogen).

Generally, the MTPU contemplated within the scope of the present invention involves placing the referred Feedstock HMFO or Product HMFO into contact in batches or continually with a fixed or slurry bed subject to the action of microwave energy of a wavelength of a range of 1 m to 1 mm, corresponding to a frequency interval of 300 MHz to 300 GHz. The bed comprises a microwave absorbent material, such as a spent catalyst from a hydrotreatment unit. The load input temperature ranges between 25° C. and 300° C., preferably at a temperature ranging between 30° C. and 260° C. The pressure of the system is not critical and may be adjusted in such a way that prior to treatment it is equal to or lower than the pressure of the previous unit and after treatment the current is at the normal pressure of this system. Spatial velocity ranges from between 0.10 $h^{-1}$ and 10 $h^{-1}$, preferably within a range of between 0.2 $h^{-1}$ and 6 $h^{-1}$. The microwave radiation is normally conducted to the reactor guided in wave guide ducts connected to the reactor via windows. These windows must be appropriate for the radiation to pass through but must also withstand the pressure conditions which vary from atmospheric to 50 bar and temperatures of the reaction medium which range from 25° C. to 300° C., characteristic of the process. Construction of microwave transparent windows capable of withstanding the pressures and temperatures for the process is within the skill of those experienced in the field.

The microwave absorbent material used in this invention may be, for example, selected from the group of metallic oxides, sulfates, coking fines tailings; compounds containing nanostructured materials such as nanofibers and nanotubes; catalysts or mixtures of catalysts disposed of at fluid catalytic cracking units; catalysts or mixtures of catalysts disposed of at hydrotreatment units, comprised of transition metals (such as Co, Mo, Ni, etc.), supported on refractory oxides which may be chosen from among alumina, silica, titanium, zirconium and/or mixtures, and others, in which the material which supported the active phase of the absorbent material may be preferably transparent to microwaves.

With spent catalysts, these may have suffered a phase of intermediary rectification or not in the presence of an inert gas. It may be necessary to include paramagnetic materials within the catalyst, such as iron oxides or iron sulfides, to promote the transfer of microwave energy to the hydrocarbons and hydrogen gas present in the surroundings.

An advantage of this process is that it operates at relatively low temperature and pressure. The operating phase of the process enables it to be scaled up without the characteristics difficulties of hooking up a microwave source to industrial processes which used high pressure and temperature.

In this description, items already described above as part of the core process have retained the same numbering and designation for ease of description. As show in FIG. 2, a MTPU 3 can be utilized to pre-treat the Feedstock HMFO prior to mixing with the Activating Gas 4 as part of the core process disclosed above. While simplistically represented in this drawing, the MTPU 3 may be multiple parallel or in series MTPU's however the MTPU may be as simple as a single reactor vessel in which the HMFO is exposed to microwave energy in the presence of catalyst. While a single a fixed bed, flow through/contact vessel may be used, it may be advantageous, and it is preferable to have multiple contact vessels in parallel with each other to allow for one unit to be active while a second or third unit are being reloaded. Such an arrangement involving multiple parallel contact vessels with pipes/switching valves, etc. . . . is well within the abilities of one of skill in the art of refinery process design and operation.

An alternative illustrative embodiment is shown in FIG. 3 in which an MTPU 17 is utilized after the core sulfur removal process step, but prior to the separation of the Product HMFO 24 from any Residual Gas 20 and By-Product Hydrocarbons 22 (i.e. mostly C1-C4 hydrocarbons, and wild naphtha boiling below 150 F). In such a configuration the MTPU effectively acts as a polishing unit to remove TAN and viscosity inducing complex molecules present in the HMFO not removed under the conditions in the core process step. As with the pre-treatment MTPU described above, the conditions in this post-treatment MTPU are moderate. It is believed that because this step of the process will be conducted under very modest conditions (i.e. moderately elevated temperatures sufficient to make the HMFO liquid-like in this process) that will have minimal to no adverse impact upon the physical properties of the product HMFO. In this way one may achieve a level of total acidity and viscosity reduction for a HMFO not achieved otherwise while minimizing the cracking of hydrocarbons and maintaining the other desirable bulk properties of the HMFO.

Product HMFO The Product HFMO resulting from the disclosed illustrative processes is of merchantable quality for sale and use as a heavy marine fuel oil (also known as a residual marine fuel or heavy bunker fuel), that is a fuel that is stable and compatible with other marine fuels, specifically heavy (residual) marine fuels. The Product HMFO exhibits the physical properties required for the Product HMFO to be an ISO compliant (i.e. ISO8217:2017) Table 2 residual marine fuel. In one embodiment, the Product HMFO exhibits the bulk properties of: a maximum kinematic viscosity at 50° C. (ISO 3104) between the range from 180 $mm^2/s$ to 700 $mm^2/s$; a maximum density at 15° C. (ISO 3675) between the range of 991.0 $kg/m^3$ to 1010.0 $kg/m^3$; a CCAI is in the range of 780 to 870; a flash point (ISO 2719) no lower than 60.0° C. a maximum total sediment—aged (ISO 10307-2) of 0.10% wt.; a maximum carbon residue— micro method (ISO 10370) between the range of 18.00% wt. and 20.00% wt., and a maximum aluminum plus silicon (ISO 10478) content of 60 mg/kg.

The Product HMFO has a sulfur content (ISO 14596 or ISO 8754) less than 0.5 wt % and preferably less than 0.1% wt. and is fully compliant with the IMO Annex VI (revised) requirements for a low sulfur and preferably an ultra-low sulfur HMFO. That is the sulfur content of the Product HMFO has been reduced by about 90% or greater when compared to the Feedstock HMFO. Similarly, the vanadium content (ISO 14597) of the Product HMFO is less than 10% and more preferably less than 1% of the maximum vanadium content of the Feedstock HMFO. One of skill in the art will appreciate that a substantial reduction in sulfur and vanadium content of the Feedstock HMFO indicates a process having achieved a substantial reduction in the Environmental Contaminants from the Feedstock HMFO; of equal importance is that this has been achieved while maintaining the desirable properties of an ISO8217:2017 Table 2 compliant residual marine fuel.

The Product HMFO not only complies with ISO8217: 2017 Table 2 as a residual marine fuel (and is merchantable as a residual marine fuel or bunker fuel), the Product HMFO has a maximum sulfur content (ISO 14596 or ISO 8754) less than 0.5% wt. preferably a sulfur content (ISO 14596 or ISO 8754) between the range of 0.05% wt. ppm and 0.5% wt. and more preferably a sulfur content (ISO 14596 or ISO 8754) between the range of 0.1% wt. and 0.5% wt. The vanadium content of the Product HMFO is well within the maximum vanadium content (ISO 14597) required for an ISO8217: 2017 Table 2 residual marine fuel exhibiting a vanadium content lower than 450 ppm mg/kg, preferably a vanadium content (ISO 14597) lower than 300 mg/kg and more preferably a vanadium content (ISO 14597) between the range of 50 mg/kg and 100 mg/kg.

One knowledgeable in the art of marine fuel blending, bunker fuel formulations and the fuel logistical requirements for marine shipping fuels will readily appreciate that without further compositional changes or blending, the Product HMFO can be sold and used as a low sulfur MARPOL Annex VI compliant heavy (residual) marine fuel that is a direct substitute for the high sulfur heavy (residual) marine fuel or heavy bunker fuel currently in use. One illustrative embodiment is an ISO 8217:2017 compliant low sulfur heavy marine fuel oil comprising (and preferably consisting essentially of) hydroprocessed residual marine fuel compliant with ISO 8217:2017, Table 2 as a high sulfur heavy marine fuel oil, wherein the sulfur levels of the hydroprocessed ISO 8217:2017 compliant high sulfur heavy marine fuel oil is greater than 0.5% wt. and wherein the sulfur levels of the ISO 8217:2017 compliant low sulfur heavy marine fuel oil is less than 0.5% wt. Another illustrative embodiment is an ISO 8217:2017 compliant ultra-low sulfur heavy marine fuel oil comprising (and preferably consisting essentially of) a hydroprocessed ISO 8217:2017 Tabel 2 residual marine fuel as a high sulfur heavy marine fuel oil, wherein the sulfur levels of the hydroprocessed ISO 8217:2017 compliant high sulfur heavy marine fuel oil is greater than 0.5% wt. and wherein the sulfur levels of the ISO 8217:2017 compliant low sulfur heavy marine fuel oil is less than 0.1% wt.

As a result of the present invention, multiple economic and logistical benefits to the bunkering and marine shipping industries can be realized. More specifically the benefits include minimal changes to the existing heavy marine fuel bunkering infrastructure (storage and transferring systems); minimal changes to shipboard systems are needed to comply with emissions requirements of MARPOL Annex VI (revised); no additional training or certifications for crew members will be needed, amongst the realizable benefits. Refiners will also realize multiple economic and logistical benefits, including: no need to alter or rebalance the refinery operations and product streams to meet a new market demand for low sulfur or ultralow sulfur residual marine fuel; no additional units are needed in the refinery along with accompanying additional hydrogen or sulfur capacity because the illustrative process can be conducted as a standalone unit; refinery operations can remain focused on those products that create the greatest value from the crude oil received (i.e. production of petrochemicals, gasoline and distillate (diesel); refiners can continue using the existing slates of crude oils without having to switch to sweeter or lighter crudes to meet the environmental requirements for residual marine fuel products; to name a few.

Heavy Marine Fuel Composition One aspect of the present inventive concept is a fuel composition comprising, but preferably consisting essentially of, the Product HMFO resulting from the processes disclosed, and may optionally include Diluent Materials. As noted above, the bulk properties of the Product HMFO complies with ISO8217:2017 Table 2 as a residual marine fuel and meets the global IMO Annex VI requirements for maximum sulfur content (ISO 14596 or ISO 8754). To the extent that ultra-low levels of sulfur are desired, the process of the present invention achieves this and one of skill in the art of marine fuel blending will appreciate that a low sulfur or ultra-low sulfur Product HMFO can be utilized as a primary blending stock to form a global IMO Annex VI compliant low sulfur Heavy Marine Fuel Composition having a sulfur content less than 0.5 wt %. Such a low sulfur Heavy Marine Fuel Composition will comprise (and preferably consist essentially of): a) the Product HMFO and b) Diluent Materials. In one embodiment, the majority of the volume of the Heavy Marine Fuel Composition is the Product HMFO with the balance of materials being Diluent Materials. Preferably, the Heavy Maine Fuel Composition is at least 75% by volume, preferably at least 80% by volume, more preferably at least 90% by volume, and furthermore preferably at least 95% by volume Product HMFO with the balance being Diluent Materials.

Diluent Materials may be hydrocarbon or non-hydrocarbon based materials that are mixed into or combined with or added to, or solid particle materials that are suspended in, the Product HMFO. The Diluent Materials may intentionally or unintentionally alter the composition of the Product HMFO but not in a way that the resulting mixture fails to comply with the ISO 8217:2017 Table 2 standards for the bulk properties of residual marine fuel or fails to have a sulfur content lower than the global MARPOL standard of 0.5% wt. sulfur (ISO 14596 or ISO 8754). Examples of Diluent Materials that are considered to be hydrocarbon based materials include: Feedstock HMFO (i.e. high sulfur HMFO); distillate based fuels such as road diesel, gas oil, MGO or MDO; cutter oil (which is currently used in formulating high sulfur residual marine fuel); renewable oils and fuels such as biodiesel, methanol, ethanol, and the like; synthetic hydrocarbons and oils based on gas to liquids technology such as Fischer-Tropsch derived oils, fully synthetic oils such as those based on polyethylene, polypropylene, dimer, trimer and poly butylene and the like; refinery residues or other hydrocarbon oils such as atmospheric residue, vacuum residue, fluid catalytic cracker (FCC) slurry oil, FCC cycle oil, pyrolysis gasoil, cracked light gas oil (CLGO), cracked heavy gas oil (CHGO), light cycle oil (LCO), heavy cycle oil (HCO), thermally cracked residue, coker heavy distillate, bitumen, de-asphalted heavy oil, visbreaker residue, slop oils, asphaltene oils; used or recycled motor oils; lube oil aromatic extracts and crude oils such as heavy crude oil, distressed crude oils and similar materials that might otherwise be sent to a hydrocracker or diverted into the blending pool for a prior art high sulfur heavy (residual) marine fuel oil. Examples of Diluent Materials that are considered to be non-hydrocarbon based materials include: residual water (i.e. water that is absorbed from the humidity in the air or water that is miscible or solubilized, in some cases as microemulsions, into the hydrocarbons of the Product HMFO), fuel additives which can include, but are not limited to detergents, viscosity modifiers, pour point depressants, lubricity modifiers, de-hazers (e.g. alkoxylated phenol formaldehyde polymers), antifoaming agents (e.g. polyether modified polysiloxanes); ignition improvers; anti rust agents (e.g. succinic acid ester derivatives); corrosion inhibitors; anti-wear additives, anti-oxidants (e.g. phenolic compounds and derivatives), coating agents and surface modifiers, metal deactivators, static dissipating agents, ionic and nonionic surfactants, stabilizers, cosmetic colorants and odorants and mixtures of these. A third group of Diluent Materials may include suspended solids or fine particulate materials that are present as a result of the handling, storage and transport of the Product HMFO or the Heavy Marine Fuel Composition, including but not limited to: carbon or hydrocarbon solids (e.g. coke, graphitic solids, or micro-agglomerated asphaltenes), iron rust and other oxidative corrosion solids, fine bulk metal particles, paint or surface coating particles, plastic or polymeric or elastomer or rubber particles (e.g. resulting from the degradation of gaskets, valve parts, etc. . . . ), catalyst fines, ceramic or mineral particles, sand, clay, and other earthen particles, bacteria and other biologically generated solids, and mixtures of these that may be present as suspended particles, but otherwise don't detract from the merchantable quality of the Heavy Marine Fuel Composition as an ISO 8217:2017 Table 2 compliant heavy (residual) marine fuel.

The Heavy Marine Fuel Composition must be of merchantable quality as a low sulfur residual marine fuel. That is the blend must be suitable for the intended use as heavy marine bunker fuel and generally be fungible, (i.e. blendable and compatible) with other residual marine fuels used as a bunker fuel for ocean going ships. Preferably the Heavy Marine Fuel Composition must retain the physical properties that are required of an ISO 8217:2017 Table 2 compliant residual marine fuel and a sulfur content lower than the global MARPOL standard of 0.5% wt. sulfur (ISO 14596 or ISO 8754) so that the material qualifies as MARPOL Annex VI Low Sulfur Heavy Marine Fuel Oil (LS-HMFO). As noted above, the sulfur content of the Product HMFO can be significantly lower than 0.5% wt. (i.e. below 0.1% wt sulfur (ISO 14596 or ISO 8754)) to qualify as a MARPOL Annex VI compliant Ultra-Low Sulfur Heavy Marine Fuel Oil (ULS-HMFO) and thus a Heavy Marine Fuel Composition likewise can be formulated to qualify as a MARPOL Annex VI compliant ULS-HMFO suitable for use as residual marine bunker fuel in the ECA zones. To qualify as an ISO 8217:2017 Table 2 residual marine fuel, the Heavy Marine Fuel Composition of the present invention must meet those internationally accepted standards including: a maximum kinematic viscosity at 50° C. (ISO 3104) between the range from 180 mm$^2$/s to 700 mm$^2$/s; a maximum density at 15° C. (ISO 3675) between the range of 991.0 kg/m$^3$ to 1010.0 kg/m$^3$; a CCAI is in the range of 780 to 870; a flash point (ISO 2719) no lower than 60.0° C. a maximum total sediment—aged (ISO 10307-2) of 0.10% wt.; a maximum carbon residue—micro method (ISO 10370) between the range of 18.00% wt. and 20.00% wt., and a maximum aluminum plus silicon (ISO 10478) content of 60 mg/kg.

Production Plant Description: Turning now to a more detailed illustrative embodiment of a production plant implementing both the core process and the pretreatment or posttreatment processes disclosed above, FIGS. 4 and 5 show a schematic for a production plant implementing the core process described above combined with a pre-treatment unit (FIG. 4, item 2) or a post-treatment unit (FIG. 5, item 18), the combination which will result in the additional reduction of the Environmental Contaminants present in a Feedstock HMFO prior to hydrotreatment, or serve to polish the Product HMFO by removal of residual sulfur components not removed by the core process.

It will be appreciated by one of skill in the art that additional alternative embodiments for the core process and the pretreatment or posttreatment processes disclosed above may involve multiple vessels and reactors even though only one of each is shown. Variations using multiple vessels/reactors are contemplated by the present invention but are not illustrated in greater detail for simplicity's sake. The Reactor System (11) for the core process is described in greater detail below and the use of multiple vessels for the pretreatment or posttreatment processes disclosed above has already been described. It will be noted by one of skill in the art that in FIGS. 4 and 5, portions of the production plant with similar function and operation have been assigned the same reference number. This has been done for convenience and succinctness only and differences between FIG. 4 and FIG. 5 are duly noted and explained below.

Figure 4:
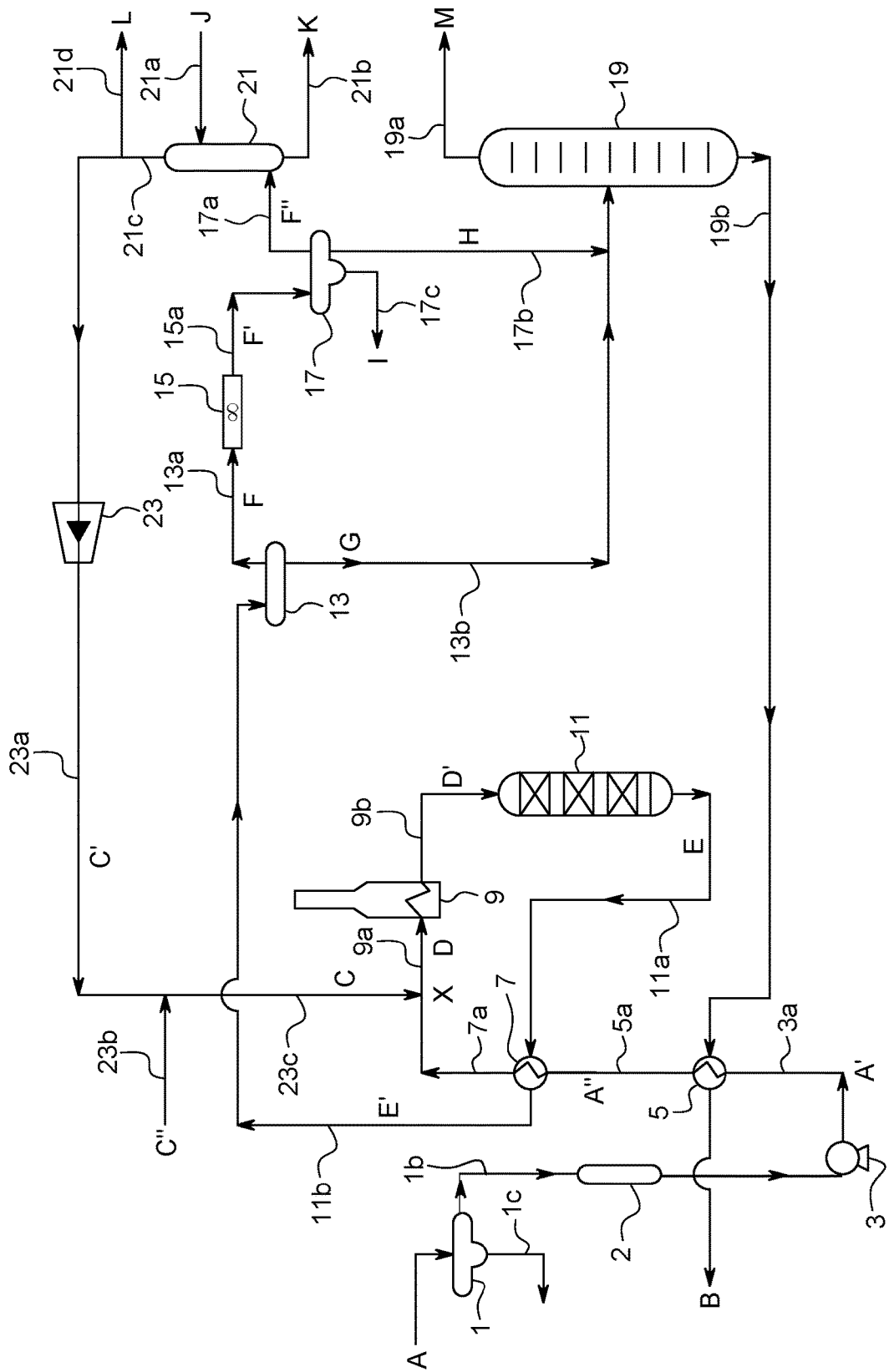
FIG. 4 is a basic schematic diagram of a plant to produce Product HMFO utilizing a pre-treatment unit to pre-treat the feedstock HMFO and a subsequent core process to produce Product HMFO.
Figure 5:
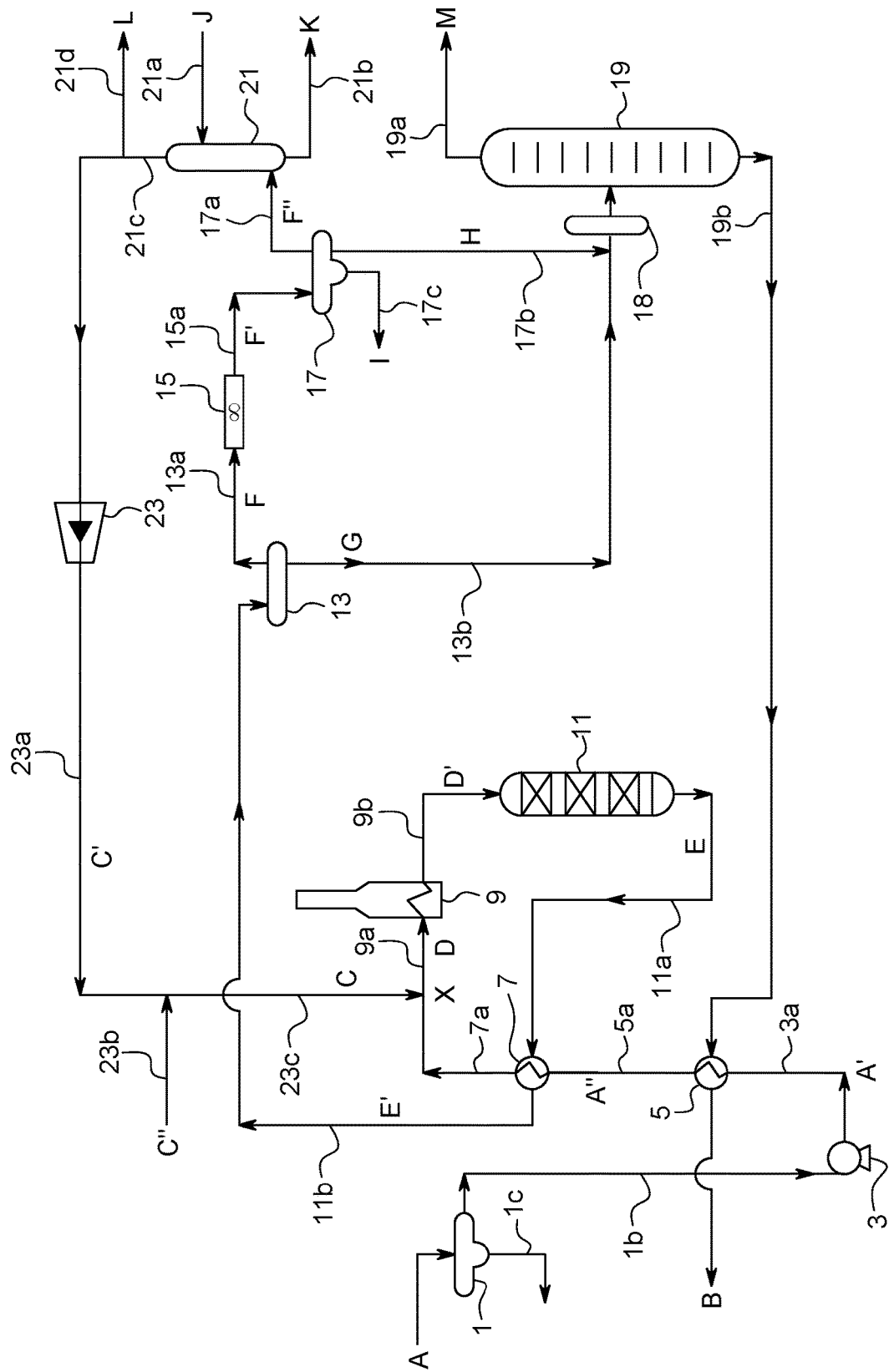
FIG. 5 is a basic schematic diagram of a plant to produce Product HMFO utilizing a combination of a core process and subsequent process unit or polishing reactor to produce Product HMFO.

In FIGS. 4 and 5, Feedstock HMFO (A) is fed from outside the battery limits (OSBL) to the Oil Feed Surge Drum (1) that receives feed from outside the battery limits (OSBL) and provides surge volume adequate to ensure smooth operation of the unit. Water entrained in the feed is removed from the HMFO with the water being discharged a stream (1*c*) for treatment OSBL.

As shown in FIG. 4, the Feedstock HMFO (A) is withdrawn from the Oil Feed Surge Drum (1) via line (1*b*) by the Oil Feed Pump (3) and sent to the pre-treatment process vessel 2 as a pretreatment step. The pre-treated Feedstock HMFO is pressurized to a pressure required for the process. The pressurized HMFO (A') then passes through line (3*a*) to the Oil Feed/Product Heat Exchanger (5) where the pressurized HMFO (A') is partially heated by the Product HMFO (B). The pressurized Feedstock HMFO (A') passing through line (5*a*) is further heated against the effluent from the Reactor System (E) in the Reactor Feed/Effluent Heat Exchanger (7).

As shown in FIG. 5, the Feedstock HMFO (A) is withdrawn from the Oil Feed Surge Drum (1) via line (1*b*) by the Oil Feed Pump (3) and is pressurized to a pressure required for the process. The pressurized HMFO (A') then passes through line (3*a*) to the Oil Feed/Product Heat Exchanger (5) where the pressurized HMFO (A') is partially heated by the Product HMFO (B). The pressurized Feedstock HMFO (A') passing through line (5*a*) is further heated against the effluent from the Reactor System (E) in the Reactor Feed/Effluent Heat Exchanger (7).

In both FIG. 4 and FIG. 5, the heated and pressurized Feedstock HMFO (A") in line (7*a*) is then mixed with Activating Gas (C) provided via line (23*c*) at Mixing Point (X) to form a Feedstock Mixture (D). The mixing point (X) can be any well know gas/liquid mixing system or entrainment mechanism well known to one skilled in the art.

The Feedstock Mixture (D) passes through line (9a) to the Reactor Feed Furnace (9) where the Feedstock Mixture (D) is heated to the specified process temperature. The Reactor Feed Furnace (9) may be a fired heater furnace or any other kind to type of heater as known to one of skill in the art if it will raise the temperature of the Feedstock mixture to the desired temperature for the process conditions.

The fully heated Feedstock Mixture (D') exits the Reactor Feed Furnace (9) via line 9b and is fed into the Reactor System (11). The fully heated Feedstock Mixture (D') enters the Reactor System (11) where Environmental Contaminants, such a sulfur, nitrogen, and metals are preferentially removed from the Feedstock HMFO component of the fully heated Feedstock Mixture. The Reactor System contains a catalyst which preferentially removes the sulfur compounds in the Feedstock HMFO component by reacting them with hydrogen in the Activating Gas to form hydrogen sulfide. The Reactor System will also achieve demetallization, and incidentally denitrogenating, and a certain amount of ring opening hydrogenation of the complex aromatics and asphaltenes, however minimal hydrocracking of hydrocarbons should take place (i.e. conversion to hydrocarbons having a boiling point less than 150 F). The process conditions of hydrogen partial pressure, reaction pressure, temperature and residence time as measured by time space velocity are optimized to achieve desired final product quality. A more detailed discussion of the Reactor System, the catalyst, the process conditions, and other aspects of the process are contained below in the "Reactor System Description."

The Reactor System Effluent (E) exits the Reactor System (11) via line (11a) and exchanges heat against the pressurized and partially heats the Feedstock HMFO (A') in the Reactor Feed/Effluent Exchanger (7). The partially cooled Reactor System Effluent (E') then flows via line (11c) to the Hot Separator (13).

The Hot Separator (13) separates the gaseous components of the Reactor System Effluent (F) which are directed to line (13a) from the liquid components of the Reactor System effluent (G) which are directed to line (13b). The gaseous components of the Reactor System effluent in line (13a) are cooled against air in the Hot Separator Vapor Air Cooler (15) and then flow via line (15a) to the Cold Separator (17).

The Cold Separator (17) further separates any remaining gaseous components from the liquid components in the cooled gaseous components of the Reactor System Effluent (F'). The gaseous components from the Cold Separator (F") are directed to line (17a) and fed onto the Amine Absorber (21). The Cold Separator (17) also separates any remaining Cold Separator hydrocarbon liquids (H) in line (17b) from any Cold Separator condensed liquid water (I). The Cold Separator condensed liquid water (I) is sent OSBL via line (17c) for treatment.

In FIG. 4, the hydrocarbon liquid components of the Reactor System effluent from the Hot Separator (G) in line (13b) and the Cold Separator hydrocarbon liquids (H) in line (17b) are combined and are fed to the Oil Product Stripper System (19). The Oil Product Stripper System (19) removes any residual hydrogen and hydrogen sulfide from the Product HMFO (B) which is discharged in line (19b) to storage OSBL. The vent stream (M) from the Oil Product Stripper in line (19a) may be sent to the fuel gas system or to the flare system that are OSBL.

In FIG. 5, the hydrocarbon liquid components of the Reactor System effluent from the Hot Separator (G) in line (13b) and the Cold Separator hydrocarbon liquids (H) in line (17b) are combined and are fed to the post-treatment unit 18 prior to being sent to the Oil Product Stripper System (19). The Oil Product Stripper System (19) removes any residual hydrogen and hydrogen sulfide from the Product HMFO (B) which is discharged in line (19b) to storage OSBL. The vent stream (M) from the Oil Product Stripper in line (19a) may be sent to the fuel gas system or to the flare system that are OSBL.

The gaseous components from the Cold Separator (F") in line (17a) contain a mixture of hydrogen, hydrogen sulfide and light hydrocarbons. This vapor stream (17a) feeds an Amine Absorber (21) where it is contacted against Lean Amine (J) provided OSBL via line (21a) to the Amine Absorber (21) to remove hydrogen sulfide from the gases making up the Activating Gas recycle stream (C'). Rich amine (K) which has absorbed hydrogen sulfide exits the bottom of the Amine Absorber (21) and is sent OSBL via line (21b) for amine regeneration and sulfur recovery.

The Amine Absorber overhead vapor in line (21c) is preferably recycled to the process as a Recycle Activating Gas (C') via the Recycle Compressor (23) and line (23 a) where it is mixed with the Makeup Activating Gas (C''') provided OSBL by line (23b). This mixture of Recycle Activating Gas (C') and Makeup Activating Gas (C''') to form the Activating Gas (C) utilized in the process via line (23c) as noted above. A Scrubbed Purge Gas stream (H) is taken from the Amine Absorber overhead vapor line (21c) and sent via line (21d) to OSBL to prevent the buildup of light hydrocarbons or other non-condensables.

Reactor System Description: The core process Reactor System (11) illustrated in FIG. 4 and FIG. 5 comprises a single reactor vessel loaded with the process catalyst and sufficient controls, valves and sensors as one of skill in the art would readily appreciate.

Alternative Reactor Systems in which more than one reactor vessel may be utilized in parallel or in a cascading series can easily be substituted for the single reactor vessel Reactor System 11 shown. In such an embodiment, each reactor vessel is similarly loaded with process catalyst and can be provided the heated Feed Mixture (D') via a common line. The effluent from each of the three reactors is recombined in line and forms a combined Reactor Effluent (E) for further processing as described above. The illustrated arrangement will allow the three reactors to carry out the process effectively multiplying the hydraulic capacity of the overall Reactor System. Control valves and isolation valves may also prevent feed from entering one reactor vessel but not another reactor vessel. In this way one reactor can be by-passed and placed off-line for maintenance and reloading of catalyst while the remaining reactors continues to receive heated Feedstock Mixture (D'). It will be appreciated by one of skill in the art this arrangement of reactor vessels in parallel is not limited in number to three, but multiple additional reactor vessels can be added as shown by dashed line reactor. The only limitation to the number of parallel reactor vessels is plot spacing and the ability to provide heated Feedstock Mixture (D') to each active reactor.

In another illustrative embodiment cascading reactor vessels are loaded with process catalyst with the same or different activities toward metals, sulfur or other Environmental Contaminants to be removed. For example, one reactor may be loaded with a highly active demetallizing catalyst, a second subsequent or downstream reactor may be loaded with a balanced demetallizing/desulfurizing catalyst, and reactor downstream from the second reactor may be loaded with a highly active desulfurization catalyst. This allows for greater control and balance in process conditions (temperature, pressure, space flow velocity, etc. . . . ) so it is tailored for each catalyst. In this way one can optimize the parameters in each reactor depending upon the material being fed to that specific reactor/catalyst combination and thus minimize the hydrocracking reactions. As with the prior illustrative embodiment, multiple cascading series of reactors can be utilized in parallel and in this way the benefits of such an arrangement noted above (i.e. allow one series to be "online" while the other series is "off line" for maintenance or allow increased plant capacity).

The reactor(s) that form the Reactor System may be fixed bed, ebulliated bed, liquid full bed, or slurry bed or a combination of these types of reactors. As envisioned, fixed bed reactors are preferred as these are easier to operate and maintain.

The reactor vessel in the Reactor System is loaded with one or more process catalysts. The exact design of the process catalyst system is a function of feedstock properties, product requirements and operating constraints and optimization of the process catalyst can be carried out by routine trial and error by one of ordinary skill in the art.

The process catalyst(s) comprise at least one metal selected from the group consisting of the metals each belonging to the groups 6, 8, 9 and 10 of the Periodic Table, and more preferably a mixed transition metal catalyst such as Ni—Mo, Co—Mo, Ni—W or Ni—Co— Mo are utilized. The metal is preferably supported on a porous inorganic oxide catalyst carrier. The porous inorganic oxide catalyst carrier is at least one carrier selected from the group consisting of alumina, alumina/boria carrier, a carrier containing metal-containing aluminosilicate, alumina/phosphorus carrier, alumina/alkaline earth metal compound carrier, alumina/titania carrier and alumina/zirconia carrier. The preferred porous inorganic oxide catalyst carrier is alumina. The pore size and metal loadings on the carrier may be systematically varied and tested with the desired feedstock and process conditions to optimize the properties of the Product HMFO. Such activities are well known and routine to one of skill in the art. Catalyst in the fixed bed reactor(s) may be dense-loaded or sock-loaded.

The catalyst selection utilized within and for loading the Reactor System may be preferential to desulfurization by designing a catalyst loading scheme that results in the Feedstock mixture first contacting a catalyst bed that with a catalyst preferential to demetallization followed downstream by a bed of catalyst with mixed activity for demetallization and desulfurization followed downstream by a catalyst bed with high desulfurization activity. In effect the first bed with high demetallization activity acts as a guard bed for the desulfurization bed.

The objective of the Reactor System is to treat the Feedstock HMFO at the minimum severity required to meet the Product HMFO sulfur specification. Demetallization, denitrogenation and hydrocarbon hydrogenation reactions may also occur to some extent when the process conditions are optimized so the performance of the Reactor System achieves the required level of desulfurization. Hydrocracking is preferably minimized to reduce the volume of hydrocarbons formed as by-product hydrocarbons to the process. The objective of the process is to selectively remove the Environmental Contaminants, (primarily sulfur) from Feedstock HMFO and minimize the formation of unnecessary by-product hydrocarbons (hydrocarbons boiling less than 150 F).

The process conditions in each reactor vessel will depend upon the feedstock, the catalyst utilized and the desired final properties of the Product HMFO desired. Variations in conditions are to be expected by one of ordinary skill in the art and these may be determined by pilot plant testing and systematic optimization of the process. With this in mind it has been found that the operating pressure, the indicated operating temperature, the ratio of the Activating Gas to Feedstock HMFO, the partial pressure of hydrogen in the Activating Gas and the space velocity all are important parameters to consider. The operating pressure of the Reactor System should be in the range of 250 psig and 3000 psig, preferably between 1000 psig and 2500 psig and more preferably between 1500 psig and 2200 psig. The indicated operating temperature of the Reactor System should be 500° F. to 900° F., preferably between 650° F. and 850° F. and more preferably between 680° F. and 800° F. The ratio of the quantity of the Activating Gas to the quantity of Feedstock HMFO should be in the range of 250 scf gas/bbl of Feedstock HMFO to 10,000 scf gas/bbl of Feedstock HMFO, preferably between 2000 scf gas/bbl of Feedstock HMFO to 5000 scf gas/bbl of Feedstock HMFO and more preferably between 2500 scf gas/bbl of Feedstock HMFO to 4500 scf gas/bbl of Feedstock HMFO. The Activating Gas should be selected from mixtures of nitrogen, hydrogen, carbon dioxide, gaseous water, and methane, so Activating Gas has an ideal gas partial pressure of hydrogen ($p_{H2}$) greater than 80% of the total pressure of the Activating Gas (P) and preferably wherein the Activating Gas has an ideal gas partial pressure of hydrogen ($p_{H2}$) greater than 95% of the total pressure of the Activating Gas (P). The Activating Gas may have a hydrogen mole fraction in the range between 80% of the total moles of Activating Gas and more preferably wherein the Activating Gas has a hydrogen mole fraction between 80% and 99% of the total moles of Activating Gas. The liquid hourly space velocity within the Reactor System should be between 0.05 oil/hour/$m^3$ catalyst and 1.0 oil/hour/$m^3$ catalyst; preferably between 0.08 oil/hour/$m^3$ catalyst and 0.5 oil/hour/$m^3$ catalyst and more preferably between 0.1 oil/hour/$m^3$ catalyst and 0.3 oil/hour/$m^3$ catalyst to achieve deep desulfurization with product sulfur levels below 0.1 ppmw.

The hydraulic capacity rate of the Reactor System should be between 100 bbl of Feedstock HMFO/day and 100,000 bbl of Feedstock HMFO/day, preferably between 1000 bbl of Feedstock HMFO/day and 60,000 bbl of Feedstock HMFO/day, more preferably between 5,000 bbl of Feedstock HMFO/day and 45,000 bbl of Feedstock HMFO/day, and even more preferably between 10,000 bbl of Feedstock HMFO/day and 30,000 bbl of Feedstock HMFO/day. The desired hydraulic capacity may be achieved in a single reactor vessel Reactor System or in a multiple reactor vessel Reactor System.

The following example will provide one skilled in the art with a more specific illustrative embodiment for conducting the processes disclosed and claimed herein:

Core Process Pilot Unit Set Up: The pilot unit will be set up with two 434 $cm^3$ reactors arranged in series to process the feedstock HMFO. The lead reactor will be loaded with a blend of a commercially available hydrodemetallization (HDM) catalyst and a commercially available hydro-transition (HDT) catalyst. One of skill in the art will appreciate that the HDT catalyst layer may be formed and optimized using a mixture of HDM and HDS catalysts combined with an inert material to achieve the desired intermediate/transition activity levels. The second reactor was loaded with a blend of the commercially available hydro-transition (HDT) and a commercially available hydrodesulfurization (HDS). Alternatively, one can load the second reactor simply with a commercially hydrodesulfurization (HDS) catalyst. One of skill in the art will appreciate that the specific feed properties of the Feedstock HMFO may affect the proportion of HDM, HDT and HDS catalysts in the reactor system. A systematic process of testing different combinations with the same feed will yield the optimized catalyst combination for any feedstock and reaction conditions. For this example, the first reactor was loaded with ⅔ hydrodemetallization catalyst and ⅓ hydro-transition catalyst. The second reactor was loaded with all hydrodesulfurization catalyst. The catalysts in each reactor were mixed with glass beads (approximately 50% by volume) to improve liquid distribution and better control reactor temperature. For this pilot test run, we used these catalysts: HDM: Albemarle KFR 20 series or equivalent; HDT: Albemarle KFR 30 series or equivalent; HDS: Albemarle KFR 50 or KFR 70 or equivalent. Once set up of the pilot unit was complete, the catalyst was activated by sulfiding the catalyst in a manner well known to one of skill in the art.

Core Process Unit Operation: Upon completion of the activating step, the pilot unit was ready to receive the feedstock HMFO and Activating Gas feed. For the present example, the Activating Gas was technical grade or better hydrogen gas. The mixed Feedstock HMFO and Activating Gas was provided to the pilot plant at rates and operating conditions as specified: Oil Feed Rate: 108.5 ml/h (space velocity=0.25/h); Hydrogen/Oil Ratio: 570 Nm3/m3 (3200 scf/bbl); Reactor Temperature: 372° C. (702° F.); Reactor Outlet Pressure: 13.8 MPa(g) (2000 psig).

One of skill in the art will know that the rates and conditions may be systematically adjusted and optimized depending upon feed properties to achieve the desired product requirements. The unit was brought to a steady state for each condition and full samples taken so analytical tests were completed. Material balance for each condition was closed before moving to the next condition.

Expected impacts on the Feedstock HMFO properties are: Sulfur Content (wt %): Reduced by at least 80%; Metals Content (wt %): Reduced by at least 80%; MCR/Asphaltene Content (wt %): Reduced by at least 30%; Nitrogen Content (wt %): Reduced by at least 20%; C1-Naphtha Yield (wt %): Not over 3.0% and preferably not over 1.0%.

Process conditions in the Core Process Pilot Unit were systematically adjusted as per Table 1 to assess the impact of process conditions and optimize the performance of the process for the specific catalyst and feedstock HMFO utilized.

TABLE 1

Optimization of Core Process Conditions

| Case | HC Feed Rate (ml/h), [LHSV(/h)] | $Nm^3$ $H_2/m^3$ oil/ scf $H_2$/bbl oil | Temp (° C./° F.) | Pressure (MPa(g)/psig) |
|---|---|---|---|---|
| Baseline | 108.5 [0.25] | 570/3200 | 372/702 | 13.8/2000 |
| T1 | 108.5 [0.25] | 570/3200 | 362/684 | 13.8/2000 |
| T2 | 108.5 [0.25] | 570/3200 | 382/720 | 13.8/2000 |
| L1 | 130.2 [0.30] | 570/3200 | 372/702 | 13.8/2000 |
| L2 | 86.8 [0.20] | 570/3200 | 372/702 | 13.8/2000 |
| H1 | 108.5 [0.25] | 500/2810 | 372/702 | 13.8/2000 |
| H2 | 108.5 [0.25] | 640/3590 | 372/702 | 13.8/2000 |
| S1 | 65.1 [0.15] | 620/3480 | 385/725 | 15.2/2200 |

In this way, the conditions of the core process unit will be optimized to achieve less than 0.5% wt. sulfur product HMFO and preferably a 0.1% wt. sulfur product HMFO. Conditions for producing ULS-HMFO (i.e. 0.1% wt. sulfur product HMFO) will be: Feedstock HMFO Feed Rate: 65.1 ml/h (space velocity=0.15/h); Hydrogen/Oil Ratio: 620 $Nm^3/m^3$ (3480 scf/bbl); Reactor Temperature: 385° C. (725° F.); Reactor Outlet Pressure: 15 MPa(g) (2200 psig)

Pre-Treatment Sulfur absorption process unit Pilot Test: Approximately 1000 gm of Feedstock HMFO will be placed under and inert atmosphere (preferably nitrogen) and heated to approximately 200° C. (392° F.) to achieve a viscosity suitable for the pumping and flow of the HMFO as a liquid. Approximately 100 gm of a selected sulfur sorbent material can then be added and the mixture stirred for approximately 1 hour to simulate a stirred tank reactor. For purposes of this pilot test pelletized activated carbon or attapulgus clay is utilized as the sulfur sorbent, however other pelletized sulfur sorbents (such as that disclosed in U.S. Pat. Nos. 6,274,533 or 7,799,211) may also be utilized. The liquid HMFO can be separated from the pelletized sulfur sorbent material by decanting after gravity separation, centrifugation of the hot mixture or hot filtration using a glass or porous metal filter resulting in a HMFO that will be substantially solid free. This material is subsequently treated in the Core Process Pilot Test Unit described above to give a Product HMFO.

Post-Treatment Sulfur absorption process unit Pilot Test: Approximately 1000 gm of effluent from the Core Process Pilot Test Unit described above will be placed under and inert atmosphere (preferably nitrogen) and heated to approximately 200 deg ° C. (392° F.) to achieve a viscosity suitable for the pumping and flow of the HMFO as a liquid. Approximately 100 gm of a selected sulfur sorbent material can then be added and the mixture stirred for approximately 1 hour to simulate a stirred tank reactor. For purposes of this pilot test pelletized activated carbon or attapulgus clay is utilized as the sulfur sorbent, however other pelletized sulfur sorbents (such as that disclosed in U.S. Pat. No. 6,274,533 or 7799211) may also be utilized. The liquid HMFO can be separated from the pelletized sulfur sorbent material The liquid HMFO can be separated from the sulfur sorbent material by decanting after gravity separation, centrifugation of the hot mixture or hot filtration using a glass or porous metal filter resulting in a product HMFO that will be substantially solid free.

Pre-Treatment Oxidative Desulfurizing Process Unit Pilot Test: Approximately 1000 gm of Feedstock HMFO (3% wt sulfur) will be placed under and inert atmosphere (preferably nitrogen) and heated to approximately 100° C. (220° F.) to achieve a viscosity suitable for the pumping and flow of the HMFO as a liquid. Reported sulfur specification in heavy petroleum generally indicate that approximately 60%-75% of the sulfur content is attributable to aromatic sulfur compounds such as thiophene>>benzothiophene>>dibenzothiophene. (See for example Sulfur Speciation in Heavy Petroleums: Information from X-ray Absorption Near-Edge Structure, Geoffrey S. Waldo et al., Geochemica et Cosmochimica Acts, Vol, 55 pp 801-814) Based on this approximate speciation, 2% of the sulfur is attributable to thiophene (1.0% wt.) benezothiophene (0.5% wt.) and dibenzothiophene (0.5% wt) or a total aromatic sulfur content of about 0.183 mol equivalents in the sample. Using a molar ratio of 4:1 oxidizing agent to sulfur equivalent, cumyl hydroperoxide is used a titanium promotor poly[bis(glycerolato)(hydroxo)(cumylperoxo)titanium(IV) bisphenol A ester as those disclosed in U.S. Pat. No. 8,283,498 (incorporated herein by reference) will be added. The oxidant, catalyst and hydrocarbons will remain in contact for a period of 15 minutes which allows the oxidation reactions of sulfur compounds in the hydrocarbon structure to occur. The mixture will then be washed with caustic, such as NaO or the ammonium chloride salt dissolved water. The wash water containing ammonium sulfide and some organic sulfur compounds will then be decanted as stream from the vessel. The HMFO stream containing catalyst and most of the sulfones, as they are more soluble in HMFO than water, will be extracted with methanol to separate the reaction by products sulfoxides and sulfones from the hydrocarbon mixture. The methanol amount used was about equal parts of the treated hydrocarbons to dissolve the oxidation by-products sulfones. About 1 W % of sulfones of total sulfones produced in the oxidation reactions will remain in the HMFO after the extraction process. The HMFO material can then be heated to about 300° C. which will result in the thermal decomposition of the remaining sulfones and the resulting HMFO product ° assed with nitrogen or other inert gas. The heated material is subsequently treated in the Core Process Pilot Test Unit described above to give a Product HMFO.

Post-Treatment Oxidative Desulfurizing Process Unit Pilot Test: Approximately 1000 gm of effluent from the Core Process Pilot Test Unit described above will be placed under and inert atmosphere (preferably nitrogen) and heated to approximately 100° C. (220° F.) to achieve a viscosity suitable for the pumping and flow of the HMFO as a liquid. Based on speciation of the organosulfur compounds, the hard sulfur compounds present substantially include benzothiophene and dibenzothiophene. Diluted ozone (10% by volume in nitrogen) as a gaseous oxidizing agent can be bubbled through the HFMO fluid to oxidize the residual organo-sulfur compounds. Alternatively, a kerosene peroxide (Cu hydroperoxide) generated (as disclosed in U.S. Pat. No. 2,749,284 incorporated herein by reference) and will be mixed in a ratio of one active peroxide equivalent per molar sulfur equivalent or 1.5%-2.0% wt per 1% wt. sulfur present. The mixture will be stirred for approximately 1 hour to simulate a stirred tank reactor. The HMFO containing oxidized sulfur compounds will then be subjected to extraction with methanol using approximately 800 gm methanol divided into five extraction steps. The resulting HMFO product is then fractionated with residual light hydrocarbons and other by-products being removed in a conventional manner.

Pre-Treatment and Post-Treatment Microwave Induced Desulfurization Unit Operation: To exemplify the invention, experiments can be carried out using a lab microwave oven at a frequency of 2.45 GHz and a maximum power of 1000 W, operating in a continuous or pulsed mode and equipped with programmable control devices and a thermocouple and fiber optic temperature sensor to measure temperatures. The reaction system used comprises a 3-mouth glass flask coated in a microwave (MW) transparent thermal insulator known as kaolin (aluminum-silicate), equipped with mechanical stirring from the well to the temperature sensor via fiber optics then from the condenser to the water chilled flush back maintained outside the microwave cavity. The operating conditions used to process the petroleum will be the normal power of the 200 W, 300 W and 1000 W microwave oven and continuous and pulsed microwave oven operating mode. The absorbent used will be a spent hydroprocessing sulfided catalyst utilized in the transition section, in a catalyst-to-oil ration of 0.3: 1. The initial HMFO temperature will be about room temperature or equal to 25° C. The final nominal temperature of the product between 230° C. and 300° C. The reactionary system will have mechanical stirring and one output of the reactor was hooked up to a water-chilled reflux condenser. In this example, in the pulsed operating method of the source of the microwave oven, the nominal power will be distributed over time in constant pulses of 1000 W. The frequency of pulses in this equipment will be constant at 35 pulses/min. equivalent to 0.58 cycles or 1.7 s/cycle. For an average power of 200 W applied to a system pulsed with 1000 W each pulse lasts 0.34 seconds and powered off intervals of 1.37 seconds. The catalysts chosen for this study were hydro refining catalysts, HDR, alumina supported, after being used in an industrial unit or pilot plant (PP). These catalysts, NiMo or CoMo type, with molybdenum sulfate as an active phase, also have high activity a microwave absorbers. With these catalysts the aim was to conjugate in a synergic and localized form in the same active sites, the remaining catalytic activity during the active phase of the molybdenum sulfate with its high capacity to absorb microwaves. If hydrogen will be present during the microwave treatment the reaction zone will be at a pressure ranging from one atmosphere to 400 psig.

The load of hydrocarbons assessed in this example will be the Feedstock HMFO or the product HMFO described above. It is expected that the TAN (and the potential to form coke during hydroprocessing) will decrease and the API gravity of the HMFO material will be increased. In addition, the viscosity of the HMFO is modified in such a manner to make it less viscous. In this way a highly viscous residual based high sulfur Feedstock HMFO otherwise ISO 8217: 2017 compliant, such as RMG 500 (Kinematic Viscosity of 500 at 50° C.) or RMG700 (Kinematic Viscosity of 500) at 50° C. or even RMK500 or 700, may be more easily introduced in the core process and processed with less formation of coke and other particles that may cause a rapid increase in reactor backpressure. As part of the post Core Process treatment of the Product HMFO, the described process can be carried out to condition the Product HMFO for easier transport and handling, increased compatibility and stability when blended with other marine fuel materials (i.e. MGO or MDO), and enhance the value of these materials as low sulfur HMFO.

Table 2 summarizes the impacts on key properties of HMFO by the Core Process Pilot Unit.

TABLE 2

Expected Impact of Process on Key Properties of HMFO

| Property | Minimum | Typical | Maximum |
| --- | --- | --- | --- |
| Sulfur Conversion/Removal | 90% | 95% | 99% |
| Metals Conversion/Removal | 80% | 90% | 100% |
| MCR Reduction | 30% | 50% | 70% |
| Asphaltene Reduction | 30% | 50% | 70% |
| Nitrogen Conversion | 10% | 30% | 70% |
| C1 through Naphtha Yield | 0.5% | 1.0% | 4.0% |
| Hydrogen Consumption (scf/bbl) | 500 | 750 | 1500 |

Table 3 lists analytical tests carried out for the characterization of the Feedstock HMFO and Product HMFO. The analytical tests included those required by ISO for the Feedstock HMFO and the product HMFO to qualify and trade in commerce as ISO compliant residual marine fuels. The additional parameters are provided so that one skilled in the art can understand and appreciate the effectiveness of the inventive process.

TABLE 3

Analytical Tests and Testing Procedures

| | |
| --- | --- |
| Sulfur Content | ISO 8754 or ISO 14596 or ASTM D4294 |
| Density @ 15° C. | ISO 3675 or ISO 12185 |
| Kinematic Viscosity @ 50° C. | ISO 3104 |

TABLE 3-continued

Analytical Tests and Testing Procedures

| | |
|---|---|
| Pour Point, ° C. | ISO 3016 |
| Flash Point, ° C. | ISO 2719 |
| CCAI | ISO 8217, ANNEX B |
| Ash Content | ISO 6245 |
| Total Sediment-Aged | ISO 10307-2 |
| Micro Carbon Residue, mass % | ISO 10370 |
| H2S, mg/kg | IP 570 |
| Acid Number | ASTM D664 |
| Water | ISO 3733 |
| Specific Contaminants | IP 501 or IP 470 |
| | (unless indicated otherwise) |
| Vanadium | or ISO 14597 |
| Sodium | |
| Aluminum | or ISO 10478 |
| Silicon | or ISO 10478 |
| Calcium | or IP 500 |
| Zinc | or IP 500 |
| Phosphorous | IP 500 |
| Nickle | |
| Iron | |
| Distillation | ASTM D7169 |
| C:H Ratio | ASTM D3178 |
| SARA Analysis | ASTM D2007 |
| Asphaltenes, wt % | ASTM D6560 |
| Total Nitrogen | ASTM D5762 |
| Vent Gas Component Analysis | FID Gas Chromatography or comparable |

Table 4 contains the expected analytical test results for (A) Feedstock HMFO; (B) the Core Process Product HMFO and (C) Overall Process (Core+treatment) from the inventive process These results will indicate to one of skill in the art that the production of a ULS HMFO can be achieved. It will be noted by one of skill in the art that under the conditions, the levels of hydrocarbon cracking (as indicated by the volume of hydrocarbons boiling below 150 F) will be minimized to levels substantially lower than 10%, more preferably less than 5% and even more preferably less than 1% of the total mass balance.

TABLE 4

Analytical Results

| | A | B | C |
|---|---|---|---|
| Sulfur Content, mass % | 3.0 | Less than 0.5 | Less than 0.1 |
| Density @ 15° C., kg/m$^3$ | 990 | 950 [1] | 950 [1] |
| Kinematic Viscosity @ 50° C., mm$^2$/s | 380 | 100 [1] | 100 [1] |
| Pour Point, ° C. | 20 | 10 | 10 |
| Flash Point, ° C. | 110 | 100 [1] | 100 [1] |
| CCAI | 850 | 820 | 820 |
| Ash Content, mass % | 0.1 | 0.0 | 0.0 |
| Total Sediment-Aged, mass % | 0.1 | 0.0 | 0.0 |
| Micro Carbon Residue, mass % | 13.0 | 6.5 | 6.5 |
| H2S, mg/kg | 0 | 0 | 0 |
| Acid Number, mg KO/g | 1 | 0.5 | 0.5 |
| Water, vol % | 0.5 | 0 | 0 |
| Specific Contaminants, mg/kg | | | |
| Vanadium | 180 | 20 | 20 |
| Sodium | 30 | 1 | 1 |
| Aluminum | 10 | 1 | 1 |
| Silicon | 30 | 3 | 3 |
| Calcium | 15 | 1 | 1 |
| Zinc | 7 | 1 | 1 |
| Phosphorous | 2 | 0 | 0 |
| Nickle | 40 | 5 | 5 |
| Iron | 20 | 2 | 2 |
| Distillation, deg ° C./° F. | | | |
| IBP | 160/320 | 120/248 | 120/248 |
| 5% wt | 235/455 | 225/437 | 225/437 |
| 10% wt | 290/554 | 270/518 | 270/518 |
| 30% wt | 410/770 | 370/698 | 370/698 |
| 50% wt | 540/1004 | 470/878 | 470/878 |
| 70% wt | 650/1202 | 580/1076 | 580/1076 |
| 90% wt | 735/1355 | 660/1220 | 660/1220 |
| FBP | 820/1508 | 730/1346 | 730/1346 |
| C:H Ratio (ASTM D3178) | 1.2 | 1.3 | 1.3 |
| SARA Analysis | | | |
| Saturates | 16 | 22 | 22 |
| Aromatics | 50 | 50 | 50 |
| Resins | 28 | 25 | 25 |
| Asphaltenes | 6 | 3 | 3 |
| Asphaltenes, wt % | 6.0 | 2.5 | 2.5 |
| Total Nitrogen, mg/kg | 4000 | 3000 | 3000 |

Note:
[1] It is expected that property will be adjusted to a higher value by post process removal of light material via distillation or stripping from Product HMFO.

It will be appreciated by those skilled in the art that changes could be made to the illustrative embodiments described above without departing from the broad inventive concepts thereof. It is understood, therefore, that the inventive concepts disclosed are not limited to the illustrative embodiments or examples disclosed, but it is intended to cover modifications within the scope of the inventive concepts as defined by the claims.

The invention claimed is:

1. A process for reducing one or more Environmental Contaminants in a Feedstock Heavy Marine Fuel Oil, the process comprising: pre-treating a Feedstock Heavy Marine Fuel Oil, wherein the Feedstock Heavy Marine Fuel Oil is compliant with ISO 8217: 2017 Table 2 as a residual marine fuel, except for the concentration of Environmental Contaminants, wherein one or more Environmental Contaminants are selected from the group consisting of organic and inorganic compounds within the Feedstock Heavy Marine Fuel Oil producing measurable amounts of sulfur, nitrogen, phosphorus, vanadium, nickel, iron, aluminum and silicon and combinations thereof, in a pre-treatment unit to give a pre-treated Feedstock Heavy Marine Fuel Oil, wherein the pre-treatment reaction unit is selected form the group consisting of: a) a sulfur absorption process unit containing a sulfur sorbent under sorbent desulfurization conditions; b) an oxidative desulfurizing process unit containing an oxidizing agent under oxidative desulfurization conditions; and c) a microwave treatment process unit under reactive conditions of microwave energy having a frequency selected from the group consisting of 915 MHz and 2450 MHz, in the presence of microwave absorbent material; mixing a quantity of the pre-treated Feedstock Heavy Marine Fuel Oil with a quantity of Activating Gas to give a Feedstock Mixture; contacting the Feedstock Mixture with r ne or more hydro-processing catalysts under reactive conditions for desulfurization and demetallization to form a Process Mixture from said Feedstock Mixture wherein said Process Mixture contains a majority of a Product Heavy Marine Fuel Oil; receiving said Process Mixture and separating the Product Heavy Marine Fuel Oil from the Process Mixture and, discharging the Product Heavy Marine Fuel OH, wherein the discharged Product Heavy Marine Fuel Oil complies with ISO 8217: 2017 Table 2 as a residual marine fuel and has one or more Environmental Contaminants concentration less than 0.5 wt %.

2. The process of claim 1 wherein the one or more Environmental Contaminants is organic and inorganic compounds within the Feedstock Heavy Marine Fuel Oil resulting in measurable amounts of sulfur and wherein said Feedstock Heavy Marine Fuel Oil has a sulfur content (ISO 14596 or ISO 8754) between the range of 5.0% wt. to 0.5% wt. and wherein said Product Heavy Marine Fuel OH has a sulfur content (ISO 14596 or ISO 8754) less than 0.5% wt.

3. The process of claim 1, wherein said Feedstock Heavy Marine Fuel Oil has: a maximum kinematic viscosity at 50° C. (ISO 3104) between the range from 180 mm$^2$/s to 700 mm$^2$/s; and a maximum density at 15° C. (ISO 3675) between the range of 991.0 kg/m$^3$ to 1010.0 kg/m$^3$; and a CCAI in the range of 780 to 870; and a flash point (ISO 2719) no lower than 60.0° C.; and a maximum total sediment-aged (ISO 10307-2) of 0.10% wt; and maximum carbon residue—micro method (ISO 10370) between the range of 18.00% wt. and 20.00% wt.; and a maximum vanadium content (ISO 14597) between the range from 350 mg/kg to 450 ppm mg kg; and a maximum aluminum plus silicon (ISO 10478) content of 60 mg/kg, and wherein said Product Heavy Marine Fuel Oil has: a maximum kinematic viscosity at 50° C. (ISO 3104) between the range from 180 mm$^2$/s to 700 mm$^2$/s; and a maximum density at 15° C. (ISO 3675) between the range of 991.0 kg/m$^3$ to 1010.0 kg/m$^3$; and a CCAI is in the range of 780 to 870; and a flash point (ISO 2719) no lower than 60.0° C., and a maximum total sediment—aged (ISO 10307-2) of 0.10% wt. and a maximum carbon residue—micro method (ISO 10370) between the range of 18.00% wt. and 20.00% wt., and a maximum sulfur content (ISO 14596 or ISO 8754) between the range of 0.05% wt. to 1.0% wt., and a maximum vanadium content (ISO 14597) between the range from 350 mg/kg to 450 ppm mg/kg, and a maximum aluminum plus silicon (ISO 10478) content of 60 mg/kg.

4. The process of claim 1, wherein the sulfur sorbent comprises: a support material selected from the group consisting of: zinc oxide; titanium oxide; perlite; alumina; silica; zeolites; spinel oxides; coke; amorphous carbon; graphitic carbon; graphene; nanotube carbon; diatomaceous earth; white clay; fuller's earth; attapulgus clay; and combinations thereof and 0-90% by weight of a promotor selected from the group consisting of: nickel, cobalt, iron, manganese, tungsten silver, gold, copper, platinum, zinc, tin ruthenium, molybdenum, antimony, vanadium, iridium, chromium, and palladium.

5. The process of claim 4, wherein the sorbent desulfurizing conditions comprise: a temperature in the range of 122° F. and 752° F., a pressure between 15-1500 psig; and a weight hour space velocity in the range between 0.5 hr to about 50 hr.

6. The process of claim 1, wherein the oxidizing agent is selected from the group consisting of a gaseous oxidant, an organic oxidant, an inorganic oxidant, a bio-oxidant or combinations of these.

7. The process of claim 6, wherein the oxidative desulfurizing conditions include the steps of: contacting the Feedstock Heavy Marine Fuel Oil with the oxidizing agent to forma HMFO containing oxidized sulfur compounds and separating the pre-treated Feedstock Heavy Marine Fuel Oil from the oxidized sulfur compounds using a process selected from the group consisting of: thermal decomposition polar solvent extraction, aqueous caustic wash; selective absorption onto solid absorptive materials and combinations thereof.

8. The process of claim 1, wherein the microwave absorbent material is selected from the group consisting of metallic oxides, sulfates, coking fines tailings; compounds containing nanostructured materials consisting of nanofibers and nanotubes and combinations thereof; catalysts or mixtures of catalysts disposed of at fluid catalytic cracking units; catalysts or mixtures f catalysts disposed of at hydrotreatment units, comprised of transition metals selected from Co, Mo, Ni, and combinations thereof, supported on refractory oxides which may be chosen from among alumina, silica, titanium, zirconium and/or mixtures, used hydrodesulfurization catalysts and, combinations thereof.

9. The process of claim 1, wherein the reactive conditions for desulfurization and demetallization are selected to minimize catalytic and thermal hydrocracking such that the volume of hydrocarbons having a boiling point less than 150° F. is less than 10% of the total material balance for the unit.

10. The process of claim 1, wherein said Feedstock Heavy Marine Fuel Oil has: a maximum kinematic viscosity at 50° C. (ISO 3104) and a maximum density at 15° C. (ISO 3675) selected to produce a CCAI in the range of 780 to 870; and a flash point (ISO 2719) no lower than 60.0° C.; and measurable amounts of sulfur (ISO 14596 or 150 8754) greater than 0.5% wt, and wherein said Product Heavy Marne Fuel Oil has: a maximum kinematic viscosity at 50° C. (ISO 3104) and a maximum density at 15° C. (ISO 3675) selected to produce a CCAI in the range of 780 to 870; and a flash point (ISO 2719) no lower than 60.0° C., and measurable amounts of sulfur (ISO 14596 or ISO 8754) between the range of 0.05% wt. to 0.5% wt.

11. A process for reducing one or more Environmental Contaminants in a Feedstock Heavy Marine Fuel Oil, the process comprising: mixing a quantity of Feedstock Heavy Marine Fuel Oil with a quantity of Activating Gas to give a Feedstock Mixture, wherein the Feedstock Heavy Marine Fuel Oil is compliant with ISO 8217: 2017 Table 2 as a residual marine fuel, except for the concentration of the Environmental Contaminants, wherein one or more Environmental Contaminants is selected form the group consisting of organic and inorganic compounds within the Feedstock Heavy Marine Fuel OH produces measurable amounts of sulfur, nitrogen, phosphorus, vanadium, nickel, iron, aluminum and silicon and combinations thereof; contacting the Feedstock Mixture with one or more hydroprocessing catalysts under reactive conditions for desulfurization and demetallization to form a Process Mixture from said Feedstock Mixture wherein said Process Mixture contains a majority of a Product Heavy Marine Fuel Oil; receiving said Process Mixture and separating the Product Heavy Marine Fuel Oil from the Process Mixture; receiving said Product Heavy Marine Fuel Oil in a post-treatment reaction unit to give a post-treated Feedstock Heavy Marine Fuel Oil, wherein the post-treatment reaction unit is selected form the group consisting of: a) a sulfur absorption process unit containing a sulfur sorbent under sorbent desulfurization conditions; b) an oxidative desulfurizing process unit containing an oxidizing agent under oxidative desulfurization conditions; and c) a microwave treatment process unit under reactive conditions of microwave energy having a frequency selected from the group consisting of 915 MHz and 2450 MHz, in the presence of microwave absorbent material; subsequently separating any residual gaseous components or by-product hydrocarbon components from the Product Heavy Marine Fuel Oil; and, discharging the Product Heavy Marine Fuel Oil, wherein the discharged Product Heavy Marine Fuel Oil is complies with ISO 8217: 2017 Table 2 as a residual marine fuel and has a one or more Environmental Contaminants concentration less than 0.5 wt %.

12. The process of claim 11 wherein the one or more Environmental Contaminants is organic and inorganic compounds within the Feedstock Heavy Marine Fuel Oil resulting in measurable amounts of sulfur and wherein said Feedstock Heavy Marine Fuel Oil has a sulfur content (ISO 14596 or ISO 8754) between the range of 5.0% wt. to 0.5% wt. and wherein said Product Heavy Marine Fuel Oil has a sulfur content (ISO 14596 or ISO 8754) less than 0.5% wt.

13. The process of claim 11, wherein said Feedstock Heavy Marine Fuel Oil has: a maximum kinematic viscosity at 50° C. (ISO 3104) between the range from 180 mm$^2$/s to 700 mm$^2$/s; and a maximum density at 15° C. (ISO 3675) between the range of 991.0 kg/m$^3$ to 1010.0 kg/m$^3$; and a CCAI is in the range of 780 to 870; and a flash point (ISO 2719) no lower than 60.0° C.; and a maximum total sediment—aged (ISO 10307-2) of 0.10% wt.; and a maximum carbon residue—micro method (ISO 10370) between the range of 18.00% wt. and 20.00% wt.; and a maximum vanadium content (ISO 14597) between the range from 350 mg/kg to 450 ppm mg kg; and, a maximum aluminum plus silicon (ISO 10478) content of 60 mg/kg and wherein said Product Heavy Marine Fuel Oil has: a maximum kinematic viscosity at 50° C. (ISO 3104) between the range from 180 mm$^2$/to 700 mm$^2$/s; and a maximum density at 15° C. (ISO 3675) between the range of 991.0 kg/m$^3$ to 1010.0 kg/m$^3$; and a CCAI is in the range of 780 to 870; and a flash point (ISO 2719) no lower than 60° C.; and a maximum total sediment aged (ISO 10307-2) of 0.10 wt.; and a maximum carbon residue—micro method (ISO 10370) between the range of 18.00% wt. and 20.00% wt.; and a maximum sulfur content (ISO 14596 or ISO 8754) between the range of 0.05% wt. to 1.0% wt.; and a maximum vanadium content (ISO 14597) between the range from 350 mg/kg to 450 ppm mg/kg; and maximum aluminum plus silicon (ISO 10478) content of 60 mg/kg.

14. The process of claim 11, wherein the sulfur sorbent comprises: a support material selected from the group consisting of: zinc oxide; titanium oxide; perlite; alumina; silica; zeolites; spinel oxides; coke; amorphous carbon; graphitic carbon; graphene; nan tube carbon; diatomaceous earth; white clay; fuller's earth; attapulgus clay; and combinations thereof and 0-90% by weight of a pro rotor selected from the group consisting of: nickel, cobalt, iron, manganese, tungsten, silver, gold, copper, platinum, zinc, tin, ruthenium, molybdenum, antimony, vanadium, iridium, chromium, and palladium.

15. The process of claim 14, wherein the sorbent desulfurizing conditions comprise: a temperature in the range of 122° F. and 752° F., a pressure between 15-1500 psig; and a weight hour space velocity in the range between 0.5 hr$^{-1}$ to about 50 hr$^{-1}$.

16. The process of claim 11, wherein the oxidizing agent is selected from the group consisting of a gaseous oxidant, an organic oxidant, an inorganic oxidant, a bio-oxidant or combinations of these.

17. The process of claim 16, wherein the oxidative desulfurizing conditions include the steps of: contacting the Product Heavy Marine Fuel Oil with the oxidizing agent to forma HMFO containing oxidized sulfur compounds and separating the post-treated Feedstock Heavy Marine Fuel Oil from the oxidized sulfur compounds using a process selected from the group consisting of: thermal decomposition, polar solvent extraction, aqueous caustic wash, selective absorption onto solid absorptive materials and combinations thereof.

18. The process of claim 11, wherein the microwave absorbent material is selected from the group consisting of metallic oxides, sulfates, coking fines tailings; compounds containing nanostructured materials consisting of nanofibers and nan tubes and combinations thereof; catalysts or mixtures of catalysts disposed of at fluid catalytic cracking units; catalysts or mixtures of catalysts disposed of at hydrotreatment units, comprised of transition metals selected from Co, Mo, Ni, and combinations thereof, supported on refractory oxides which may be chosen from among alumina silica, titanium, zirconium and/or mixtures, used hydrodesulfurization catalysts and combinations thereof.

19. The process of claim 11, wherein the reactive conditions for desulfurization and demetallization are selected to minimize catalytic and thermal hydrocracking such that the volume of hydrocarbons having a boiling point less than 150° F. is less than 10% of the total material balance for the unit.

20. The process of claim 11, wherein said Feedstock Heavy Marine Fuel Oil has: a maximum kinematic viscosity at 50° C. (ISO 3104) and a maximum density at 15° C. (ISO 3675) selected to produce a CCAI in the range of 780 to 870; and a flash point (ISO 2719) no lower than 60.0° C.; and measurable amounts of sulfur (ISO 14596 or 150 8754) greater than 0.5% wt., and wherein said Product Heavy Marine Fuel Oil has: a maximum kinematic viscosity at 50° C. (ISO 3104) and a maximum density at 15° C. (ISO 3675) selected to produce a CCAI in the range of 780 to 870; and a flash point (ISO 2719) no lower than 60.0° C., and measurable amounts of sulfur (ISO 14596 or ISO 8754) between the range of 0.05% wt. to 0.5% wt..

* * * * *